Jan. 2, 1962 A. H. FAULKNER ET AL 3,015,699

ELECTRONIC SWITCHING SYSTEM

Filed Sept. 30, 1959 25 Sheets-Sheet 1

INVENTORS
Alfred H. Faulkner
Donald K. Melvin
BY C. A. Gullbrandsen
Atty.

LINE SUPY 700

ALLOTTER 800

Jan. 2, 1962 A. H. FAULKNER ET AL 3,015,699

ELECTRONIC SWITCHING SYSTEM

Filed Sept. 30, 1959 25 Sheets-Sheet 8

Jan. 2, 1962 A. H. FAULKNER ET AL 3,015,699

ELECTRONIC SWITCHING SYSTEM

Filed Sept. 30, 1959 25 Sheets-Sheet 9

SIGNAL STATE REGISTER 1400

Jan. 2, 1962 A. H. FAULKNER ET AL 3,015,699

ELECTRONIC SWITCHING SYSTEM

Filed Sept. 30, 1959 25 Sheets-Sheet 17

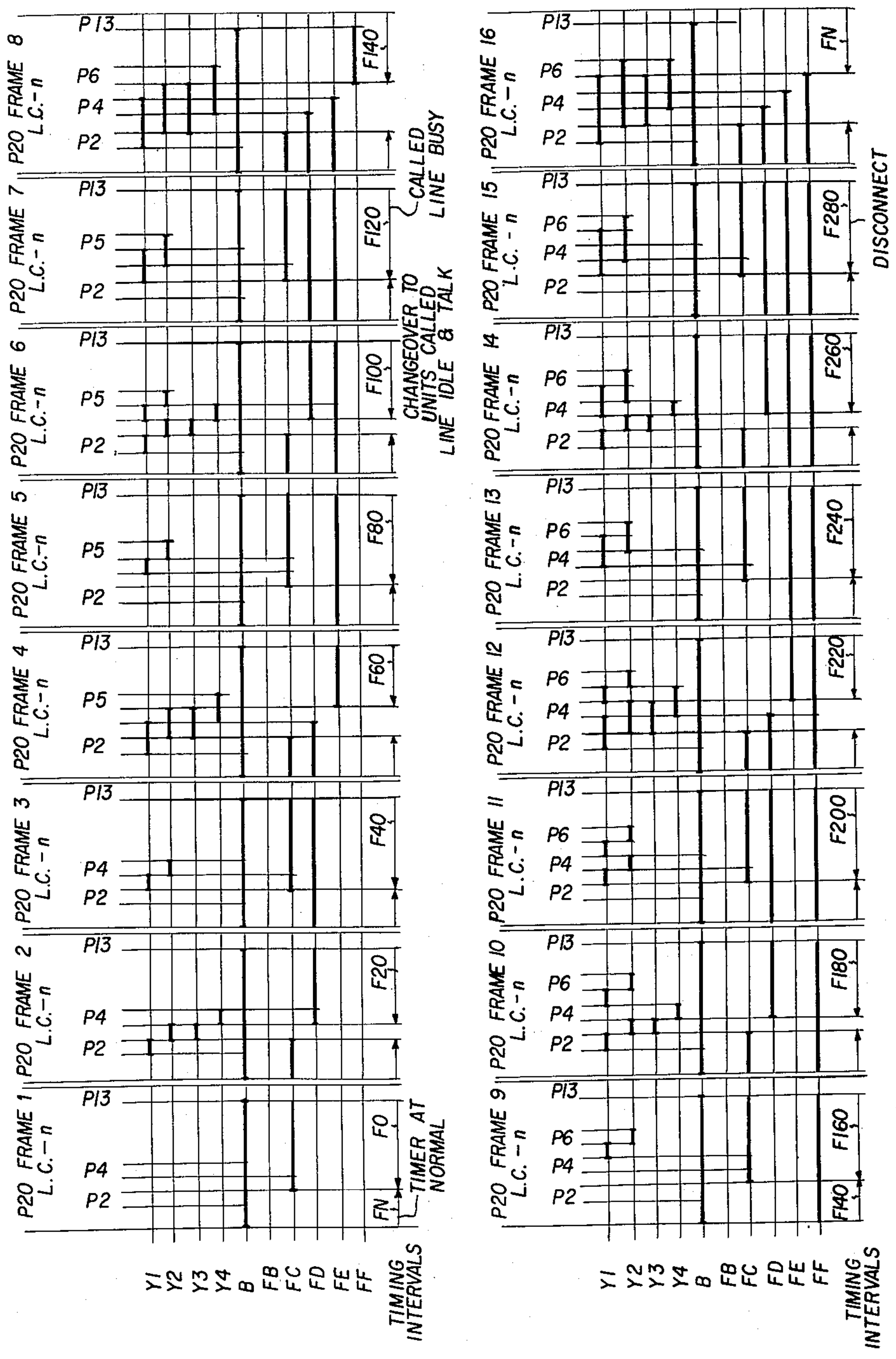
FIG. 19 TIMER CKT OPERATION

ELECTRONIC SWITCHING SYSTEM

Filed Sept. 30, 1959 25 Sheets-Sheet 20

CONNECTOR OPERATION-PART 1
(SEIZURE, TENS DIGIT & CHANGEOVER TO UNITS)

Jan. 2, 1962 A. H. FAULKNER ET AL 3,015,699

ELECTRONIC SWITCHING SYSTEM

Filed Sept. 30, 1959 25 Sheets-Sheet 21

CONNECTOR OPERATION-PART 2 (UNITS DIGIT & CHANGEOVER TO TEST)

FIG. 21C CONNECTOR OPERATION - PART 3 (BUSY & RELEASE; IDLE, RING, TALK & RELEASE)
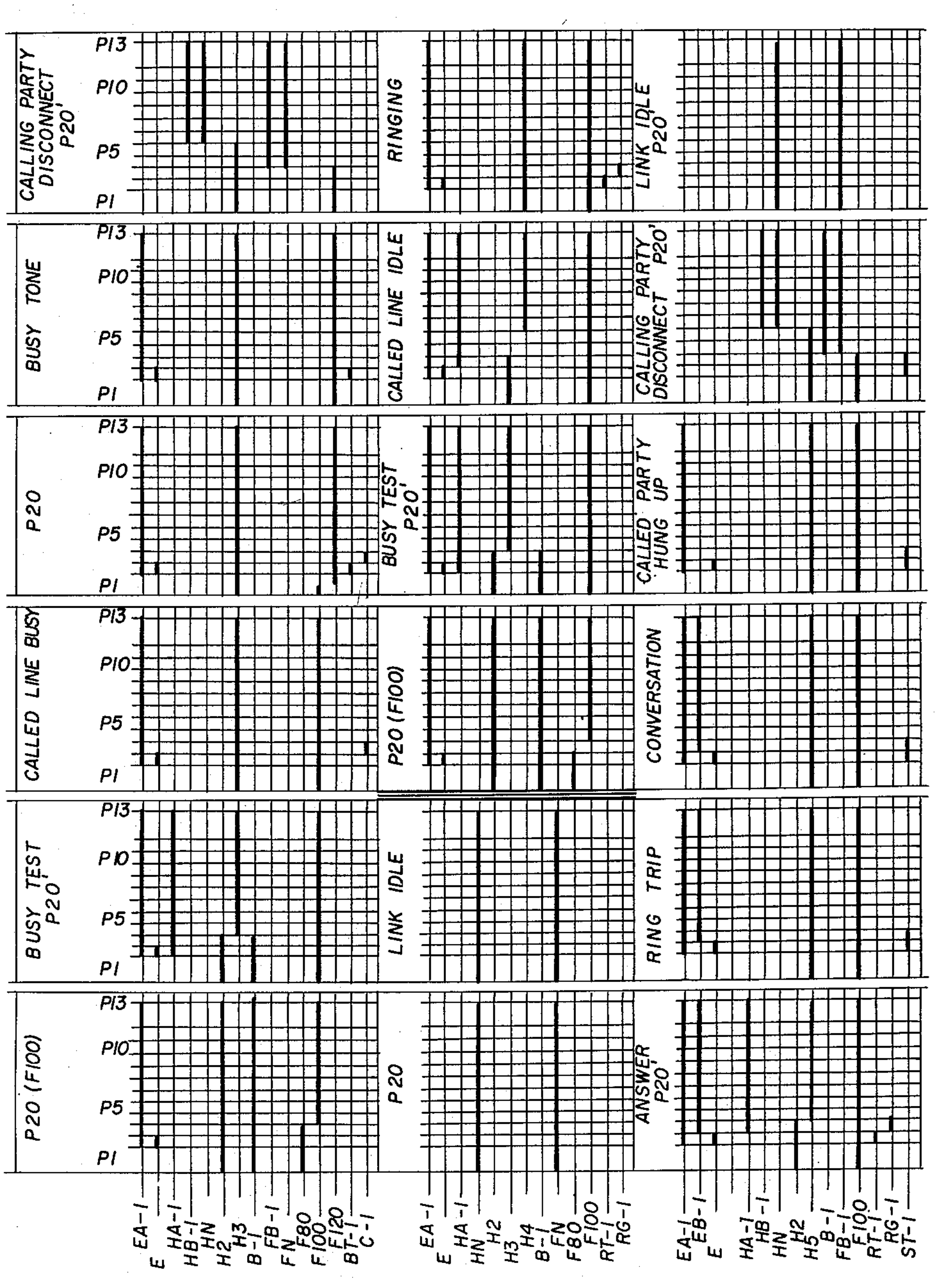

Jan. 2, 1962 A. H. FAULKNER ET AL 3,015,699

ELECTRONIC SWITCHING SYSTEM

Filed Sept. 30, 1959 25 Sheets-Sheet 23

United States Patent Office 3,015,699

Patented Jan. 2, 1962

3,015,699
ELECTRONIC SWITCHING SYSTEM

Alfred H. Faulkner, Redondo Beach, Calif., and Donald K. Melvin, Arlington Heights, Ill., assignors to Automatic Electric Laboratories, Inc., a corporation of Delaware Filed Sept. 30, 1959, Ser. No. 843,380
73 Claims. (Cl. 179—18)

This invention relates to an electronic switching system, and more particularly to a communication system using time division multiplex principles for switching.

It is an object of this invention to provide new and improved arrangements for controlling the selection and establishment of connections in an electronic switching system, and to reduce to a minimum the equipment required individually by each connecting unit.

According to the invention, the foregoing object is achieved in a communication switching system in which a switching arrangement is used to selectively establish connections between any of a group of line circuits and any of a group of connecting units; by providing common control equipment shared on a time division multiplex basis by the connecting units; and by providing in said common control equipment logic circuits for use in selecting the individual line circuit to be effectively connected with an individual connecting unit in a given call and also circuits for selectively operating the switching arrangement to establish the connections.

According to a feature of the invention, the common control equipment comprises high-speed storage apparatus and low-speed storage apparatus; with the high-speed storage apparatus having circuits for storing, on a time sharing basis, the identity of the line circuit to be effectively connected with an individual connecting unit in a given call; and the low-speed storage apparatus includes circuits for storing on a time sharing basis, the state of said call in accordance with supervisory signals received from the line circuit. The high-speed storage apparatus may include a high-speed memory and the low-speed storage apparatus may include a low-speed memory, with each memory having recurring pulses supplied thereto. The high-speed memory pulse cycle is divided into time slots, each of which corresponds to a step of the high-speed memory, with each time slot individually assigned to a particular one of the connecting units. A complete low-speed cycle is designated a pulse frame, and is divided into logic cycles. Each connecting unit is assigned a logic cycle during which the low-speed memory is driven one step, and during which the state of a call is analyzed. A plurality of high-speed memory cycles occurs during each pulse frame.

In a particular form of the invention the connections are established by time division multiplex transmission over a common medium connected between line-circuit transmission gates and connecting-unit transmission gates. The multiplex transmission pulse cycles correspond to the high-speed memory pulse cycles, and the multiplex sampling for each connection occurs during the time slot assigned to the connecting unit. Thus the invention provides a combination in which time division multiplex is used both for voice transmission and for time sharing of the control equipment which controls the selection and establishment of connections over the multiplex transmission medium.

All of the pulses of the system are ultimately derived from a single high-speed clock having one cycle per time slot. Each memory is driven by its own distributor. The high-speed distributor has a number of stages equal to the number of time slots in a high-speed memory cycle, and is driven one stage per time slot directly from the output of the high-speed clock. The low-speed distributor is driven one stage per logic cycle by a low-speed clock. The low speed clock completes one cycle per logic cycle, and is driven by the high-speed clock through a number of stages having a duration of one time slot each.

A feature of the invention relates to the time relation of the high-speed and low-speed cycles, in which the number of time slots per high-speed memory cycle is related to the number of time slots per logic cycle so that the time position of the time slot which a given connecting unit has in the cycle of the high-speed memory has associated therewith one and only one logic cycle, whereby the logic state of each link is analyzed once and only once per frame. In a specific embodiment of the invention, the number of time slots in each logic cycle and the number of time slots in each high-speed memory cycle have no common devisor. In the specific disclosed embodiment there are 17 time slots in each logic cycle and 40 time slots in each high speed memory cycle. Therefore there are 17 high-speed cycles and 40 logic cycles per frame.

A further feature relates to an arrangement for identifying the connecting unit associated with a particular logic cycle by assigning a time slot in a particular time position of a logic cycle for identification by its coincidence with the high-speed memory time slot of the connecting unit. Coincidence of a particular high-speed memory time slot with a given time position in a logic cycle will occur once and only once per frame.

In United States Patent 2,854,516 to A. H. Faulkner for an Electronic Telephone System, each line circuit of a group has two transmission gates, one for originating calls and the other for terminating calls, and in a group of finder-connector links each has a single pulse time position individually assigned thereto and each has a transmission gate on its finder side and a separate transmission gate on its connector side, with one common two-way multiplex transmission conductor connected between the line circuit originating transmission gates and the finder gates, and a separate common two-way transmission conductor connected between the line circuit terminating gates and the connector gates. In that system two coordinate array memories are provided for registering line numbers, one being common to the line finders and the other being common to the connectors. Each link includes individual logic equipment for controlling its line finder memory to scan for a calling line, and other individual logic equipment for receiving dialing signals to control the connector memory to register the number of a called line. Each link has an individual row of cores in the line finder membory, and an individual row of cores in the connector memory. Both the line finder and the connector are controlled in the same time slot, namely the time slot individually assigned to the link.

The system shown in the present application contains improvements over the above-mentioned Faulkner patent.

In a system of the type having a plurality of links, each containing two connecting units, one being a line finder with a transmission gate for a multiplex connection to the transmission gate of a calling line, and the other being a connector with a separate transmission gate for a multiplex connection to the transmission gate of a called line, according to the present invention, each link is permanently assigned two time slots, one for the line finder and the other for the connector. This makes it possible, according to an aspect of the invention, to use a single time division multiplex transmission medium and a single transmission gate in each line circuit both for originating connections to line finders and terminating connections from connectors.

A further feature of the invention made possible by using separate time slots for the finder and the connector of a link resides in an arrangement in which a single coordinate array memory is used to register both calling line numbers and called line numbers, with the single array being time shared by both the finders and the connectors.

According to another feature of the invention, a common signal state register is provided which is time shared by the links.

Another feature of the invention relates to the supplying of supervisory signals from the line circuits to the common control apparatus, which comprises an arrangement for receiving on-off hook signals from the subscriber lines and transmitting them over a common lead to the control apparatus; a train of busy guarding signals is transmitted over a separate lead to the common control apparatus responsive to the enabling of the transmission gate of the line circuit.

Another principal object of the invention is to provide new and improved counting circuits for use in performing such functions as timing and sequence switching in the control circuits.

This object is achieved by a binary counting arrangement in which each binary digit is represented by a bistable device such as a flip-flop, with temporary storage means such as a delay line for controlling the setting and resetting of the flip-flops to advance the counter. Logic circuits are provided between the outputs of the flip-flops and the input of the delay line to produce a selective input condition in the delay lines in accordance with an advancing signal, logic control pulses, and the existing states of the flip-flops; and other logic circuits are interposed between the delay line output and the flip-flop inputs to supply input setting or resetting signals to predetermined ones of the flip-flops in accordance with the delay line output.

Further, according to the invention, the said counting arrangement is included in the said low-speed storage apparatus, with each bistable device being associated with a column in the low-speed memory, whereby the counting arrangement may be time shared by all of the connecting units, each in its own logic cycle.

According to another feature of the invention, one counting arrangement is used as a timer and another counting arrangement is used as a sequence circuit; and the same temporary storage devices, such as delay lines, are used at different times by both the timer and the sequence circuit.

Other features of the invention relate to various functions in the control circuits associated with the timer and sequence circuits, such as dialing supervision, changeover after each digit, and busy testing and answer supervision.

Another object of the invention is to provide a new and improved allotter for use in electronic switching systems.

According to a feature of the invention, an allotter includes a trigger which is time shared by a plurality of electronic line finders and which serves to indicate whether or not each of these line finders is in scanning condition.

In a particular embodiment of the foregoing feature, if a given line finder is idle, this trigger is set to one of its two conditions to mark this finder as being in scanning condition, and it is set in its other condition responsive to this scanning finder linking up with the calling line.

Further, according to the invention, the allotter trigger is one of the bistable devices in the low speed storage apparatus which is associated with a column in the low-speed memory, and is therefore time shared by all of the line finders.

Another feature of the invention residing in the allotter relates to an allotter trigger common to all line finders, this trigger controlling and being controlled by the scanning-indicating trigger for conditioning only one idle line finder for scanning at a time. After this finder has linked up with the calling line the allotter trigger acts to automatically allot the next idle finder in order. Another feature provides an option in accordance with which the allotter trigger and the scanning-indicating trigger are so connected that either only one idle finder scans, or all idle finders scan.

The above-mentioned and other objects and features of this invention and the manner of attaining them will become apparent and the invention itself will be best understood, by reference to the following description of an embodiment of the invention taken in conjunction with the accompanying drawings comprising FIGURES 1–27, wherein:

FIG. 1 is a single line block diagram of the entire system, with the two ferrit-core memories shown schematically;

FIGS. 2 to 6, when arranged together as shown in FIG. 25, comprise a diagram showing the interconnections of the various units, with line circuits shown by schematic and block diagrams in FIG. 2, transmission circuits shown by block diagrams in FIG. 3, the register control circuits shown by block diagrams in FIG. 4, the high-speed registers shown by block diagrams in FIG. 5, and the pulse sources shown by block diagrams in FIG. 6;

Figure 9:
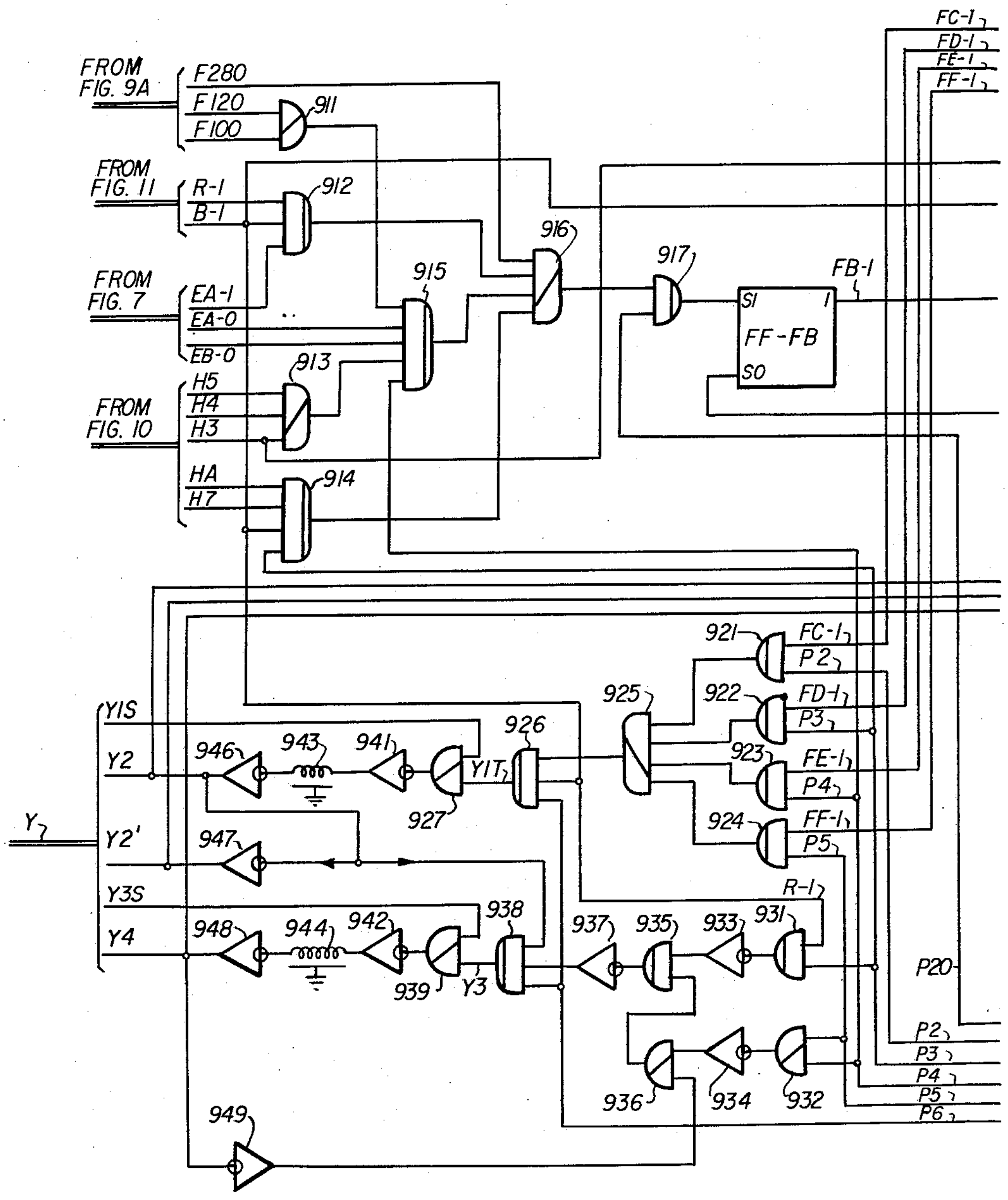
Figure 9A:
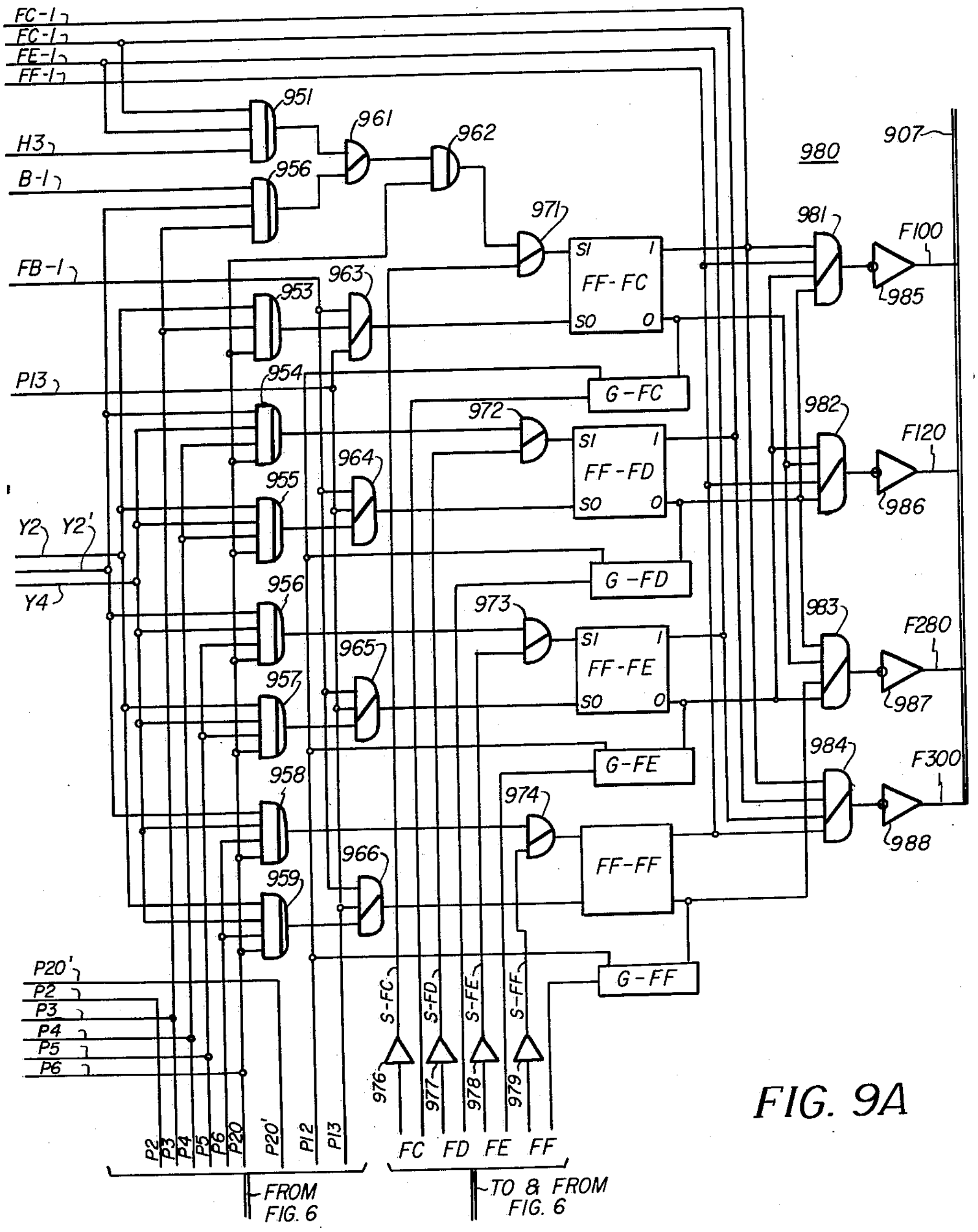
Figure 10:
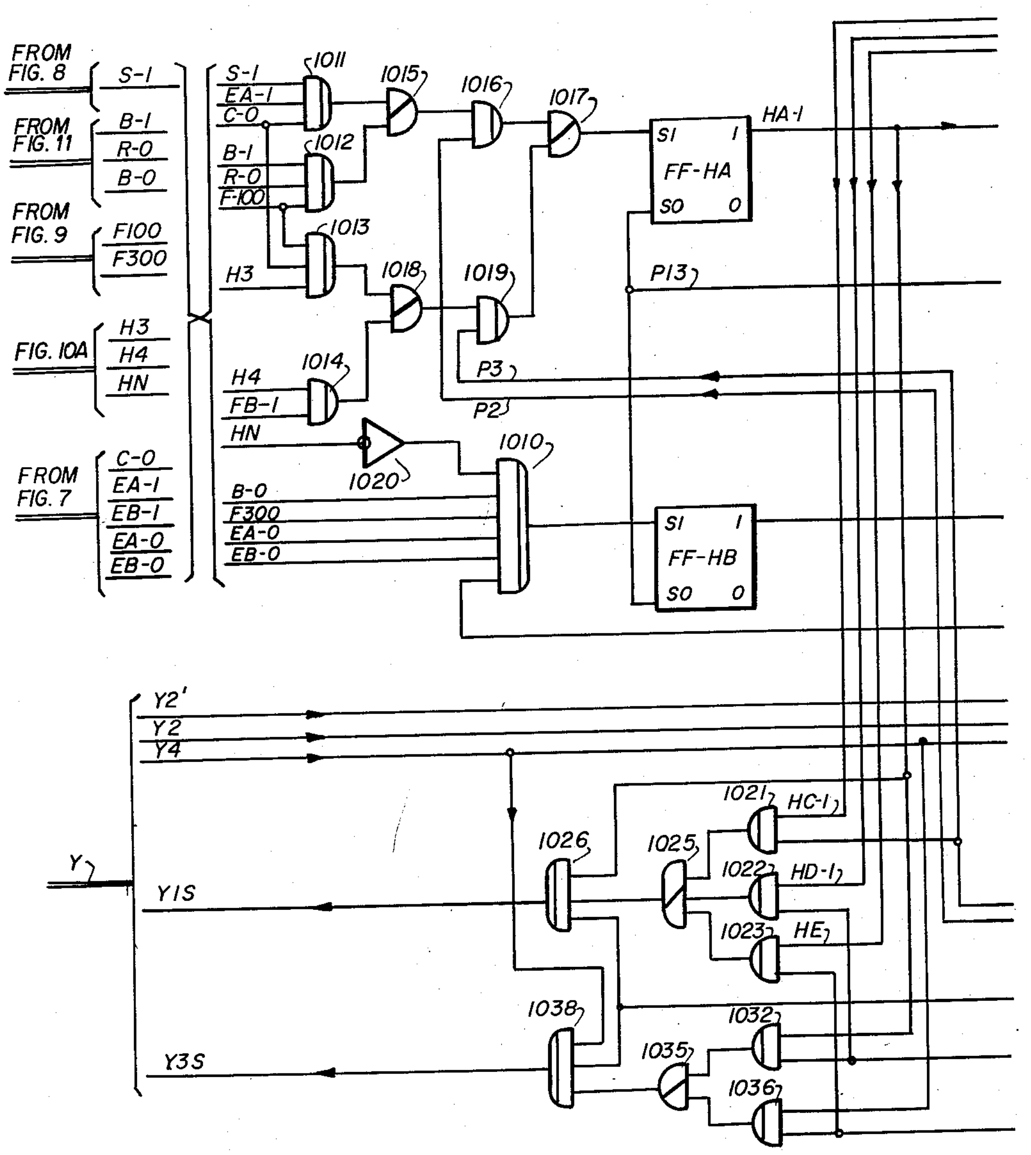
Figure 10A:
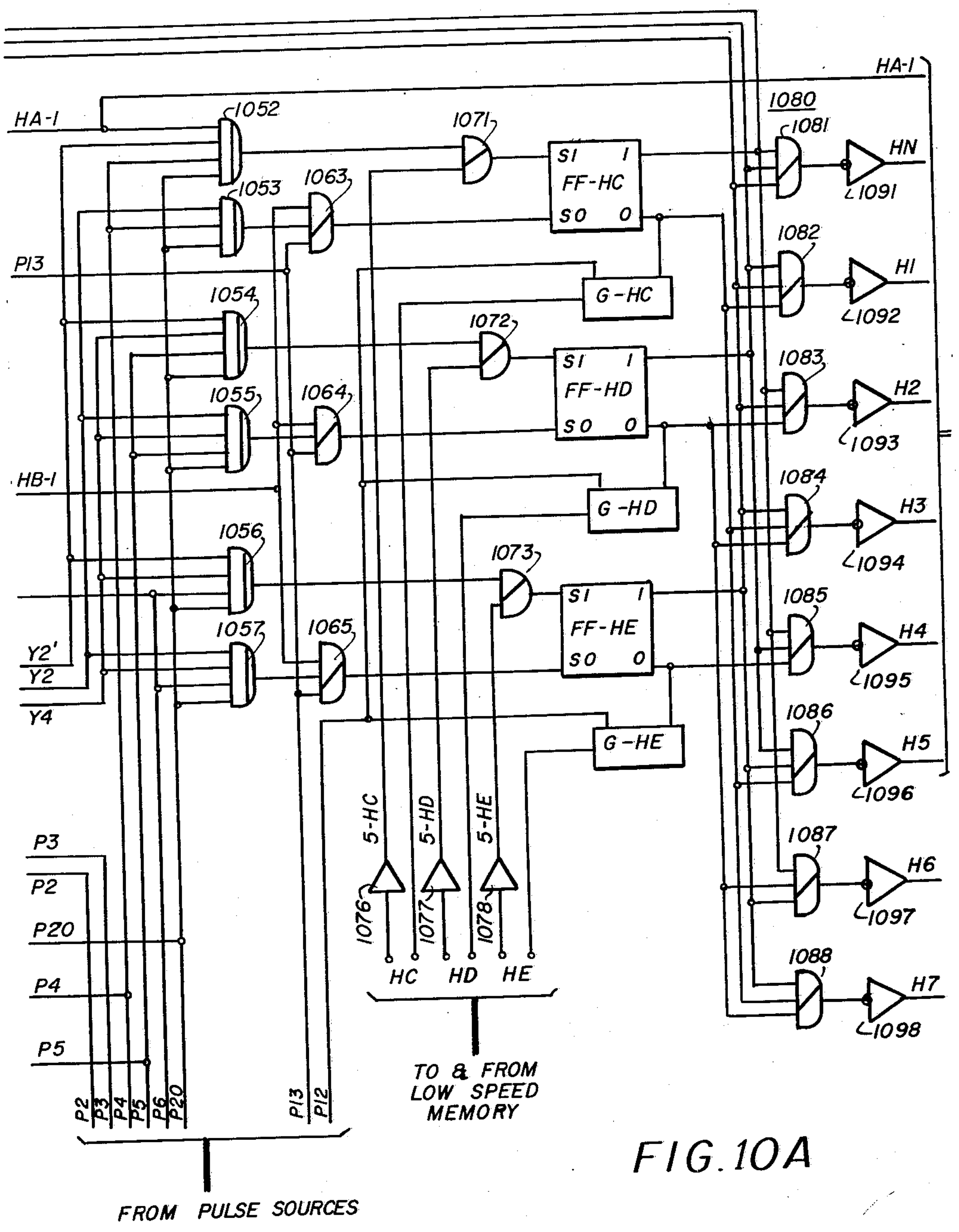
Figure 11:
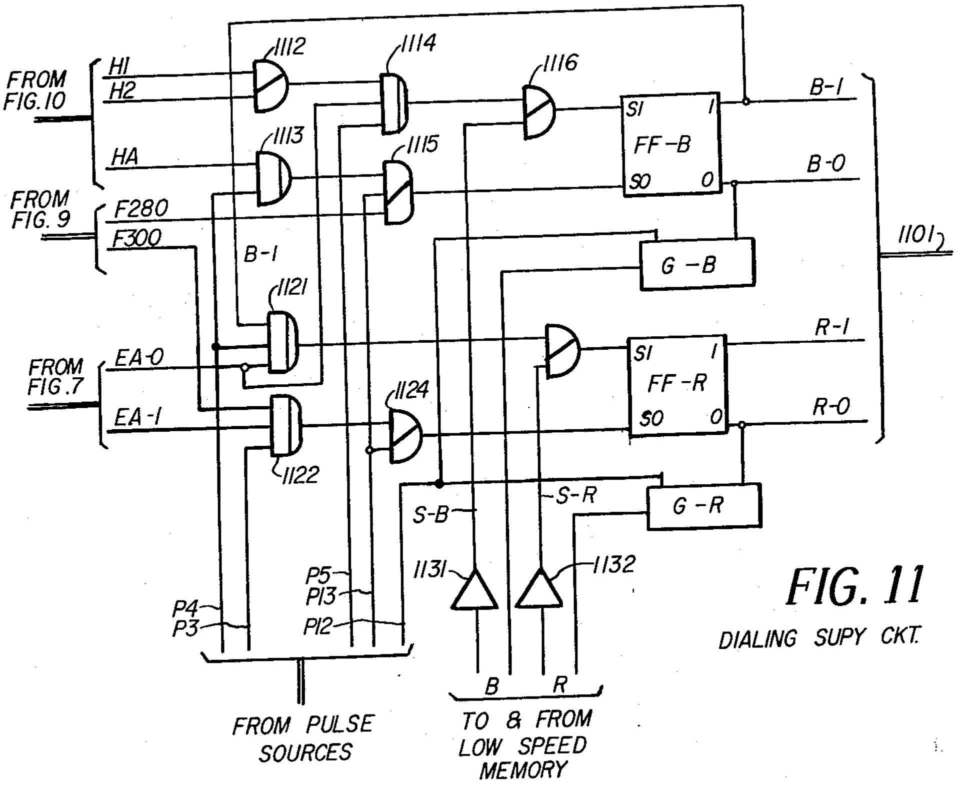
Figure 25:
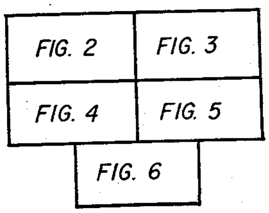
Figure 26:
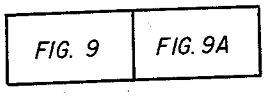
Figure 27:
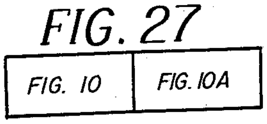
Figure 12:
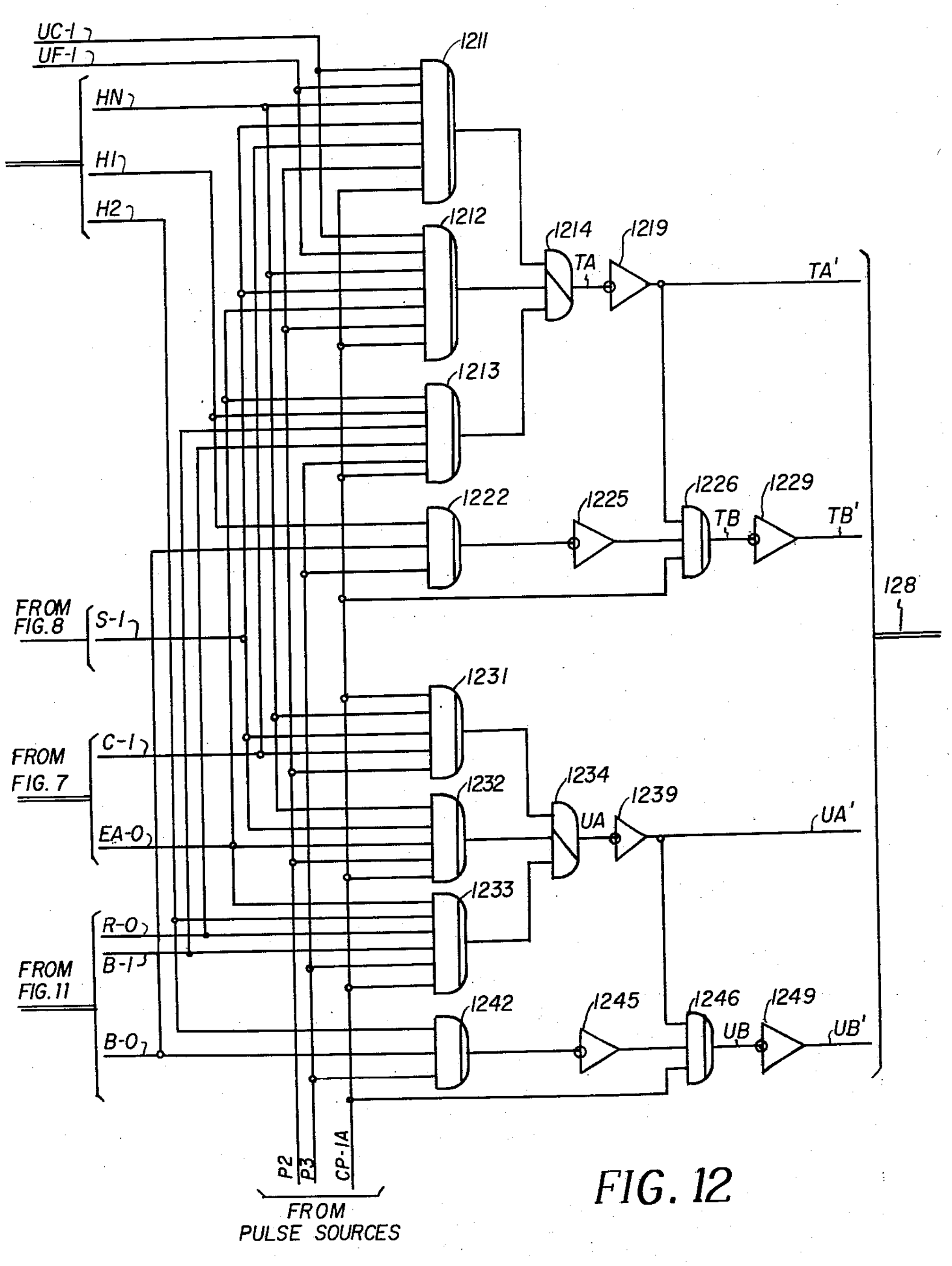
Figure 13:
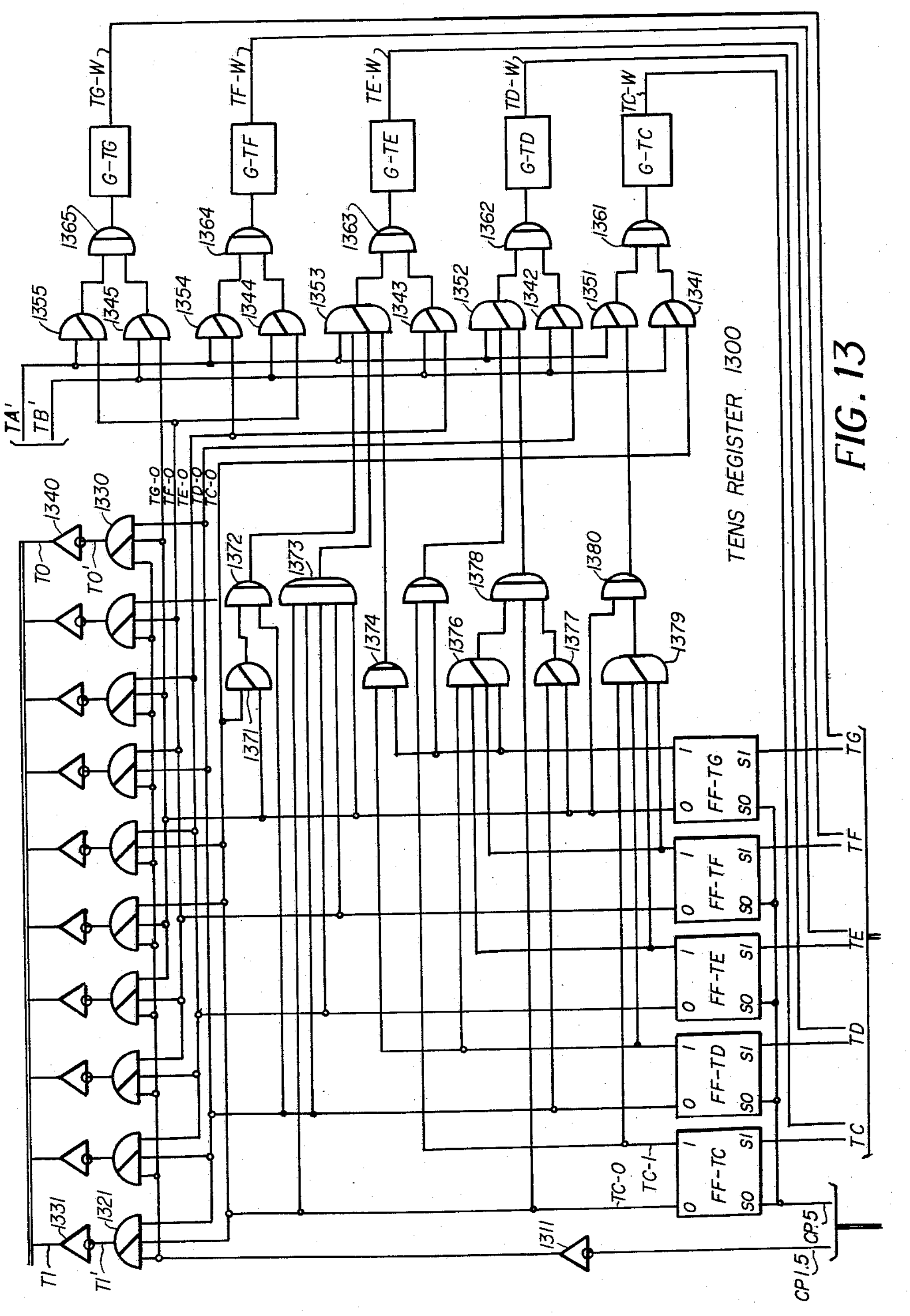
Figure 14:
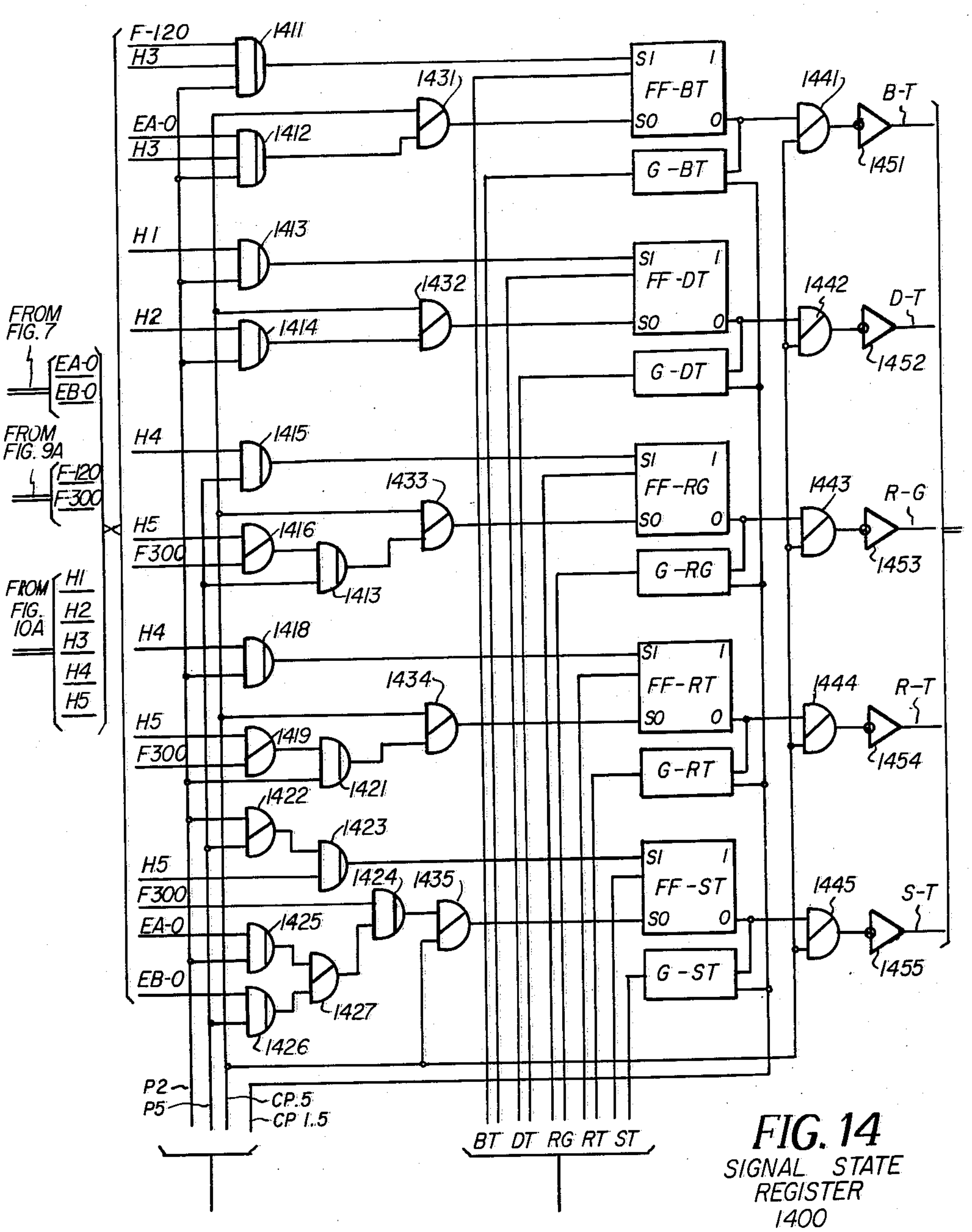
Figure 15:
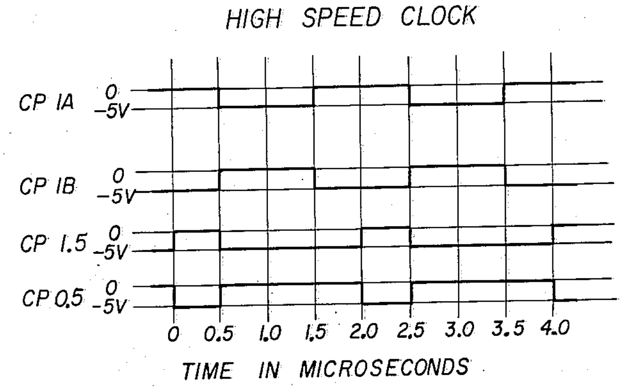
Figure 16:
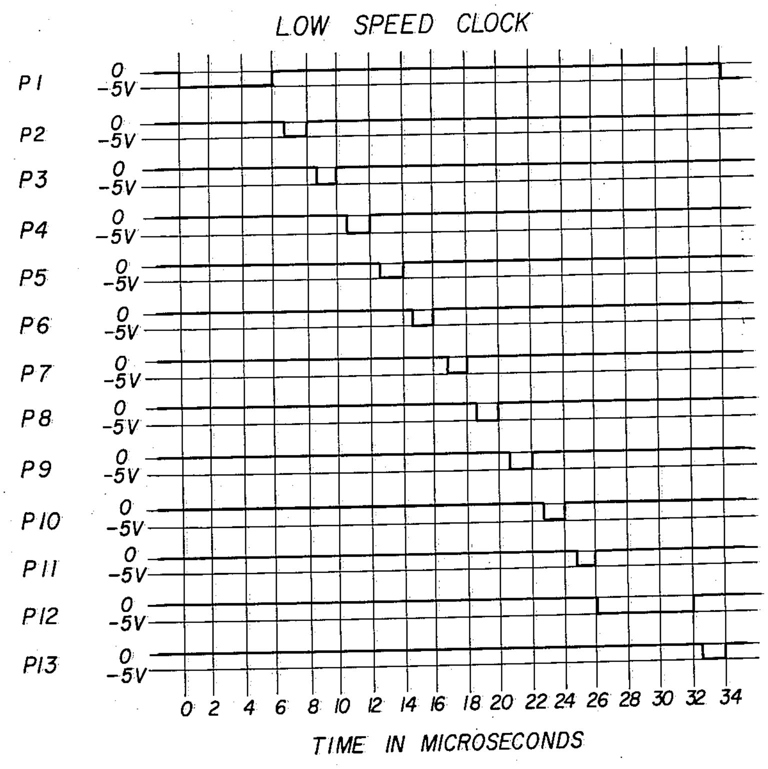
Figure 17:
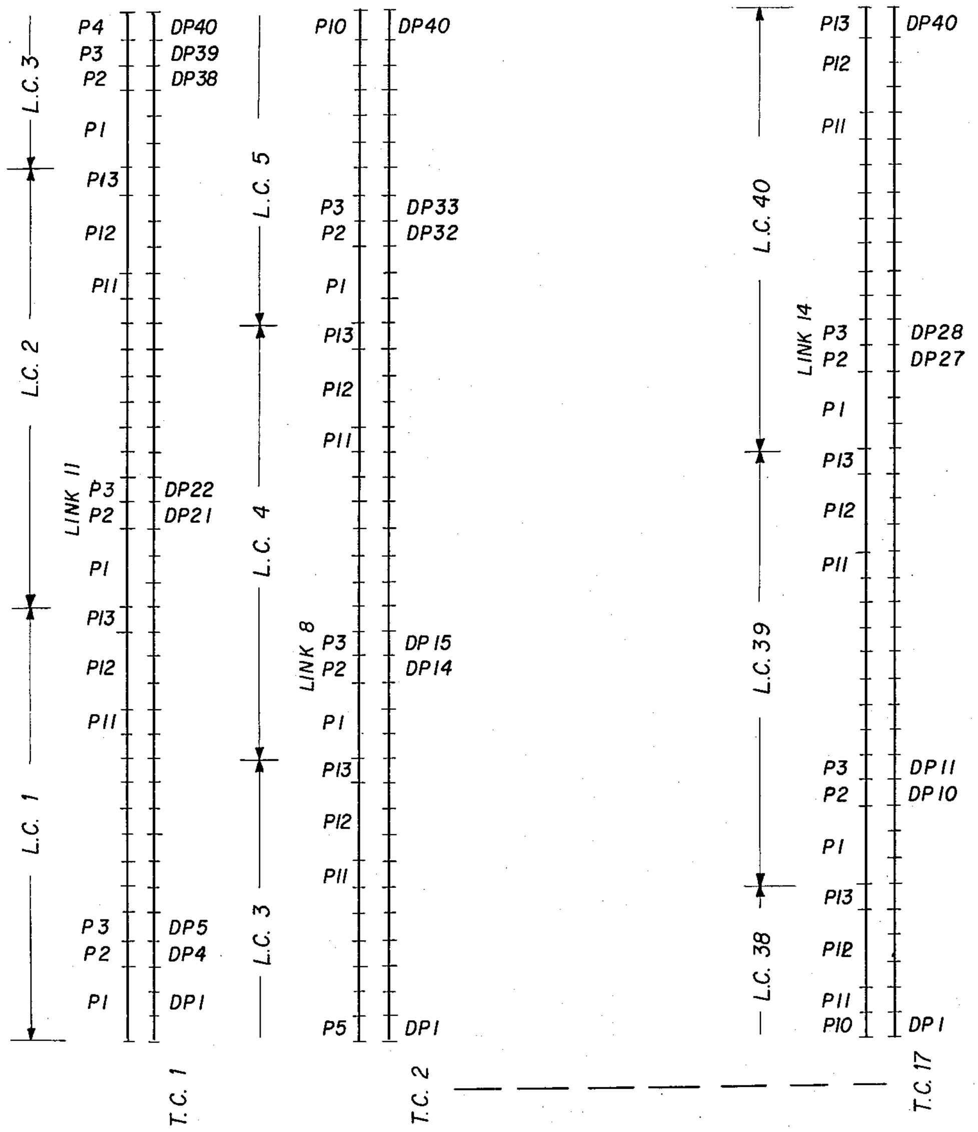
Figure 18:
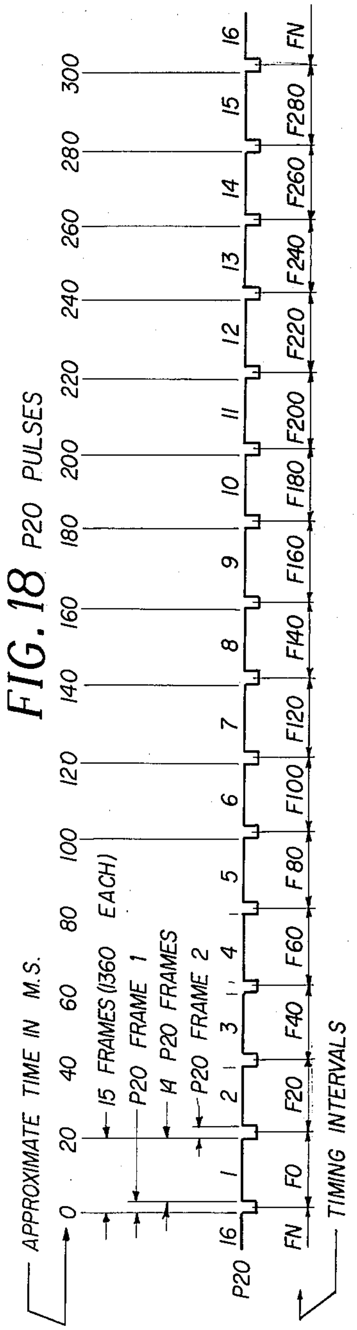
Figure 20:
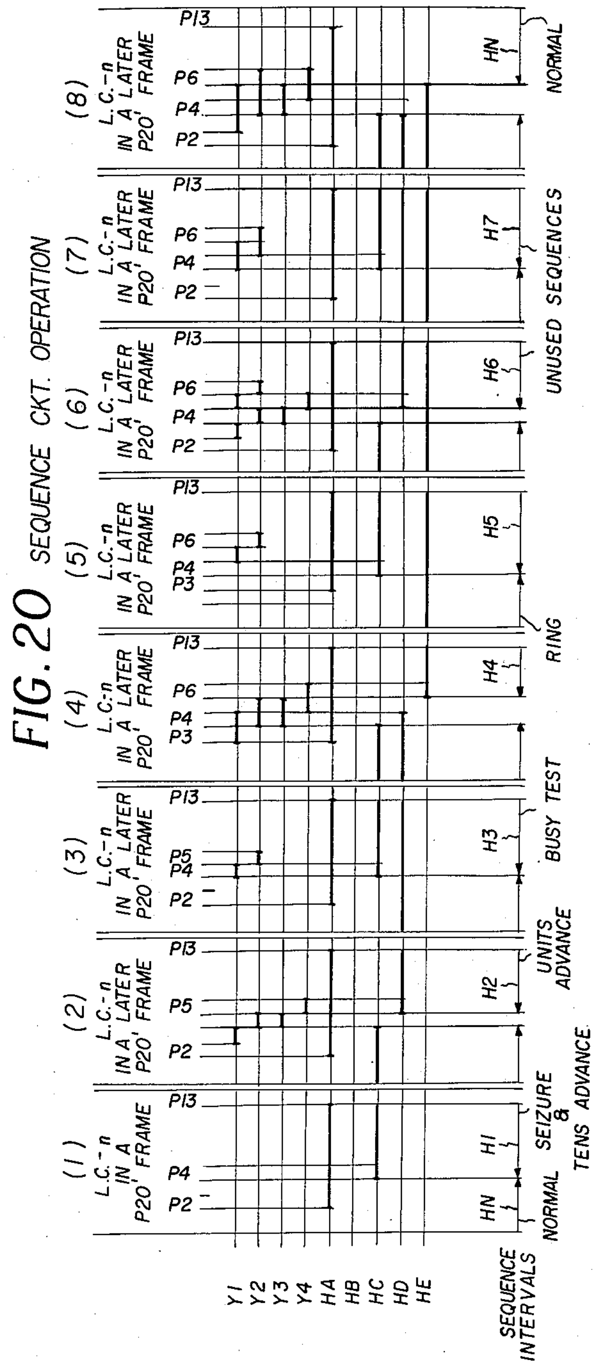
Figure 21A:
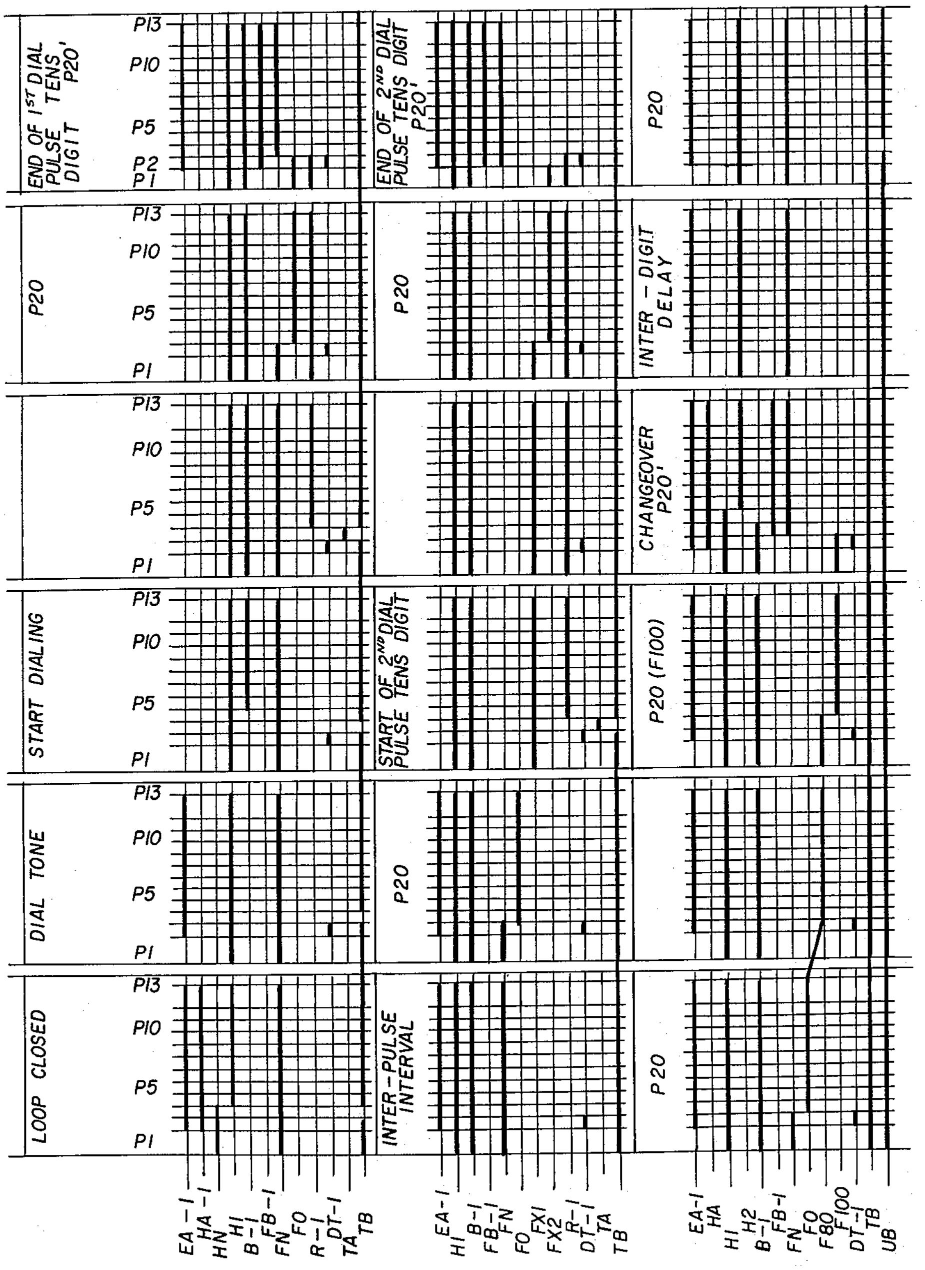
Figure 21B:
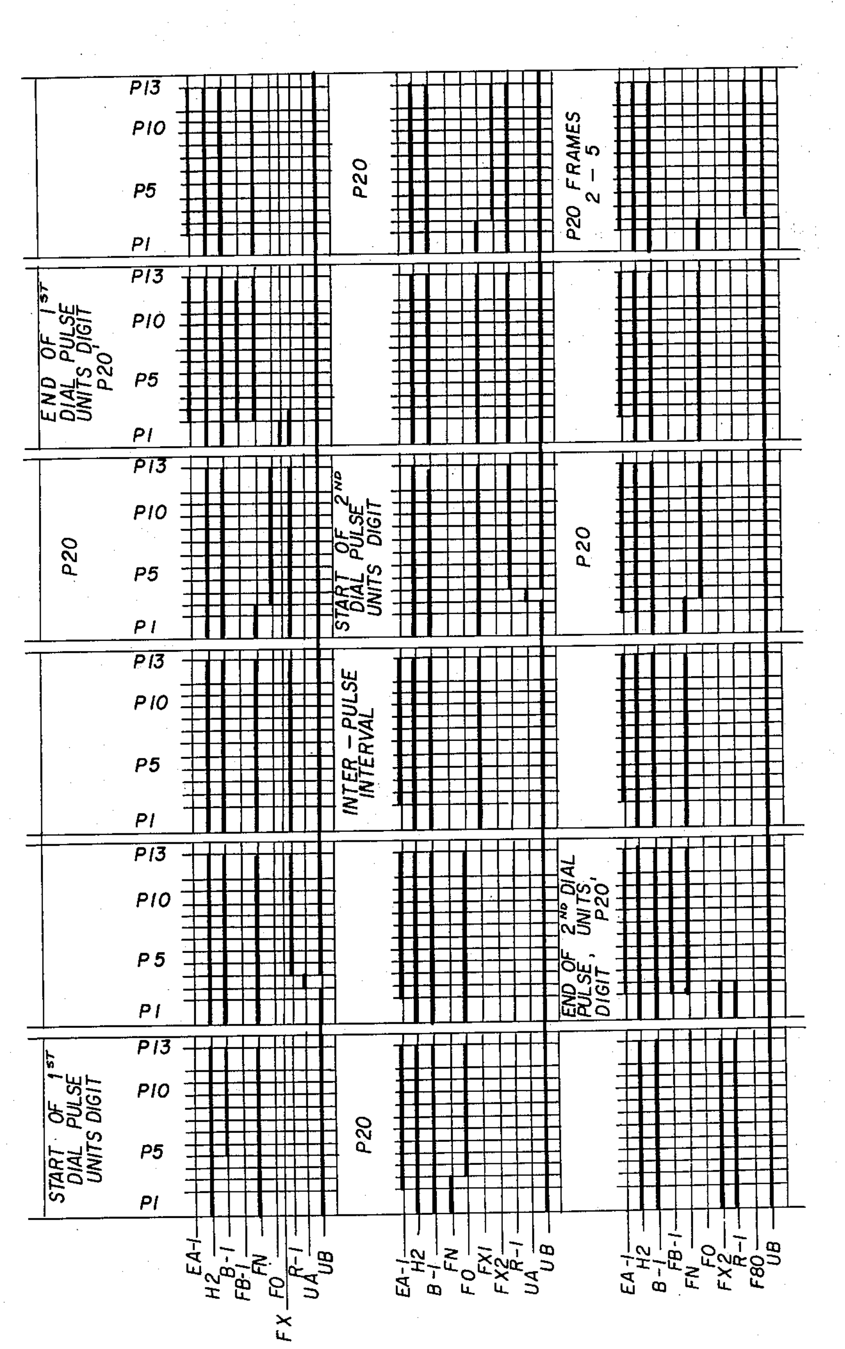
Figure 22:
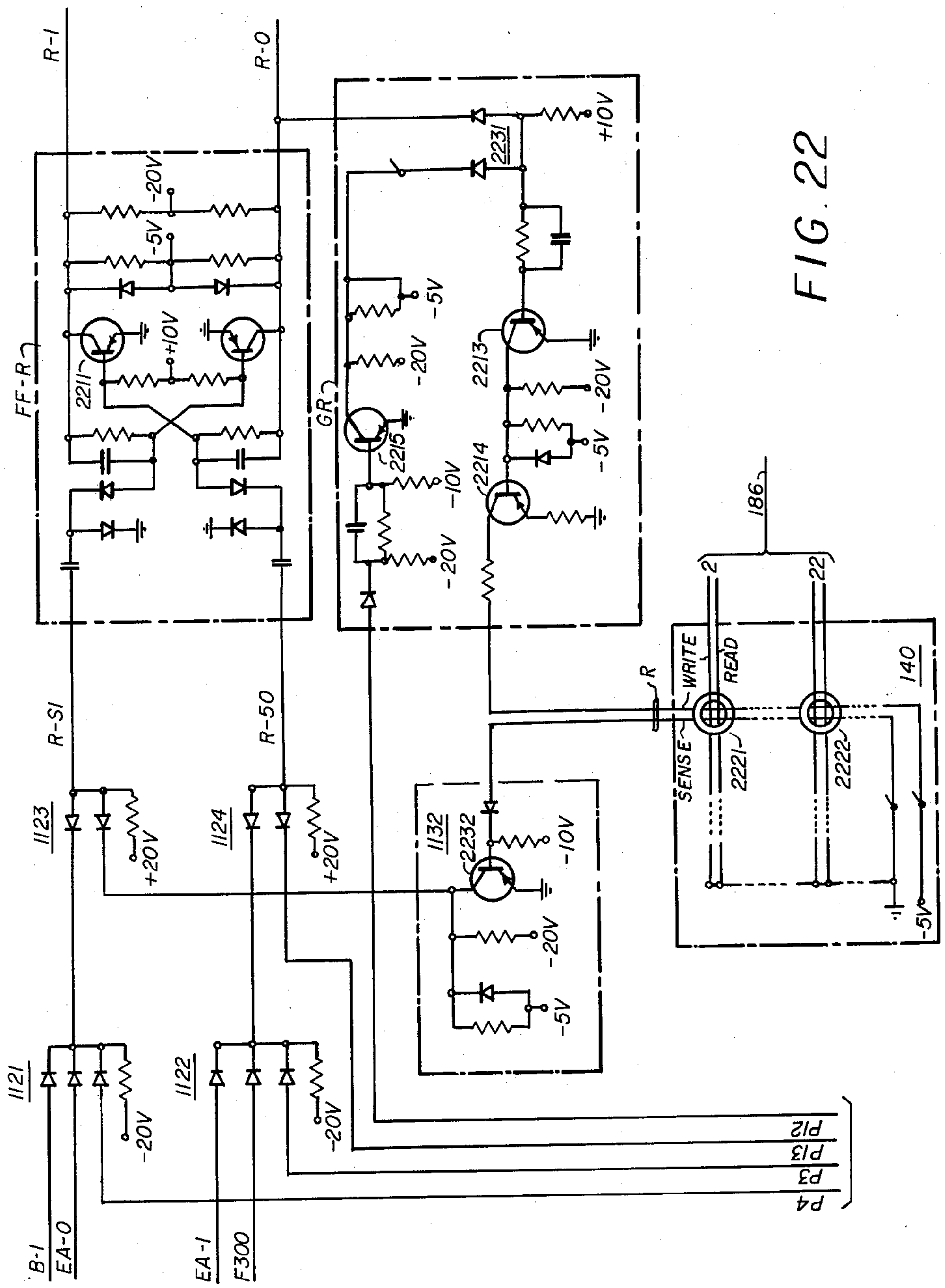
Figure 23:
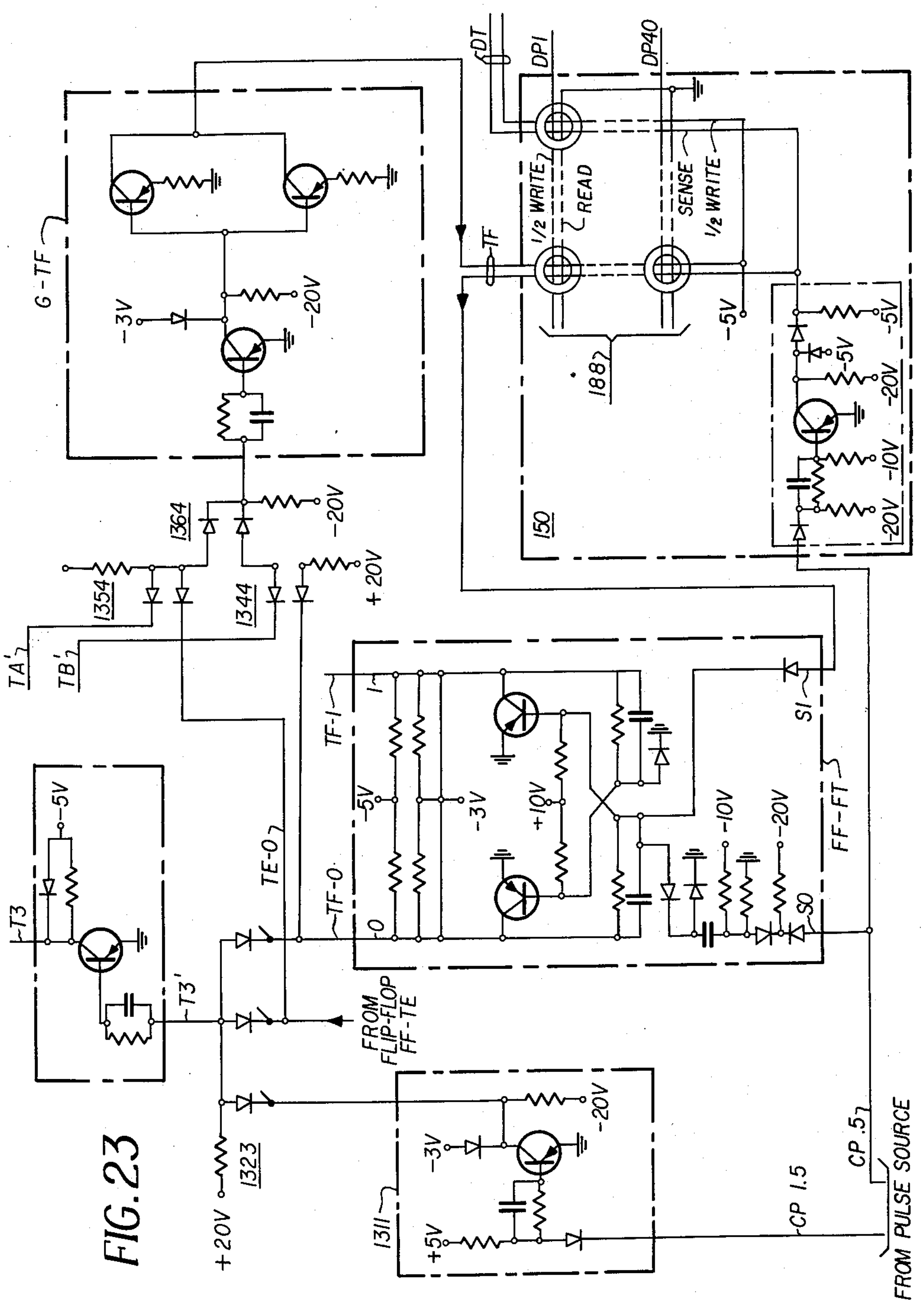
Figure 24:
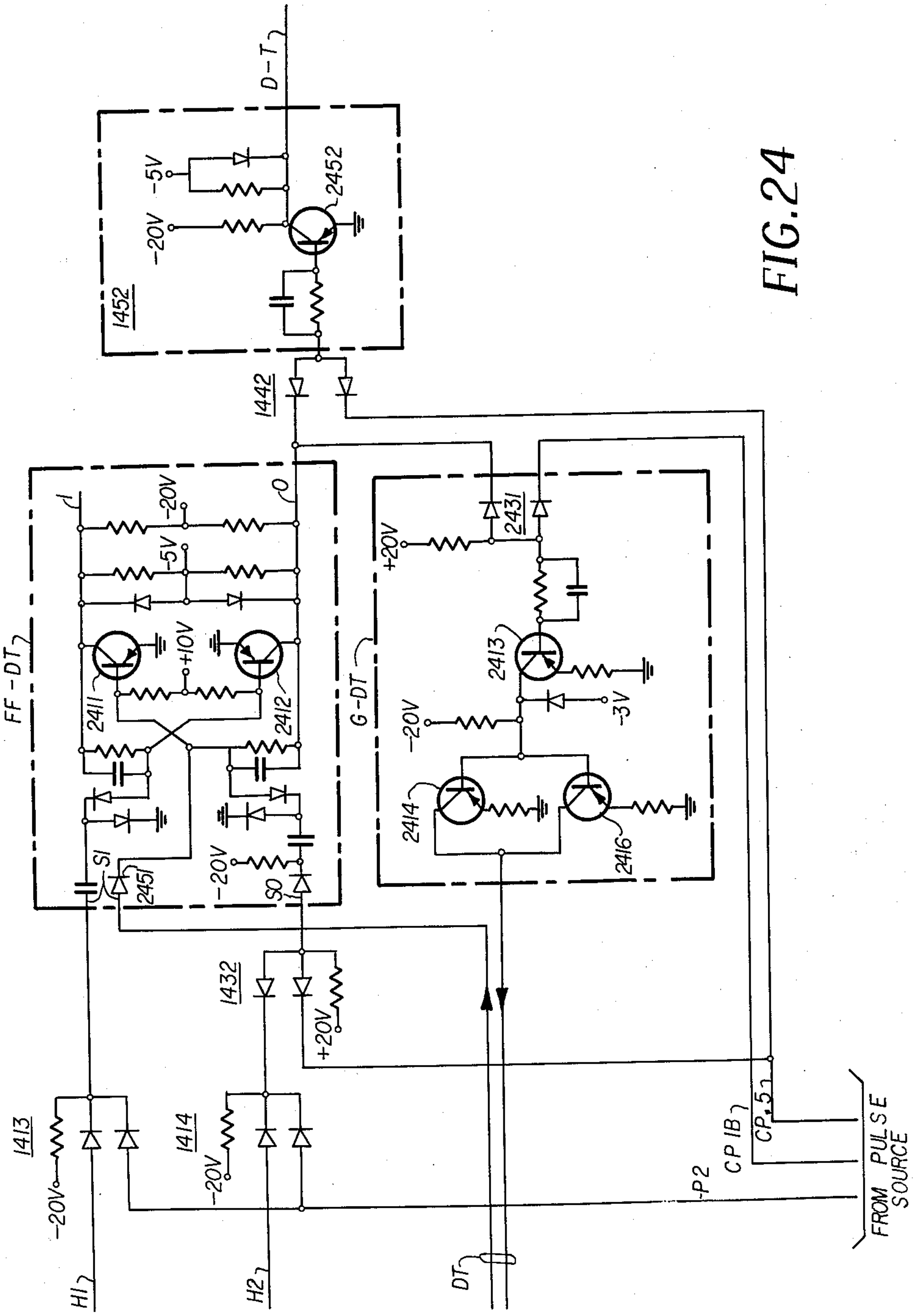

FIGS. 9 and 9*a*, when arranged together as shown in FIG. 26, comprise a functional block diagram of the timer;

FIGS. 10 and 10*a*, when arranged together as shown in FIG. 27, comprise a functional block diagram of the sequence circuit;

FIG. 11 is a functional block diagram of the dialing supervision circuit;

FIG. 12 is a functional block diagram of the line number advance circuit;

FIG. 13 is a functional block diagram of the tens register;

FIG. 14 is a functional block diagram of the signal state register;

FIG. 15 is a graph showing the output pulses of the high-speed clock;

FIG. 16 is a graph showing the output pulses of the low speed clock;

FIG. 17 is a graph showing the time relation of the high and low speed cycles;

FIGS. 18 and 19 are graphs of the timer operation;

FIG. 20 is a graph of the sequence operation;

FIGS. 21A, 21B, and 21C comprise a graph showing the connector operation;

FIGS. 22, 23, and 24 are schematic diagrams showing the details of the memory recirculation for the control register, the digit register, and the auxiliary register, respectively; and FIGS. 25, 26, and 27 show how various ones of the figures are to be arranged together.

The invention is disclosed herein as embodied in a 100-line electronic private automatic exchange, described in accordance with the following outline:

OUTLINE OF DESCRIPTION

A. General Description (FIG. 1)
B. General Interconnection Diagram (FIGS. 2–6)
  B1. Line Circuits (FIG. 2)
  B2. Link and Transmission Control Circuits (FIG. 3)
  B3. Signaling Circuits (FIG. 3)
  B4. Register Control Circuits (FIG. 4)
  B5. High Speed Registers (FIG. 5)
  B6. Pulse Sources and Definitions (FIG. 6)
C. Time Division Distribution Plan
  C1. High Speed Circuits
  C2. Low Speed Circuits
  C3. Time Relation between Low Speed and High Speed Circuits D. Detailed Description
D1. Boolean Algebra
D2. Register Control Circuits (FIG. 4)
D2*a*. Line Supervision (FIG. 7)
D2*b*. Allotter (FIG. 8)
D2*c*. Timer (FIGS. 9 and 9A)
D2*d*. Sequence Circuit (FIGS. 10 and 10A)
D2*e*. Dialing Supervision (FIG. 11)
D2*f*. Line Number Advance (FIG. 12)
D3. High Speed Registers (FIG. 5)
D3*a*. Line Number Register (FIG. 13)
D3*b*. Signal State Register (FIG. 14)
E. Operation
E1. Transmission
E2. Operation
E2*a*. Line Finder Action
E2*b*. Connector Action
E2*b*1. Seizure
E2*b*2. Tens Digit Dialed
E2*b*3. Units Digit Dialed
E2*b*4. Called Line Busy
E2*b*5. Called Line Idle—Ringing
E2*b*6. Answer and Conversation
E2*b*7. Disconnect
F. Circuit Details
F1. Registration and Circulation in Low Speed Circuit (FIG. 22)
F2. Line Number Registration and Circulation (FIG. 23)
F3. Signal State Registration and Circulation (FIG. 24)

Figure 1:
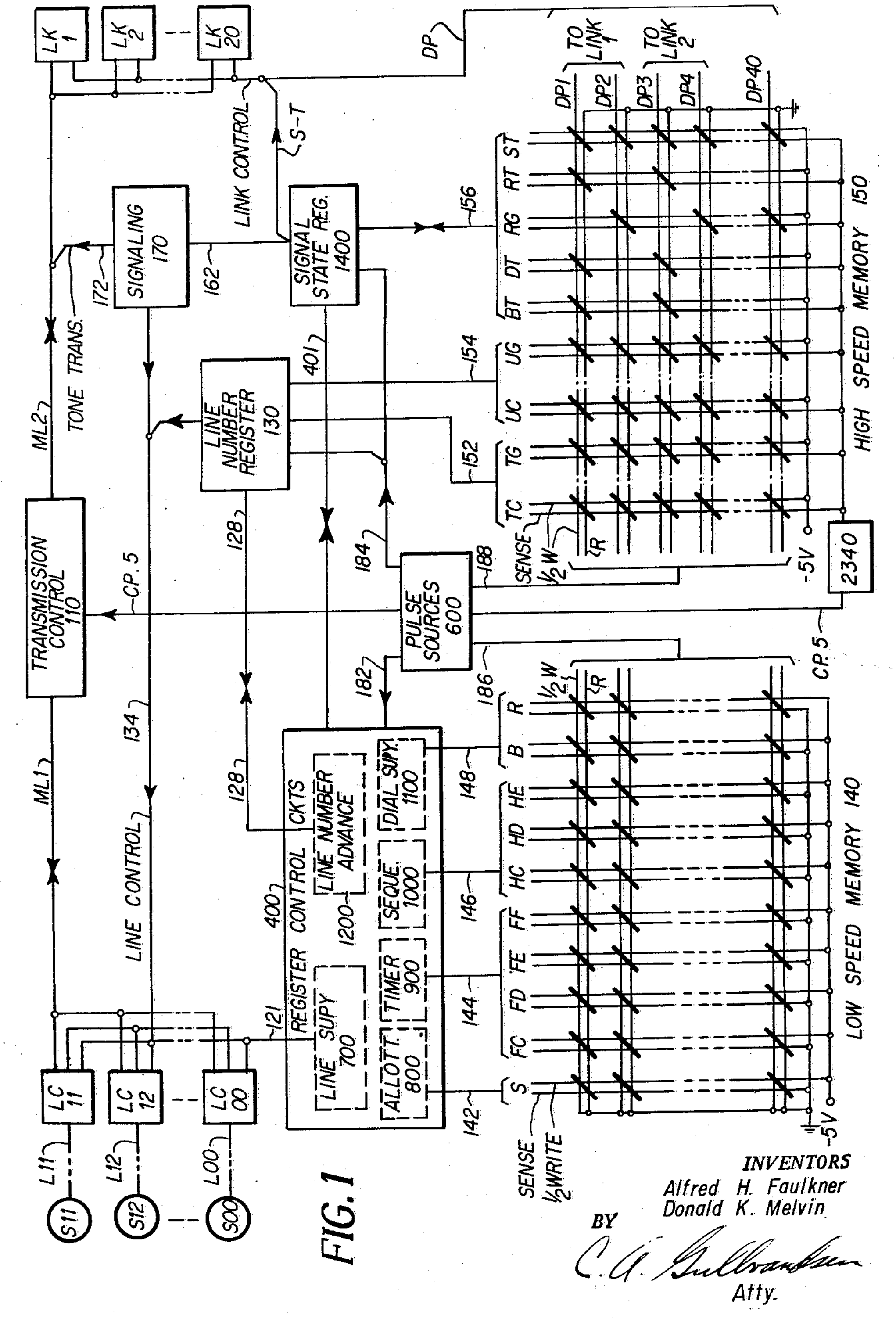

A. *General description* (*FIG. 1*)

Referring to FIG. 1, the exchange includes 100-line circuits LC11 to LC00 associated with stations S11 to S00, and a plurality of link circuits LK1 to LK20 interconnected by a time division multiplex transmission highway ML1—ML2 having a transmission control unit 110 interposed therein. Any two line circuits may be effectively connected through any link circuit by selectively supplying control pulses to them.

The signaling circuits 170 supply supervisory tones which are transmitted by time division multiplex over line 172 and the highway ML1—ML2 to the line circuits of calling lines. The signaling circuits 170 also supply ringing control signals over conductors in the control line 134 to the line circuits of called lines.

The function of remembering which circuits are interconnected on a time division multiplex basis over highway ML1—ML2 and of supplying control pulses to the selected transmission gates in the appropriate time slots is performed by a high-speed memory 150 in conjunction with a line number register 130 and a signal state register 1400. The control pulses are supplied to the line circuits over line 134, to the link circuits over lines DP and S—T, and to the signaling circuits over line 162.

The selective registration in the high-speed memory through the line number register 130 and the signal state register 1400 is controlled by the register control circuits 400. These circuits 400 control the line-finding function of scanning to find a line which has initiated a call and causing a connection to be established to the calling line; and the connector function of detecting dial pulses from the calling line and causing a connection to be established to the called line. These control circuits 400 are shared by all of the links on a time division basis, using a low-speed memory 140 for storage.

The pulse sources 600 comprise pulse generators and distributors for supplying all of the pulses required by the exchange.

Each of the memories 140 and 150 comprises a coordinate array of ferrite cores. In each, the horizontal rows are associated with the links, and the vertical columns are associated with flip-flop type storage devices in the associated units 400, 130, and 1400. Each memory is associated with a separate pulse distributor in the pulse sources 600 to supply pulses to its horizontal conductors in turn. Each horizontal row has a read winding and a ½-write winding threaded through all of the cores of the row, and each vertical column has a sense winding and a ½-write winding. For each of the memories, during each stage of its distributor, a read pulse is supplied through the read winding of the row, causing the state of each core of the row to be transferred by means of the sense windings to the flip-flops. The information in the flip-flops is then utilized and possibly altered by the associated circuitry. A ½-write pulse is applied to the horizontal winding, and coincidently to selected ones of the vertical windings to return the information from the flip-flops to the cores. This is repeated, in turn, for each horizontal row during successive stages of the distributor. The high-speed memory comprises cores in five columns TC to TG for registering the tens digit, five columns UC to UG for registering the units digit, and five columns BT, DT, RG, RT, and ST for registering the signal states. Each horizontal row is associated with one time slot of the multiplex transmission. Each stage of the distributor comprises a 0.5-microsecond read pulse followed by a 1.5-microsecond ½-write pulse in a 2-microsecond time slot. The horizontal ½-write windings are connected at one end to the distributor and at the other end over line DP to the link circuits for transmission control. The ½-write windings of the first two rows are connected over leads DP1 and DP2 to link 1 to control the calling party and called party transmission respectively. Successive pairs of horizontal rows are in like manner coupled to successive links, so that each link is permanently associated with two high-speed memory rows corresponding to two transmission time slots, one for the calling party and the other for the called party. Also, during each of the 1.5-microsecond pulse intervals, the line number register 130 translates the two-out-of-five code registration of the tens digit to a one-out-of-ten code signal supplied to a conductor in line 134, and the two-out-of-five code of the units digit is translated to a one-out-of-ten code signal supplied to another conductor of line 134, to control the transmission in the line circuit corresponding to this number. At the same time, the signal state register 1400 controls the transmission of supervisory tones to the calling line ringing to the called line, and switch-through of the link transmission gates, as required.

In the register control circuit 400, the line supervisory circuit 700 receives hookswitch and line-busy information from the line circuits and registers this information in flip-flops for use by the other circuits. The allotter circuit 800 assigns a scanning link to a line which initiates a call. The allotter is associated with the cores in column S of the low-speed memory 140 to register whether or not a link is scanning. The timer circuit 900 times the dialing and other hookswitch signals to determine when the sequence state should be changed. The timer uses the cores in columns FC, FD, FE, and FF to register the time interval on a binary basis, separately for each link. The sequence circuit 1000 registers the sequence states of the links, which are: normal, tens dialing, units dialing, busy test, ringing, and conversation. The sequence circuit uses the cores in columns HC, HD, and HE to register these states on a binary basis for each link. The dialing supervisory circuit 1100 is provided to insure that the control circuits do not respond more than once to each dial pulse. This circut uses the cores in columns B and R, column B being set for the duration of a digit, and R being set only for the duration of a dial pulse. The line-number-advance circuit 1200 supplies advance or rewrite signals to the line number register 130 to control the number registration in the high-speed memory 150.

B. *General interconnection diagram* (*FIGS. 2–6*)

FIGS. 2–6, inclusive, when arranged together as shown in FIG. 25, comprise a diagram showing the interconnections of all of the units of the system.

Figure 2:
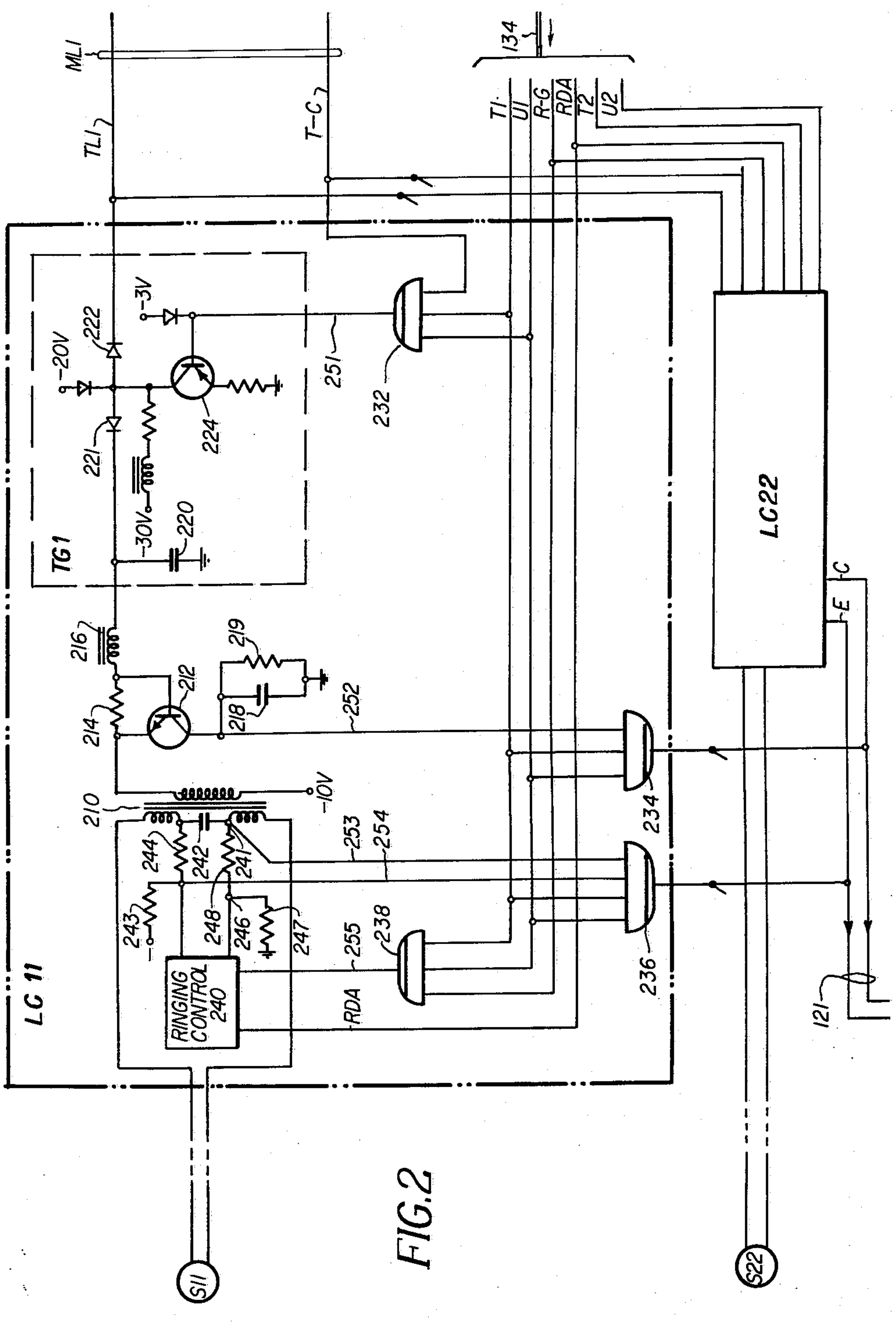

B1. *Line circuits* (*FIG. 2*)

Two of the 100-line circuits are shown in FIG. 2, with one, LC11, shown by a schematic and functional block diagram, and the other, LC22, shown as a single block. These line circuits are connected by subscriber lines to their respective stations S11 and S22, in multiple to the multiplex transmission line ML1, to conductors of the control line 134, and in multiple to the line supervision conductors 121. Referring to the connections to the control line 134, the line number pulses are supplied to line circuit LC11 on conductors T1 and U1, and to circuit LC22 on conductors T2 and U2; while for ringing control both line circuits are connected to conductors RG and RDA.

Each line circuit may be considered in two parts, one part relates principally to signaling and supervision circuits, and includes the circuits connected to the subscriber side of transformer 210, along with gates 234, 236, and 238; and the other part relating principally to the audio to multiplex coupling comprises the circuit connected between transformer 210 and the multiplex line ML1 along with gate 232. All of the gates 232, 234, 236, and 238 are controlled by signals from the line number register 130 (FIG. 5) so that they may be activated to produce output signals in the true condition only when there is coincidence on the two line number conductors, which, for line circuit 11, are T1 and U1. Only one line circuit may be so activated during each two-microsecond time slot.

It has become conventional in electronic telephone systems to supply direct current for the station through resistance devices coupled to the subscriber line in the line circuit, and to use the variation in voltage drop in this resistance for hookswitch supervision. Here, the negative terminal of the direct-current source is connected through resistors 243 and 244 and a winding section of transformer 210 to one of the subscriber line wires, and the grounded positive terminal is connected through resistors 247 and 248 on another winding section of the transformer to the other line wire. To bypass the resistors and direct-current source, a capacitor 242 having low impedance at voice frequencies is connected between the two winding sections of the transformer. Conductors 253 and 254 are connected from junction points 241 and 245, respectively, of the resistors to control the hookswitch supervision gate 236. The conductor 254 is connected to the negative supply side and therefore is normally in a true condition except during ringing. The signal on conductor 253 follows the hookswitch and dial pulse signals to permit pulses to be transmitted to lead E when the line loop is closed, and to interrupt this train of pulses when the line loop opens.

When the line circuit is in use, the capacitor 218 becomes charged and supplies a negative potential to conductor 252, thereby enabling gate 234 to supply a train of pulses to lead C to mark the line busy. The busy-mark-enabling signal on lead 252 continues throughout dialing.

To ring the substation S11, coincident pulses are applied to leads RG, T1, and U1 to enable gate 238 and apply pulses over its output lead 255 to the ringing control unit 240. An interrupter voltage is applied over lead RDA. The ringing control unit 240 responds to these signals to apply a ringing signal to the points 245 and 246 of the direct current feeding resistance network, causing a current to flow over the subscriber line to operate a tone ringer (not shown) of the substation S11. The current flow during the ringing signal causes a signal on lead 253 which looks like an off-hook supervisory signal. A ground potential is applied to the lead 254 to block the gate 236 during this ringing interval. However, the interrupter voltage on lead RDA is on for two seconds and off for four seconds, and during the off period the potential on lead 254 returns to the normal negative value so that gate 236 may respond to the hookswitch signal when the subscriber answers.

Voice frequency signals at the transformer 210 are coupled through an impedance converter 212 and a filter which includes inductor 216 to a multiplex transmission gate TG1 which is controlled by pulses from gate 232. The transmission gates of all of the line circuits are connected in common to the end ML1 of the multiplex transmission line.

Figure 3:
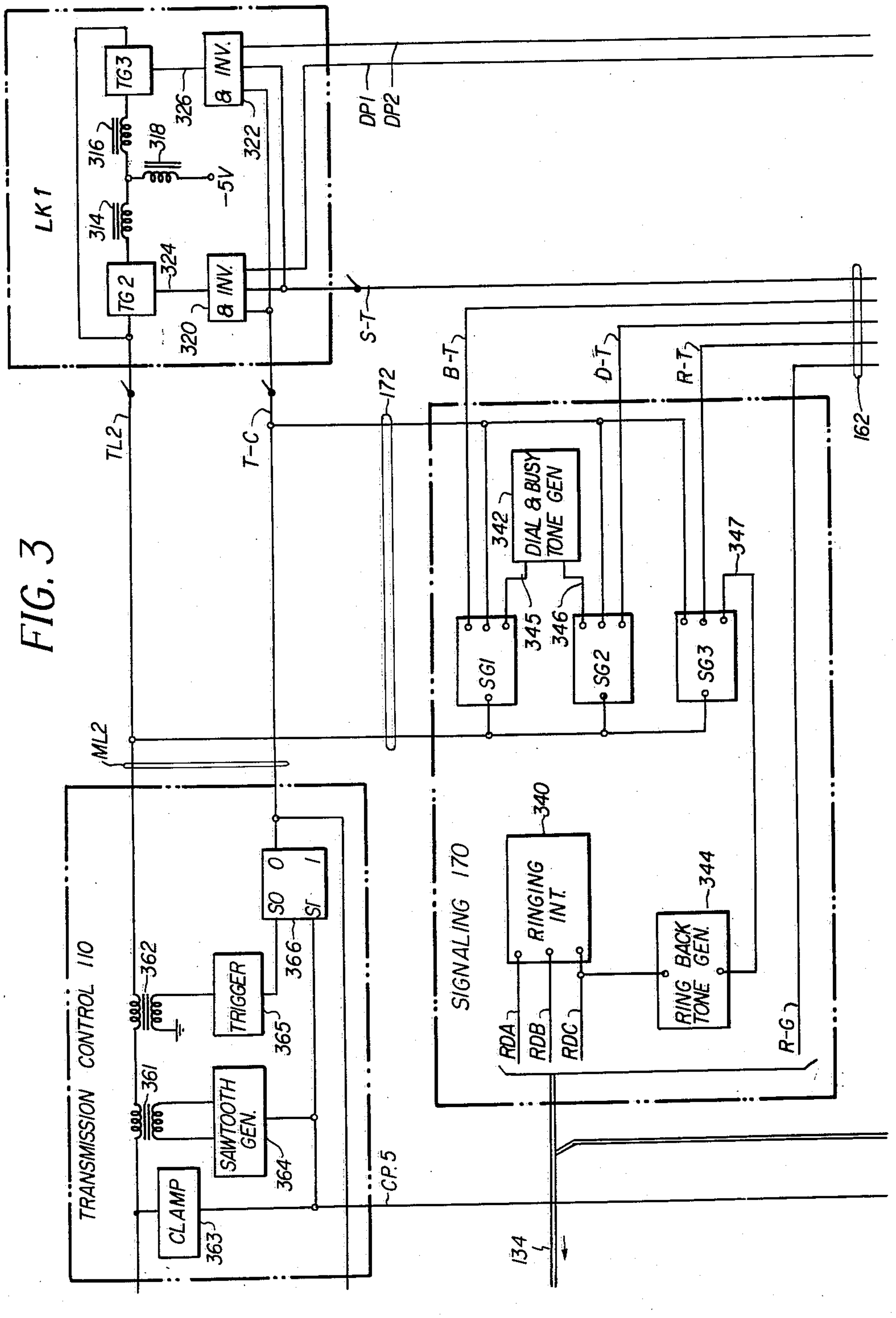

B2. *Link and transmission control circuits* (*FIG. 3*)

Figure 4:
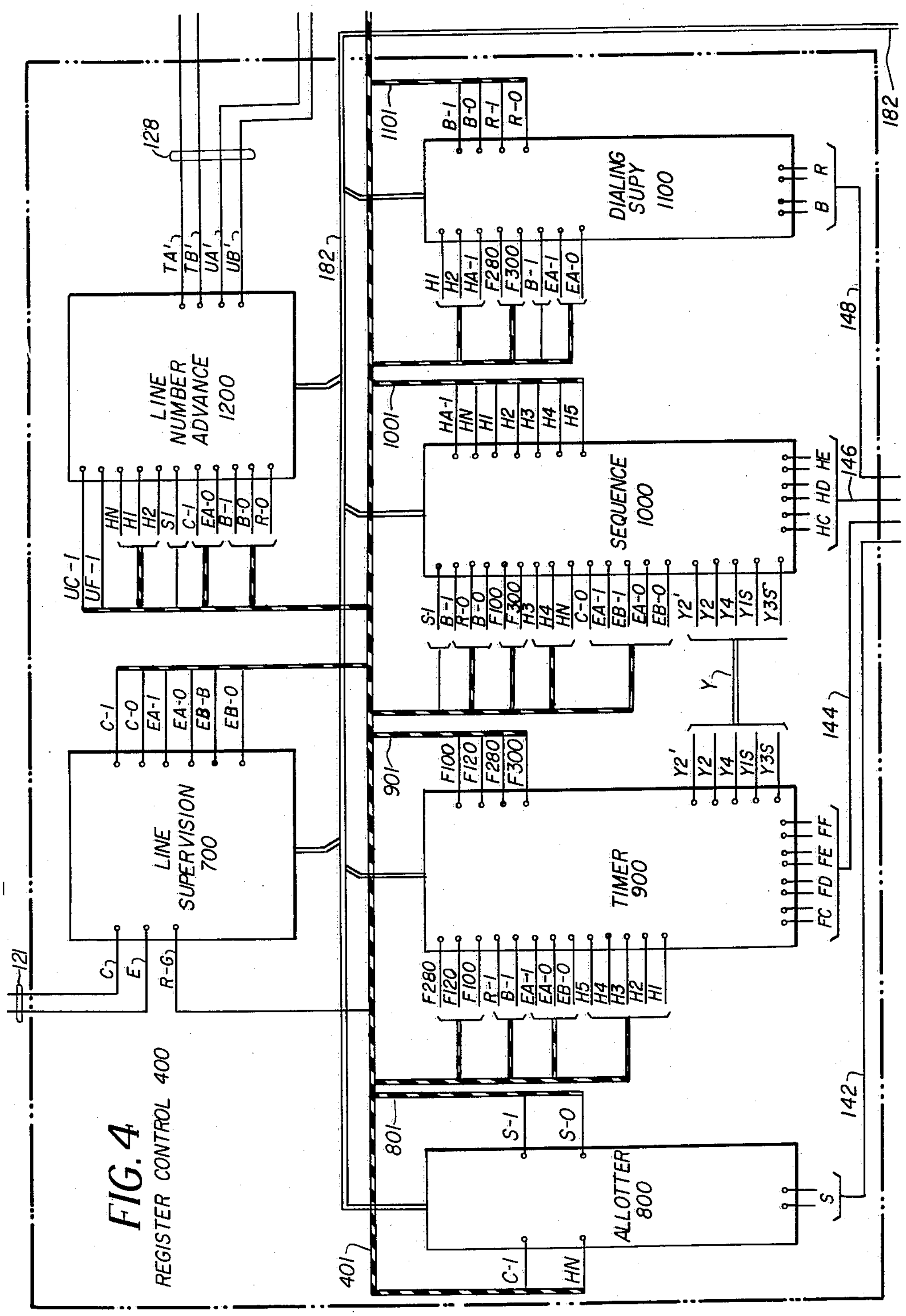
Figure 5:
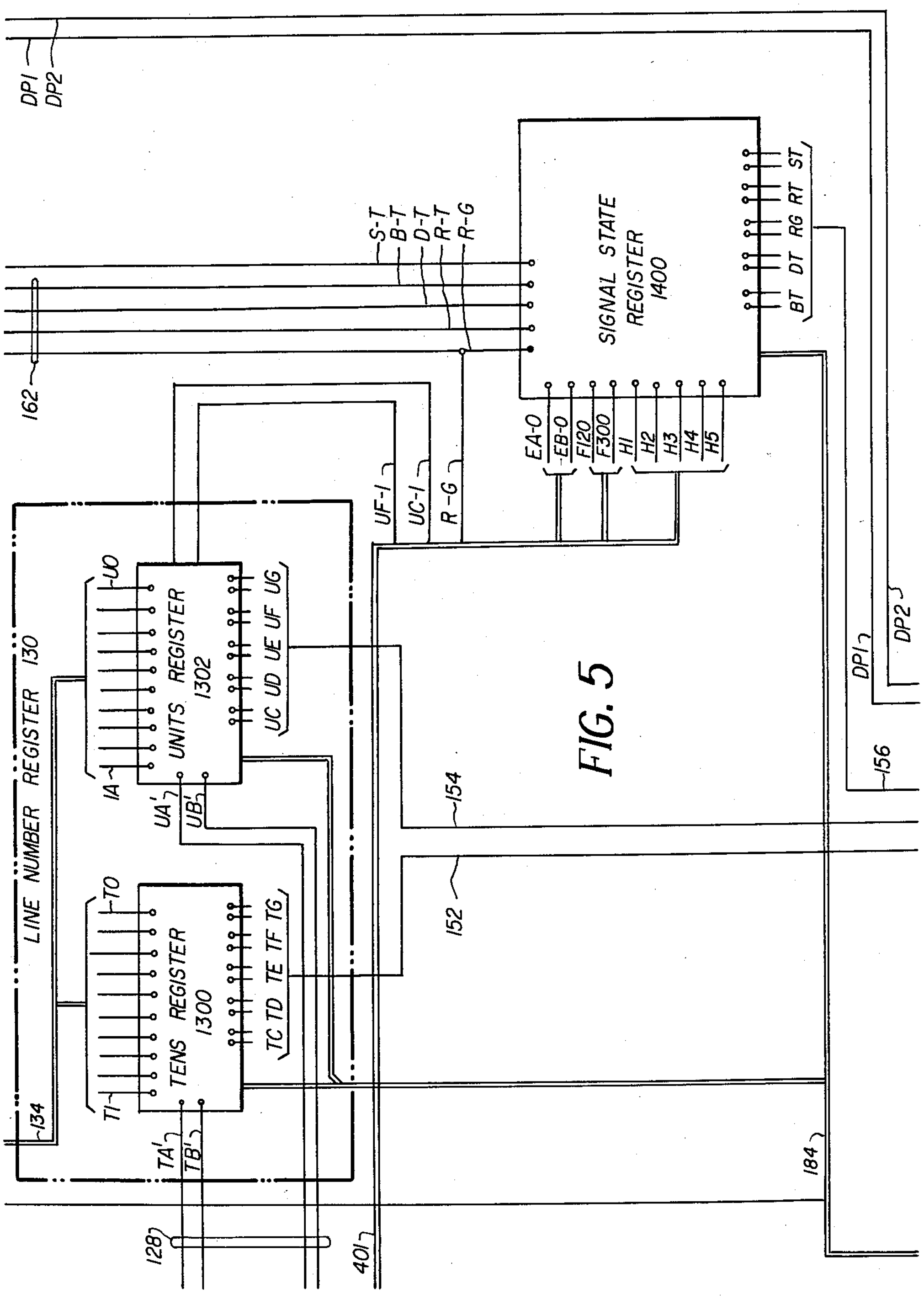

Each of the link circuits includes only the circuitry required for multiplex transmission; the register, line finding, dialing, and other switching control circuitry shown in FIGS. 4 and 5 being shared on a time division multiplex basis by all of the links, with storage in the two memories 140 and 150. One of the link circuits, LK1, is shown in FIG. 3. It comprises two multiplex transmission gates TG2 and TG3, for multiplex connections to the calling and called lines, respectively. These gates are coupled at voice frequency through inductors 314 and 316, with direct-current bias supplied through an inductor 318. The calling line transmission gate TG2 is controlled by pulses on lead DP1 supplied through gate 320; and the called line transmission gate is controlled by pulses on DP2 supplied through gate 322, when coincident pulses are supplied over the switch-through conductor S–T. These gate circuits 320 and 322 are of a special type which produce inverted output pulses when all three inputs are true.

A transmission control unit 110, which is inserted in the multiplex line ML1–ML2 includes a clamp circuit 363, a sawtooth generator 364, a trigger circuit 365, and a flip-flop 366. The sawtooth generator and the trigger circuit are connected respectively by transformers 361 and 362 in series with the common highway conductor TL1–TL2. The clamp circuit 363 is provided to reduce cross talk. The sawtooth generator 364, trigger 365, and flip-flop 366 along with a control conductor T–C extending from the flip-flop 366 in multiple to all of the transmission gates in the line and link circuits are used in controlling the multiplex pulses in each time slot, as explained in section E1.

B3. *Signaling circuits* (*FIG. 3*)

The signaling unit 170 includes three signaling gates SG1, SG2, and SG3 for supplying supervisory tones over the multiplex highway to the calling lines. Each of these signaling gates is essentially similar to one half of a link circuit, in that it includes a transmission gate (not shown) similar to the gate TG2, an inverting AND gate (not shown) similar to the gate 320 for supplying pulses to the transmission gate, and a network (not shown) for coupling the input tone and direct-current bias to the transmission gate. In each case, one of the inputs to the AND gate is the transmission control lead T–C and the other input is the respective one of the leads B–T, D–T, or R–T supplied over line 162 from the signal state register 1400 (FIG. 5). The outputs from the signal gates are connected in multiple to the end TL2 of the common highway. A dial and busy tone generator 342 supplies busy tone over conductor 345 to signal gate SG1, and dial tone over lead 346 to signal gate SG2. The ringback tone is supplied to signal gate SG3 over conductor 347 from a ring back tone generator 344.

The signaling unit 170 also includes a ringing interrupter 340 for supplying interrupter voltage to the line circuits. The output is supplied for two seconds to each of the leads RDA, RDB, and RDC in turn, so that each is on for two seconds and off for four seconds during each six-second period. Each of these output leads is connected to approximately one third of the line circuits. One of the interrupter output leads is also connected to the ringback tone generator 344, to interrupt its output in the same manner as the ringing signals.

B4. *Register control circuits* (*FIG. 4*)

Figure 6:
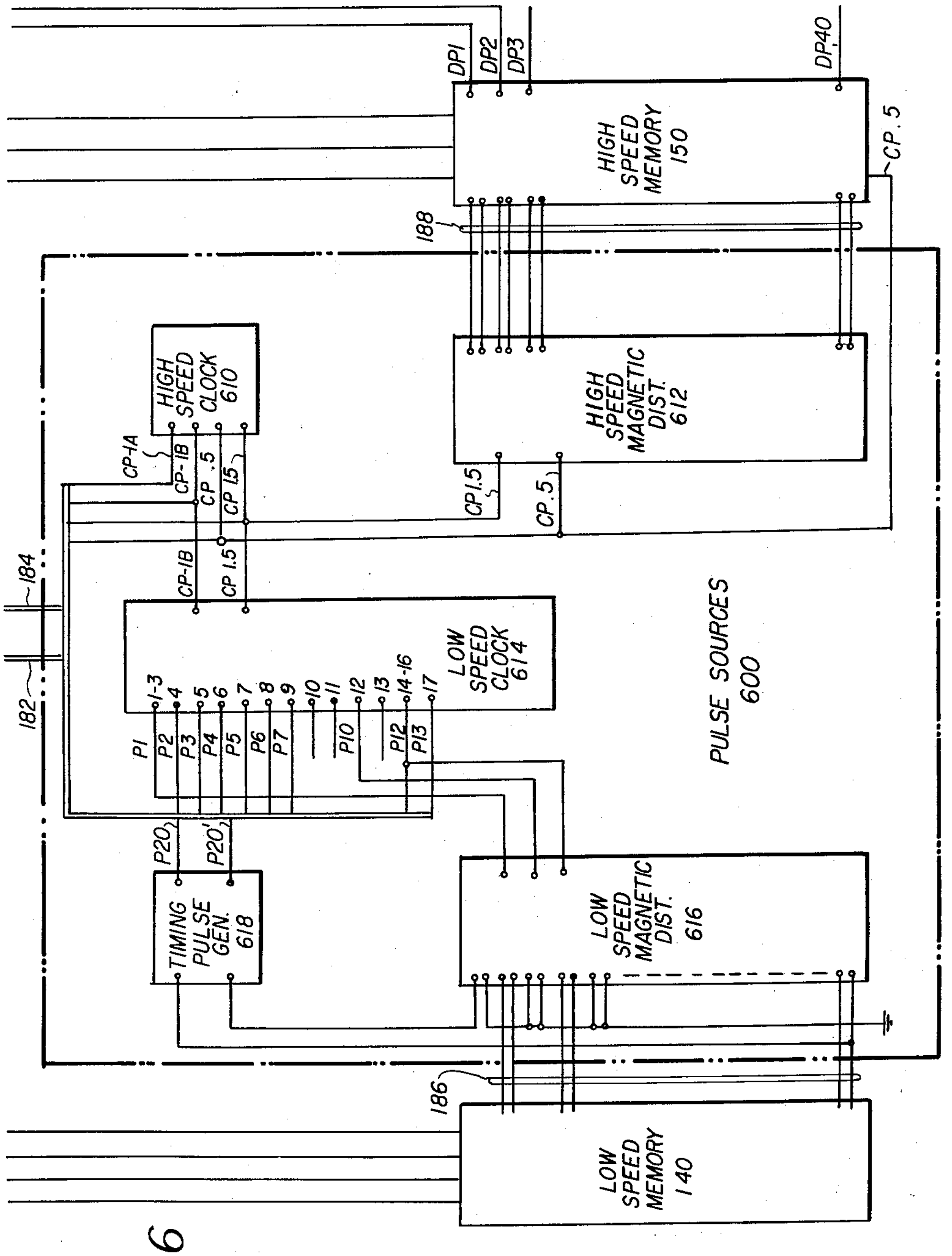

The register control circuits 400 shown in FIG. 4 receive hookswitch and line-busy signals on leads E and C, respectively, from the line circuits to the line supervision circuit 700; and supply output signals on conductors 128 from the line number advance unit 1200 to control the rewrite, advance, and clearing of the tens and units digits designating the line registered in the line number register 130 (FIG. 5). Clock pulses are supplied to the circuits in FIG. 4 by conductor group 182 from the sources shown in FIG. 6. As may be seen by reference to FIGS. 7–12, inclusive, the register control circuits include logic gates, flip-flops, and amplifiers. In each circuit, the input is supplied to the logic gates, and the output is obtained directly from the flip-flops or from output amplifiers. The flip-flop output leads are designated by reference characters ending with a 1 or 0 preceded by a hyphen. The output conductors from all of the units except the line number advance unit 1200 are shown as comprising a conductor group 401; and these conductors are connected as inputs to the several circuits of FIG. 4 and also to the signal state register 1400 in FIG. 5, as shown. The allotter 800, timer 900, sequence circuit 1000, and dialing supervision circuit 1100 are also connected by lines 142, 144, 146, and 148, respectively, to the low speed memory 140 (FIG. 6).

The output signals from the line supervision circuit 700 include C–1 and C–0 for busy marking, EA–1 and EA–0 for calling-line hookswitch supervision, and EB–1 and EB–0 for called-line-hookswitch supervision. These conductors form a sub-group 701 of the group 401.

The output from the allotter comprises conductors S–1 and S–0 in sub-group 801 of group 401, for designating whether or not an allotter has been allotted for scanning.

The timer 900 may advance through sixteen steps, making one step each 20.4 milliseconds, with output states designated F0, F20, F40, and so on, up to F280, and the normal state FN. Output conductors are only necessary for four of these states, namely, conductors F100, F120, F280, and FN, in sub-group 901 of group 401.

The sequence circuit 1000 has an output conductor HN for the normal state, and conductors H1, H2, H3, H4, and H5 for successive states, and, in addition, a signal is supplied on conductor HA–1 each time the sequence circuit advances, these output conductors comprising subgroup 1001 of group 401. Since, as shown in FIG. 9, the timer 900 includes a delay line circuit which is shared by the sequence circuit 1000, a conductor group Y comprising conductors Y2′, Y2, Y4, Y1S, and Y3S is provided for the connections.

The output of the dialing supervision circuit 1100 comprises conductors B–1, B–0, R–1, R–0, in subgroup 1101 of group 401; the signal R–1 being true during each dial pulse, and the signal B–1 being true for the dialing of an entire digit.

The output conductors 128 from the line number advance circuit 1200 comprise conductors TA′ and UA′ for advancing the tens register and units register (FIG. 5) respectively, and conductors TB′ and UB′ to the two registers, respectively, for causing rewrite of the same digit in each.

B5. *High speed registers* (*FIG. 5*)

Referring to FIG. 5, the line number register 130 comprises a tens register 1300 and a units register 1302. The tens register has the five conductor pairs TC to TG in group 152, and the units register has a similar five pairs of conductors UC to UG in group 154, which are threaded through the columns of the cores in the high speed memory 150, as shown in FIG. 1. In each of the registers, the five conductor pairs are associated with five flip-flops for the two-out-of-five number registration. The tens register is supplied with input on leads TA′ and TB′ for controlling the advance and rewrite, and similarly the units register is supplied with input signals UA′ and UB′. In the tens register, the two-out-of-five code is translated to a one-out-of-ten code and supplied through individual output amplifiers to the conductors T1 to T0 in conductor group 134, and similarly the units register supplies signals to the leads U1 to U0, also in conductor group 134. In addition, a connection is made from the flip-flop output conductors UC–1 and UF–1 into cable 401 for controlling the line number advance circuit 1200 in FIG. 4.

The signal state register 1400 has five conductor pairs BT, DT, RG, RT, and ST in group 156 to columns of the high speed memory 150 (FIG. 6), each conductor pair being associated with a signal state flip-flop in the register, as shown in FIG. 14. Input is supplied by conductors in group 401 from the register control circuits 400. Output is supplied through individual output amplifiers to leads R–G, R–T, D–T, B–T, and S–T. The signals R–T, D–T, and B–T supply control pulses to the signal gates in the signaling circuit 170 (FIG. 3). The signal on conductor S–T controls the switch-through of the transmission gates in the link circuits. The output conductor R–G is shown connected through line 162, and the signaling circuits 170 in FIG. 3 to line control group 134 to the line circuit, to control the ringing of called lines. The output R–G is also supplied through conductor group 401 to the line supervision circuit 700 in FIG. 4 to supply busy marking during ringing.

Both the line number register 130 and the signal state register 1400 are supplied with clock pulses over conductor group 184 from the sources shown in FIG. 6.

B6. *Pulse sources and definitions* (*FIG. 6*)

The pulse sources 600 are shown in FIG. 6. The primary source is a high speed clock 610. The output pulses from this clock drive a distributor 612 for driving the high speed memory 150 and supplies pulses for the transmission circuit. The output of the high speed clock 610 also drives a low speed clock 614 which includes a seventeen-stage distributor primarily for controlling logic circuits in the register control circuit 400. Pulses from the low speed clock 614 also drive a distributor 616 which drives the low speed memory 140. A timing pulse generator 618 is driven by pulses from distributor 616 to control the timer circuit 900.

In reference to the pulses, the following definitions relate to the terms used in this application:

*Time slot.*—a two-microsecond interval, being one complete cycle of the high-speed clock 610. Each time slot comprises a 0.5-microsecond guard interval followed by a 1.5-microsecond interval during which transmission and various control operations take place.

*Transmission cycle.*—a time interval comprising 40 time slots or 80 microseconds, being one cycle of the distributor 612.

*Logic cycle.*—a time interval comprising 17 time slots or 34 microseconds, being one cycle of the low speed clock 614.

*Frame.*—a time interval comprising 40 logic cycles totaling 680 time slots or 1360 microseconds, being one cycle of the distributor 616.

*Timer step.*—an interval of 20.4 milliseconds, being one cycle of the timing pulse generator 618.

*Coincident.*—Used with reference to two or more signals which overlap in time, usually at the input of a gate.

*Simultaneous.*—used with reference to signals or events occurring during the same time cycle, such as a transmission cycle or a frame, although possibly in different time divisions of the cycle.

FIG. 15 is a graph of the pulses produced during each time slot by the high speed clock 610. The pulses on lead CP.5 occur during the guard interval and have a duration of 0.5 microseconds. The pulses on lead P1.5 occur during the remainder of the time slot and have a duration of 1.5 microseconds. The pulses on lead CP1A and CP1B each have a duration of 1 microsecond and occur during each time slot as shown.

The distributor 612 has forty stages and is driven one stage per time slot. The input is supplied by the pulses on leads CP.5 and CP1.5 from the high speed clock 610. Each stage drives a row of the high speed memory 150, and has two output leads threaded through the cores of the corresponding row. One of the outputs of each stage is a 0.5 microsecond pulse for applying a read-out potential to the cores. As shown in FIG. 1, each of these leads is connected to ground on the right hand side of the memory 150. The other output from each stage is a 1.5 microsecond signal for supplying a ½-write potential to the cores. The leads from these outputs extend through the memory 150 to the distributor pulse leads DP1 to DP40, which are connected individually to transmission gates of the links. Lead DP1 is connected to the calling side transmission gate, and lead DP2 is connected to the called side transmission gate of link 1. The succeeding pairs of the leads DP are connected to succeeding links, each odd-numbered distributor pulse being supplied to a calling side gate, and each even-numbered distributor pulse being supplied to a called side gate of a link. Thus, each of the forty distributor pulses corresponds to one time channel of the multiplex transmission, and is permanently associated with a link transmission gate.

FIG. 16 is a graph of the pulses produced by the low speed clock 614. This clock is driven by pulses on lead CP1B and CP1.5 from the high speed clock 610, and is driven one stage per time slot. There are seventeen stages in its cycle for a total of 34 microseconds. The output of the first three stages are combined to produce a continuous six-microsecond pulse on lead P1. During each of the stages 4 to 13 output pulses are produced on leads P2 to P11 respectively each having a duration of 1.5 microseconds coinciding with the pulse on lead CP1.5. The output of the stages 14 to 16 are combined to produce a continuous six-microsecond pulse on lead P12. During stage 17 a 1.5-microsecond pulse is produced on lead P13. The pulses P1 to P13 comprise one logic cycle.

The distributor 616 has forty stages, and is driven one stage per logic cycle by input pulses on leads P1 and P12 from the low speed clock 614. The output from the even-numbered stages are used to drive the horizontal rows of the low speed memory 140. There are two leads for each row. On one of the leads a read-out potential is applied during the interval coinciding with the pulse on lead P1, and on the other a ½-write potential is supplied during the interval coinciding with the pulse P12. Each of the horizontal rows of the memory 140 is associated with one of the twenty links. Thus, during each logic cycle, which corresponds to an even-numbered distributor stage, a read-out pulse is supplied to one of the rows during the pulse interval P1, transferring the information in this row into the circuits of the register control circuit 400. During the pulse intervals P2 to P11 various logical operations occur in the circuits 400, which may alter some of this information. During the pulse interval P12 a ½-write potential is applied to this horizontal row and to the selected ones of the vertical columns to write the information back into the cores. During the pulse interval, P13 the flip-flops in the register control circuits are cleared in preparation for the next logic cycle, which corresponds to another link.

C. *Time division distribution plan*

In this system there are two groups of time division multiplex circuits having different distribution cycles, one of the groups being associated with the high-speed memory 150, and the other group being associated with the low-speed memory 140.

C1. *High-speed circuits*

The high-speed circuits control the time division transmission of voice and tone signals over the multiplex line ML1—ML2. Referring to FIG. 1, and also to FIGS. 2, 3, 5, and 6, the high-speed circuits include the high-speed clock 610, the high-speed magnetic distributor 612, the high-speed memory 150, the line number register 130, the signal state register 1400, all of the line circuits LC11 to LC00, all of the link circuits LK1 to LK20, the signaling circuits 170, and the transmission control unit 110. The high-speed clock 610 has a cycle of two microseconds which is referred to as a time slot. As shown in FIG. 15, the time slot is divided into 0.5-microsecond and 1.5-microsecond intervals, corresponding to the respective outputs CP.5 and CP1.5 from the clock. The output pulses from the clock 610 drive the high-speed magnetic distributor 612. This distributor has forty stages of two microseconds each, making a total cycle of eighty microseconds. Each cycle of this distributor is one transmission cycle on the multiplex line ML1—ML2, and each stage occurring in successive cycles comprises one transmission channel. In each channel transmission occurs during the 1.5-microsecond interval, and the 0.5-microsecond interval is used as a guard interval between channels. The distributor 612 has two output leads for each stage, and for each stage the pair of output leads are threaded through one horizontal row of the high speed memory 150. On one of the leads a read pulse is delivered during the 0.5-microsecond interval, and on the other a ½-write pulse is delivered during the 1.5-microsecond interval. The writing leads extend through the memory and thence to the links to form the principal distributor pulse output leads. These forty DP leads are grouped in successive pairs extending to the twenty links. For each link the odd numbered DP pulse is used for controlling the calling line gate, and the even numbered pulse is used for controlling the called line gate. Thus, each link uses two adjacent channels in the transmission cycle for a connection between two lines.

The line number register 130 in conjunction with the associated cores in the high speed memory 150 delivers pulses to the line circuits in coincidence with the pulses delivered to the link transmission gates with which they have been selectively connected.

In accordance with stored information in the high speed memory 150, the line number register 130 delivers pulses to the line circuits, and the signal state register delivers pulses to the signal circuit 170 and to the link circuits LK1 to LK20, so that for each channel for which a connection has been established, two transmission gates connected to the multiplex line, one at the end ML1 and the other at the end ML2, are pulsed in coincidence.

C2. *Low speed circuits*

The low speed circuits provide for time division sharing of the circuits used in performing most of the logical operations required by the links to set up connections between lines. Referring to FIGS. 1, 4 and 6, these circuits comprise the low-speed clock 614, the low-speed magnetic distributor 616, the low-speed memory 140, the register control circuits 400, and a timing pulse generator 618.

The low-speed clock 614 is a distributor which produces thirteen output pulses requiring a total of seventeen time slots or thirty-four microseconds, as shown in FIG. 16. This clock cycle is referred to as a logic cycle and is one time division of the total low-speed cycle. The low-speed magnetic distributor 616, driven by the pulses P1 and P12 from the output of the low-speed clock, has forty stages. Each cycle of this distributor is one complete low-speed cycle, and is referred to as a frame. Thus, each such frame comprises forty logic cycles or a total of 1360 microseconds. The even numbered stages of the distributor 616 are used to drive the twenty rows of the low-speed memory 140, each delivering a read pulse during the pulse interval P1 and a ½-write pulse during the pulse interval P12. Each of these memory rows, driven by an even numbered stage of the distributor 616, corresponds to one of the links. During each such logic cycle which corresponds to a link, in the pulse interval P1 information is transferred from the low-speed memory 140 to the register control circuit 400; during the pulse intervals P2 to P11 the line supervision leads C and E are analyzed, the information obtained from the line circuits and memory is used to perform logical operations and to deliver appropriate output signals on the conductors 128 to the line number register 130 as well as over the line 401 to the signal state register 1400; during P12 the information, which may or may not have been altered, is transferred back into the same row of the memory 140; and during the pulse interval P13, the register control circuits 401 are cleared in preparation for the logic cycle of the next link. Thus, during each frame, each link shares the register control circuits 400 for one logic cycle, with alternate logic cycles being unused.

Thus, the logic circuits are time shared at a low repetition rate to permit time to perform the various logical operations, while the transmission circuits are time shared at the high repetition rate required for the faithful reproduction of voice signals.

C3. *Time relation between low speed and high speed circuits*

The pulse repetition rates of the different distributors are so arranged that the logic state of each link is analyzed and acted on once and only once per frame. The identity of which link is associated with a logic cycle is established by coincidence of a given logic pulse with a pulse of the high speed circuits. To accomplish this the period of a logic cycle has been chosen to be seventeen time slots, and of a transmission cycle, forty time slots; since these numbers have no common divisor, that is, seventeen is not a prime factor of forty. Thus, each frame comprises seventeen transmission cycles and forty logic cycles, and the relation of coincidence between logic cycles and transmission cycles will repeat only once per frame.

During each logic cycle associated with the links, the six-microsecond pulse interval P1 is used to read the information from the corresponding row of the low-speed memory 140 into the register control circuit 400. The pulse P2 is then used to identify the calling line associated with the link, and pulse P3 to identify the called line. In the high speed circuits, each link is associated with a pair of rows and corresponding distributor pulses in the high speed memory 150, the calling line being associated with an odd-numbered DP pulse and the called line with the following even-numbered DP pulse. The graph of FIG. 17 and Table I show the relation of the pulses of the transmission cycles and logic cycles. The graph shows that in transmission cycle 1 (T.C.1), pulses DP4 and DP5 coincide with pulses P2 and P3 respectively of logic cycle 1 (L.C.1), the pulses DP21 and DP22 with P2 and P3 of logic cycle 2 (L.C.2), and DP38 and DP39 with P2 and P3 of logic cycle 3 (L.C.3). In transmission cycle 2 (T.C.2) DP15 and DP16 coincide with P2 and P3 of logic cycle 4 (L.C.4), and DP32 and DP33 with P2 and P3 of logic cycle 5 (L.C.5). At the end of the frame in transmission cycle 17 (T.C.17) DP10 and DP11 coincide with P2 and P3 of logic cycle 39 (L.C.39), and DP27 and DP28 with P2 and P3 of logic cycle 40 (L.C.40). Table I shows which pulse transmission cycle pulses coincide with the logic cycle pulses P2 and P3 for all logic cycles.

TABLE I

| Logic Cycle No. | Pulse Coincidence | | PAX, 20 Links | PABX, 14 Links 12 Trunks |
|---|---|---|---|---|
| | P2 | P3 | | |
| 1 | DP4 | DP5 | | |
| 2 | 21 | 22 | Link 11 | Link 11 |
| 3 | 38 | 39 | | Trunk 10 |
| 4 | 15 | 16 | Link 8 | Link 8 |
| 5 | 32 | 33 | | Trunk 4 |
| 6 | 9 | 10 | Link 5 | Link 5 |
| 7 | 26 | 27 | | |
| 8 | 3 | 4 | Link 2 | Link 2 |
| 9 | 20 | 21 | | |
| 10 | 37 | 38 | Link 19 | Trunk 9 |
| 11 | 14 | 15 | | |
| 12 | 31 | 32 | Link 16 | Trunk 3 |
| 13 | 8 | 9 | | |
| 14 | 25 | 26 | Link 13 | Link 13 |
| 15 | 2 | 3 | | |
| 16 | 19 | 20 | Link 10 | Link 10 |
| 17 | 36 | 37 | | Trunk 8 |
| 18 | 13 | 14 | Link 7 | Link 7 |
| 19 | 30 | 31 | | Trunk 2 |
| 20 | 7 | 8 | Link 4 | Link 4 |
| 21 | 24 | 25 | | |
| 22 | 1 | 2 | Link 1 | Link 1 |
| 23 | 18 | 19 | | |
| 24 | 35 | 36 | Link 18 | Trunk 7 |
| 25 | 12 | 13 | | |
| 26 | 29 | 30 | Link 15 | Trunk 1 |
| 27 | 6 | 7 | | |
| 28 | 23 | 24 | Link 12 | Link 12 |
| 29 | 40 | 1 | | Trunk 12 |
| 30 | 17 | 18 | Link 9 | Link 9 |
| 31 | 34 | 35 | | Trunk 6 |
| 32 | 11 | 12 | Link 6 | Link 6 |
| 33 | 28 | 29 | | |
| 34 | 5 | 6 | Link 3 | Link 3 |
| 35 | 22 | 23 | | |
| 36 | 39 | 40 | Link 20 | Trunk 11 |
| 37 | 16 | 17 | | |
| 38 | 33 | 34 | Link 17 | Trunk 5 |
| 39 | 10 | 11 | | |
| 40 | 27 | 28 | Link 14 | Link 14 |

Since there are forty time channels in a transmission cycle, in a PAX using two time channels per link, twenty links may be accommodated. Link 1 is assigned pulse DP1 for the calling line and pulse DP2 for the called line. In the logic cycle assigned to this link the pulses P2 and P3 must coincide respectively with these distributor pulses. The table shows that this occurs in logic cycle number 22. The column headed PAX shows the assignment for all of the links. Note that only the even-numbered logic cycles may be used. In the odd-numbered logic cycles, the pulse P2 coincides with a called line pulse and P3 coincides with the calling line pulse. Therefore these logic cycles cannot be associated with rows of the low speed memory 140. Except for the P1 pulse of stage 1, which is used in driving the timing pulse generator 618, the odd-numbered stages are connected directly to ground at the output of the distributor 616.

The arrangement with a high speed and a low speed memory could also be used with a PABX having trunk circuits to the main exchange. These trunk circuits would require only one time position of the transmission cycle. The trunk circuit could then be identified in the low speed circuit by the coincidence of the pulse P2 of a logic cycle with the single transmission cycle pulse. For example, the forty time positions of a transmission cycle could be used to accommodate fourteen links and twelve trunks. The assignment of logic cycles would then be as shown in the table in the column headed PABX. Note that in this case all of the even-numbered logic cycles and some of the odd-numbered logic cycles are used, and each of these would be assigned a row of the low speed memory 140. Logic cycles in which P2 coincides with the called line of a link cannot be used.

D. *Detailed description*

The structure and function of the switching control circuits will now be described with reference to individual functional block diagrams.

The logic circuitry is direct-coupled (DC), that is, signals are represented by steady-state voltages. Two levels are employed. The first level is usually −5 volts, although other negative voltages are used in a few places, and represents the binary 1, true, on or active condition. The second level, ground potential, represents the binary 0, false, off or inactive condition. Flip-flops are used as registers with double-rail output signals to drive the logic circuits. A double-rail output is one in which both the logical 1 and 0 conditions are represented by active signals on separate leads. Only one of the two leads, however, has an active signal at any time. Logic circuits are included in each unit for controlling the setting of the flip-flops, which may be set 1 or set 0. "Set" when used alone means "set 1," and "reset" is synonymous with "set 0." These logic circuits comprise diode type AND and OR gates.

D1. *Boolean algebra*

In describing the logical operations performed by the circuits, Boolean algebra equations are used. In this notation the addition symbol signifies OR, the multiplication symbol, expressed or implied, signifiies AND, and the prime symbol signifies the inverted condition.

D2. *Register control circuits*

The register control circuits 400 shown in FIGS. 1 and 4, will now be described with reference to the functional block diagrams of FIGS. 7 to 12, and the logical operations performed by these circuits as individual units will be explained. In writing the equations, in the designation of each input signal, the first letter is capitalized, and the other letters and numbers are written in lower case or as subscripts. Hyphens are omitted.

Figure 7:
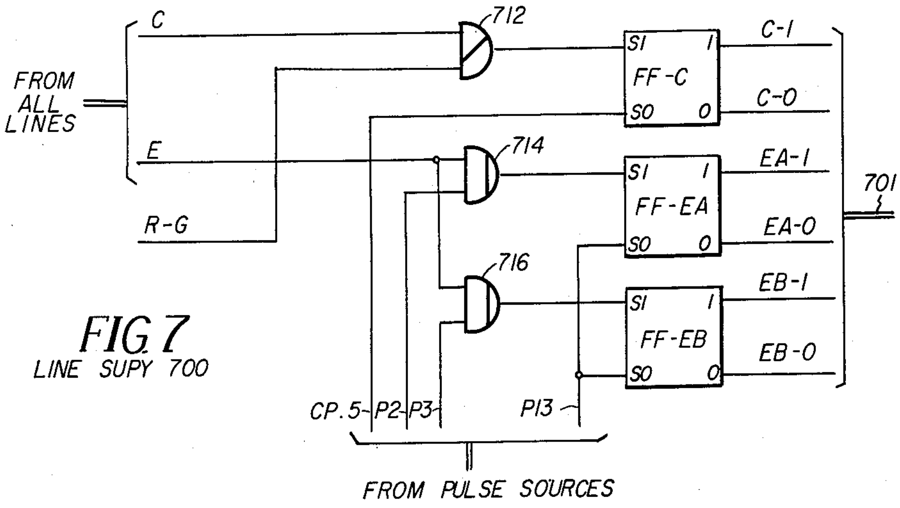
FIG. 7 is a functional block diagram of the line supervision circuits.

D2*a*. *Line supervision* (*FIG. 7*)

The line supervision circuit, shown in FIG. 7, includes flip-flops FF—C, FF—EA, and FF—EB; and diode logic gates for controlling the setting of these flip-flops. Flip-flop FF—C is the line busy register. It is set 1 through OR gate 712 whenever a pulse appears on lead C. It is set 0 by the pulse on lead CP.5 during the guard interval of each time slot. Flip-flop FF—C is also set 1 through OR gate 712 by the pulse on lead RG to mark a line busy when it is being rung.

Flip-flops FF—EA and FF—EB are the hookswitch supervision registers, FF—EA being for the calling line, and FF—EB being for the called line. The calling line flip-flop FF—EA is set 1 through AND gate 714 whenever the pulse on lead E appears in coincidence with pulse P2, and the called line flip-flops FF—EB is set 1 through AND gate 716 whenever the pulse on lead E appears in coincidence with pulse P3. Both of these flip-flops are set 0 at the end of every logic cycle by the pulse P13. Thus these flip-flops determine the state of the hookswitch supervision for the calling and called lines and retain this information for the duration of a logic cycle. Since the pulses on lead E originate from the high-speed circuits, and the pulses on leads P2 and P3 originate from the low speed clock, the gates 714 and 716 determine the coincidence for identifying the link and logic cycle, as explained in section C3.

The equations are as follows:

$$C \text{ set } 1 = C + R_g \quad (1)$$

$$C \text{ set } 0 = C_{P.5} \quad (2)$$

$$Ea \text{ set } 1 = EP_2 \quad (3)$$

$$Eb \text{ set } 1 = EP_3 \quad (4)$$

$$Ea \text{ set } 0 = P_{13} \quad (5)$$

$$Eb \text{ set } 0 = P_{13} \quad (6)$$

Figure 8:
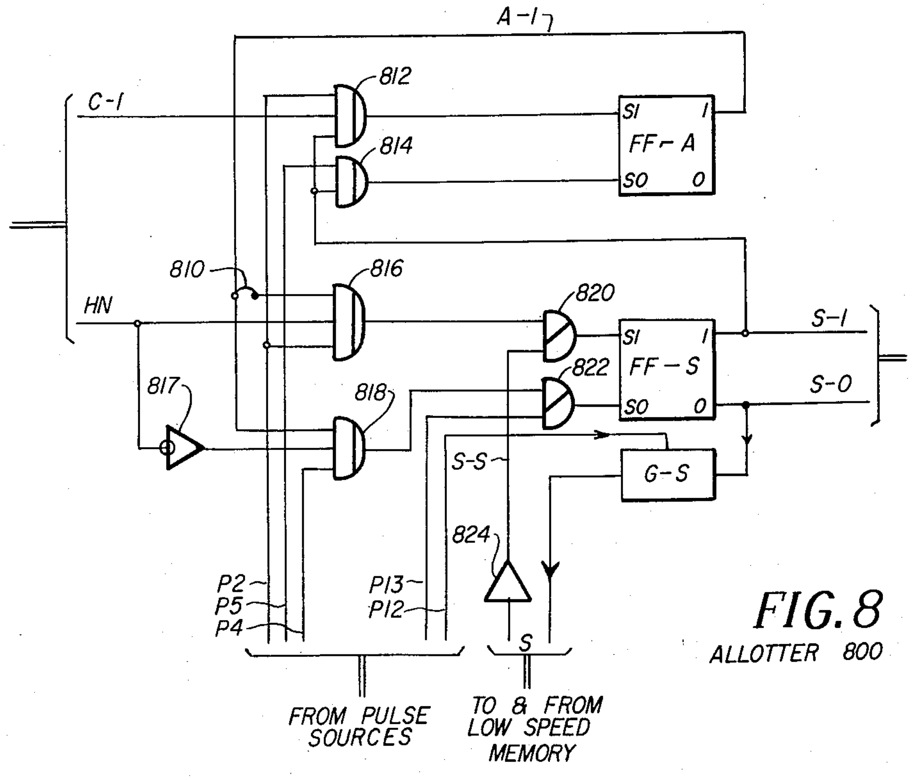
FIG. 8 is a functional block diagram of the allotter.

D2*b*. *Allotter* (*Fig. 8*)

The allotter comprises flip-flops FF—A and FF—S, and associated circuitry for controlling the setting of these flip-flops. Flip-flop FF—S is associated with the column of cores in the low speed memory 140 threaded by the conductor pair S. The S core of a link is set 1 to indicate that the link is scanning, that is, searching for a line, if any, in calling condition. Flip-flop FF—A is used to control the resetting of the S register of a link when it is seized by a calling line. If only one idle link at a time is permitted to scan, flip-flop FF—A controls the allotting. Input signals from the other register control circuits are supplied on leads C–1 and HN. A pulse appears on lead C–1 from the line supervisory circuit 700 whenever a busy line circuit is pulsed by the line number register 130. Lead HN is the output of sequence circuit 1000 which is true when the link being analyzed is idle. Output on lead S–1 is supplied to the sequence circuit 1000, and both output S–1 and S–0 are connected to the input of the line number advance circuit 1200.

Assume that only link 1 is scanning. Table I shows that this link is associated with logic cycle 22. During the pulse interval P1 of this logic cycle, the distributor 616 supplies a pulse over the read winding of the horizontal row assigned to this link in the low speed memory 140, causing the S core to supply a signal to the sense winding of conductor pair S. This signal is applied through amplifier 824 and OR gate 820 to set the flip-flop FF—S. During the pulse intervals P2 to P11 the output on lead S–1 is true and on lead S–0 is false. During the pulse interval P12 the signal on lead P12 and the false condition on lead S–0 cause the constant current generator G–S to apply a signal to the ½-write lead of conductor pair S. At the same time the distributor 616 applies a ½-write signal to the horizontal row causing the S core to again be set 1. This continues in logic cycle 22 of each frame until a calling line is found and becomes connected to the link. The sequence switch then advances so that its output HN becomes false. However there is no effect on the allotter during the initial frame after seizure. In the high speed circuits this link is assigned the stage DP1 of the transmission cycle for the calling line, and therefore the line number register supplies pulses to the seized line circuit during this pulse interval. After one or more frames the busy mark becomes effective in the line circuit and supplies pulses to lead C, which are repeated by the line supervisory circuit 700 to lead C–1. In the next logic cycle 22 the flip-flop FF—S is set 1 by the signal on the sense winding of conductors S. The pulse on lead P2 coincides with that on lead C–1, and S–1 is true, so an output is obtained from gate 812 to set the flip-flop FF—A. At AND gate 818, A–1 is now true. The false condition on lead HN is inverted by amplifier 817, so that HN′ is true. Therefore during the pulse interval P4 the output signal from gate 818 through OR gate 822 resets flip-flop S. In the pulse interval P12, no output is obtained from the constant current generator G–S and the S core remains set 0. Therefore the link stops scanning. Flip-flop FF—A remains set 1 at the end of the logic cycle, and continues set until it is reset during a succeeding logic cycle corresponding to an idle link.

There are two options in the allotter for causing links to initiate scanning, according as to whether or not the jumper 810 is connected to supply a signal A–1 to the input of gate 816. In the first option with jumper 810 connected, only one particular idle link is allotted for scanning. In the second option with jumper 810 disconnected all idle links are permitted to scan. This second option reduces the time required for a line initiating a call to be found and seized by a link.

With option one, flip-flop FF—A controls the allotting of another idle link for scanning. The signal on lead A1 is applied to AND gate 816. The distributor 616 steps through successive stages until the logic cycle of an idle link is reached. Then the signal on lead HN is true, and in the pulse interval P2, an output signal from gate 816 is applied through OR gate 820 to set the flip-flop FF—S. With S–1 true, in the pulse interval P5 an output is obtained from AND gate 814 to reset flip-flop FF—A. In the pulse interval P12 the S core of the link is set, and therefore the link continues to scan during successive frames.

The equations are as follows:

$$S\text{ set }1=HnA_1P_2+S_s \quad (7)$$
$$S\text{ set }0=Hn'A_1P_4+P_{13} \quad (8)$$
$$A\text{ set }1=C_1S_1P_2 \quad (9)$$
$$A\text{ set }0=S_1P_5 \quad (10)$$

With the second option, the jumper 810 is disconnected so that only inputs HN and P2 are required at gate 816 to set the flip-flop FF—S. Therefore any idle link commences scanning as soon as its logic cycle is reached in the frame after it becomes idle. When flip-flop FF—A becomes set 1 because a scanning link has been seized, it remains set only until the logic cycle of another scanning link is reached, when it is reset by the signal on lead S–1 in pulse interval P5. The equations are the same except for setting flip-flop FF—S, which is as follows:

$$S\text{ set }1=HnP_2+S_s \quad (7a)$$

D2c. *Timer* (*FIGS. 9 and 9A*)

The timer circuit 900 is essentially a binary counter. It is shown in FIGS. 9 and 9A, arranged as shown in FIG. 26. It includes four flip-flops FF—FC, FF—FD, FF—FE, and FF—FF, shown in FIG. 9A, and associated columns of the low speed memory 140. With four registers, sixteen binary bits or counter states may be registered. Since these flip-flops are shared on a time division basis by all of the links, each link having its own row of cores in the low speed memory 140, the timer state of each link is independent from that of the others.

There is one complete frame out of each fifteen frames during which the timer may be advanced, for all links, as shown in FIG. 18. This is controlled by the output on leads P20 and P20′ of the timing pulse generator 618 (FIG. 6). This generator has a cycle of fifteen frames. During the first complete frame of each cycle designated a P20 frame, the output is true on lead P20 and false on lead P20′. During the next fourteen frames designated P20′ frames, the output is false on lead P20 and true on lead P20′. Since each frame has a period of 1360 microseconds, each cycle of the timing pulse generator has a period of 20.4 milliseconds. Since this is approximately 20 milliseconds, the timer states are designated in multiples of twenty, representing the approximate number of milliseconds which have elapsed from the beginning of the count. The normal state with all registers set 0 is designated $F_N$. Successive states designated F0, F20, and so on up to F280 and then back to $F_N$.

Delay lines 943 and 944 in FIG. 9 are used by both the timer circuit and the sequence circuit 1000 to aid in controlling the advance of the counter registers. As shown in FIG. 4, the delay line circuits are connected by line Y with the sequence circuit 1000. The timer circuit advances only in P20 frames, so to permit the sharing of the delay line circuits, the sequence circuit is permitted to advance only in P20′ frames. Under certain conditions when the timer is advancing, which will be in a P20 frame, a signal appears on lead Y1T; and similarly in P20′ frames when the sequence circuit is advancing a signal may appear on lead Y1S. Either of these signals, as applied through OR gate 927 to lead Y1, is inverted by amplifier 941, delayed two microseconds by delay line 943, and inverted by amplifier 946 to lead Y2. Thus, the signal on lead Y2 is Y1 delayed one time slot. Y2 is inverted by amplifier 947 and applied to lead Y2′. In some cases the signal on Y2 is gated to lead Y3T for the timer or lead Y3S for the sequence circuit, and thence through OR gate 939 to lead Y3. This signal is then inverted by amplifier 942, delayed two microseconds by delay line 944, and inverted by amplifier 948 and applied to lead Y4. Thus, the signal on lead Y4 is Y3 delayed one time slot and Y1 delayed two time slots. The signal Y4 is inverted by amplifier 949 and used in the control of the logic circuitry for Y3.

In any counter circuit, when an advance signal is received, it is necessary to analyze the previous state of the registers and then set up a new state in accordance therewith to represent an advance of one count. For the simplest circuit configuration, this usually requires two registers per bit. In any case the number of registers exceeds the number of bits. In the present system both the timer-circuit counter and the sequence-circuit counter take advantage of the successive pulses in a logic cycle along with the delay lines 943 and 944, to control the advance to a new state, thereby requiring only one flip-flop per bit. In effect, the delay lines are shared by the flip-flops as temporary storage devices.

The operation of the timer circuit in advancing from state to state will be explained with reference to FIG. 19. The advance occurs during P20 frames when the signal on lead B is true. The circuit is shared by the different links in their individual logic cycles, as shown in Table I. The graph of FIG. 19 shows the operation for one link. Its logic cycle is designated as *n*. For example, for link *l*, *n* is 22. The graph is simplified by showing only successive P20 frames, and in these frames only the logic cycle of the particular link (L.C.–*n*).

The equations for the delay line logic in FIG. 9, and for setting and resetting the flip-flops shown in FIG. 9A are as follows:

$$Y_{1T}=B_1P_{20}(Fc_1P_2+Fd_1P_3+Fe_1P_4+Ff_1P_5) \quad (11)$$
$$Y_1=Y_{1T}+Y_{1S} \quad (12)$$
$$Y_2=Y_1\text{ delayed one time slot} \quad (13)$$
$$Y_{3T}=Y_2P_{20}\{B_1P_3+Y_4(P_4+P_5)\} \quad (14)$$
$$Y_3=Y_{3T}+Y_{3S} \quad (15)$$
$$Y_4=Y_3\text{ delayed one time slot} \quad (16)$$
$$Fc\text{ set }1=P_{20}(B_1Y_2'P_3+\underline{Fd_1Fe_1H_3})+\underline{Sfc} \quad (17)$$
$$Fd\text{ set }1=P_{20}Y_2'Y_4P_4+\underline{Sfd} \quad (18)$$
$$Fe\text{ set }1=P_{20}Y_2'Y_4P_5+\underline{Sfe} \quad (19)$$
$$Ff\text{ set }1=P_{20}Y_2'Y_4P_6+\underline{Sff} \quad (20)$$
$$Fc\text{ set }0=P_{20}P_3Y_2+\underline{Fb_1+P_{13}} \quad (21)$$
$$Fd\text{ set }0=P_{20}P_4Y_2Y_4+\underline{Fb_1+P_{13}} \quad (22)$$
$$Fe\text{ set }0=P_{20}P_5Y_2Y_4+\underline{Fb_1+P_{13}} \quad (23)$$
$$Ff\text{ set }0=P_{20}P_6Y_2Y_4+\underline{Fb_1+P_{13}} \quad (24)$$

These equations, except for the underlined portions, relate to the normal advance of the counter. The signals S—FC, S—FD, S—FE, S—FF, and P13 relate to the circulation between the flip-flops and the memory cores. The expression $(Fd_1Fe_1H_3)$ in Equation 17, executed by the AND gate 951, is a special condition for advancing the timer from F100 to F120 during busy test. The signal FB–1 resets the timer to normal.

The logic for advance of the timer circuit in P20 frames, B–1 being true, will be explained with reference to the timer circuit operation chart of FIG. 19, Equations 11 to 24, inclusive, and the logic circuits shown in FIGS. 9 and 9A.

Referring to the logic for delay line 943 and Equations 11, 12, and 13, if FC–1 coincides with P2 at gate 921, or FD–1 coincides with P3 at gate 922, of FE–1 coincides with P4 at gate 923, or FF–1 coincides with P5 at gate 924, a pulse is applied through gates 925 and 926 to lead Y1T, and thence through gate 927 to lead Y1, and appears at Y2 one time slot later. If Y2 coincides with P3, it is desired to obtain a signal at Y3T through gate 939 to Y3 to be delayed one time slot and appear at Y4. If Y2 occurs in time slot P3 and again appears in time slot P4 and therefore coincides with Y4, it is desired to obtain another pulse at Y3 to be delayed one time slot Y4. If, after the preceding conditions, Y2 again appears in time slot P5, it is desirable to obtain still another pulse at Y3 delayed one time slot to appear at Y4. This is represented by Equations 14, 15, and 16. The gate circuitry for accomplishing this has five gates in tandem and therefore necessitates amplification. However, an amplifier introduces inversion and requires modification of the preceding gate circuits. Thus, inverting amplifiers 933, 934, 937, and 949 are used. Since the gates intermediate between these amplifiers handle inverted signals, gate 935 is an AND gate and gate 936 is an OR gate. The circuit may be compared to Equation 14 by ignoring the amplifiers, considering gate 935 to be an OR gate and gate 936 to be an AND gate.

If FC–1 is true, a signal appears at Y2 in coincidence with P3 at gate 953, and through OR gate 963 causes the flip-flop FF—FC to set 0. If FC–0 is true, a signal appears at Y2′ in coincidence with P3 at gate 952, and through gates 961, 962, and 971 causes flip-flop FF—FC to set 1. Thus, flip-flop FF—FC changes from 0 to 1 in P20 frames 1, 3, 5, 7, 9, 11, 13, and 15; and changes from 1 to 0 in P20 frames, 2, 4, 6, 8, 10, 12, 14, and 16.

Both gates 954 and 955, which control the change of state of flip-flop FF—FD, require Y4 in coincidence with P4. This occurs whenever FC–1 is true at the beginning of the frame, e.g., in P20 frames 2, 4, 6, 8, 10, 12, 14, and 16. If FD–1 is true at the beginning of the frame, Y2 appears in P4, and a signal from gate 955 is applied to gate 964 to cause the flip-flop FF—D to set 0. FD–0 is true at the beginning of the frame, Y2′ appears in P4, and the signal from gate 954 is applied through gate 972 to cause flip-flop FF—D to set 1. Thus, flip FF—FD changes from 0 to 1 in P20 frames 2, 6, 10, and 14; and changes from 1 to 0 in P20 frames 4, 8, 12, and 16.

Both of the gates 956 and 957 for controlling the change of state of flip-flop FF—FE require Y4 in coincidence with pulse P5. This occurs whenever both FC–1 and FD–1 are true at the beginning of the frame, e.g., in P20 frames 4, 8, 12, and 16. If FE–1 is true at the beginning of one of these frames, Y2 appears in P5, and the output from gate 957, through gate 965, causes flip-flop FF—FE so set 0. If FE–0 is true at the beginning of the frame, Y2′ appears in P5, and the output from gate 956 through gate 973 causes flip-flop FF—E to set 1. Thus, flip-flop FF—FE changes from 0 to 1 in P20 frames 4 and 12; and changes from 1 to 0 in P20 frames 8 and 16.

Both of the gates 958 and 959 for controlling the change of state of FF—FF require Y4 in coincidence with P6. This occurs whenever FC–1, FD–1, and FE–1 are true at the beginning of the frame, namely, P20 frames 8 and 16. At the beginning of P20 frame 8, FF–0 is true, Y2′ appears in P6 and the output from gate 956 through gate 973 causes flip-flop FF—E to set 1. At the beginning of frame 16, FF–1 is true, and F2 or Y2 appears in coincidence with P6, and the output from gate 957 through gate 965 causes flip-flop FF—FE to set 0.

The above shows how binary operation of the flip-flops is obtained. The operation chart of FIG. 19 shows the designation of the 16 states, namely, F0, F20, and so on, up to F280, and then to the sixteenth or normal state $F_N$. Output signals are desired for only four of these states, namely, F100, F120, F280, and the normal state $F_N$. These four signals are obtained in inverted form through a translation matrix comprising OR gates 981, 982, 983, and 984. The signals from these gates are amplified by the inverter-amplifiers 985, 986, 987, and 988. The equations for the four output signals are as follows:

$$F100 = Fc_0\ Fd_1\ Fe_1\ Ff_0 \qquad (25)$$

$$F120 = Fc_1\ Fd_1\ Fe_1\ Ff_0 \qquad (26)$$

$$F280 = Fc_1\ Fd_1\ Fe_1\ Ff_1 \qquad (27)$$

$$F_N = Fc_0\ Fd_0\ Fe_0\ Ff_0 \qquad (28)$$

Since inverted signals are desired at the inputs of the amplifiers, OR gates are used rather than AND gates in the translation matrix 980, and the input signals to the gates are the inverse of those shown in the equations. The operation chart, FIG. 19, shows that during the advance from one state to the next, that there may be one to three time slots occurring in which the setting of the flip-flops represents either the preceding state or the advanced state. Those time slots in which the translated output might be incorrectly represented are avoided in the operations of the other circuits.

*Timer reset*

The flip-flop FF—FB is used to reset the timer circuit to normal. When this flip-flop is set 1, the output signal FB–1 is applied through the OR gates 963, 964, 965, and 966 to set 0 all of the flip-flops FF—FC, FF—FD, FF—FE, FF—FF. The equations for flip-flop FF—FB are as follows:

$$Fb \text{ set } 1 = P_{20}\{(B_1R_1Ea_1)+(Ha_1H_1B_1P_3)+F_{280}+\{F_{100}+F_{120})Ea_0Bb_0(H_3+H_4+H_5)P_4\}\} \qquad (29)$$

$$Fb \text{ set } 0 = P_{13} \qquad (30)$$

There are four conditions for setting flip-flop FF—FB to reset the timer circuit, represented by four inputs to the OR gate 916. At the end of each dial pulse when the line loop is closed, an output signal is obtained from gate 912. At changeover from the tens digit to the units digit, an output signal is obtained during P3 from the AND gate 914. If the calling party hangs up during dialing, the timer advances until the signal is obtained at F280. If both the calling and called parties are hung up any time after the completion of dialing, a signal is obtained during P4 from the AND gate 915.

The output from gate 916 is gated with P20′ in AND gate 917 to prevent the timer being reset while it is advancing in a P20 frame. An improper advance condition is thereby prevented from occurring.

The flip-flop FF—FB is not associated with any memory cores. It is set 0 during P13 at the end of each logic cycle so that it may be time shared by all of the links.

D2*d. Sequence circuit* (*Figs. 10 and 10A*)

The sequence circuit, shown in FIGS. 10 and 10A arranged as shown in FIG. 27, is similar is similar to the timer circuit 900. However, the sequence circuit does not advance at regular predetermined intervals as does the timer circuit, but rather under control of an advancing flip-flop FF—HA in accordance with the progress of a call. Six sequence states are used, HN for normal, H1 for seizure or tens advance, H2 for units advance, H3 for busy test, H4 for ringing, and H5 for conversation. Therefore three binary bits are required, represented by the flip-flops FF—HC, FF—HD and FF—HE, each associated with cores in the low speed memory 140. Since three bits provides eight states, two extra are available, H6 and H7.

The operation of the sequence circuit in advancing from state to state will be explained with respect to FIG. 20. To permit sharing of the delay lines with the timer circuit, which advances during P20 frames, the sequence circuit is allowed to advance only during P20′ frames. The counter is advanced under control of the signal HA–1 from flip-flop FF—HA, and is reset by the signal HB–1 from flip-flop FF—HB. The equations for the input logic to the delay lines and flip-flops are as follows:

$$Y_{1s} = Ha_1P_{20}'(Hc_1P_3+Hd_1P_4+He_1P_5) \qquad (31)$$

$$Y_{3s} = Y_2P_{20}'(Ha_1P_4+Y_4P_5) \qquad (32)$$

$$Ha \text{ set } 1 = P_2(S_1Ea_1C_0+B_1R_0F_{100}) + P_3(C_0H_3F_{100}+Eb_1H_4) \qquad (33)$$

$$Hb \text{ set } 1 = HnB_0F_NEa_0Eb_0P_6 \qquad (34)$$

$$Ha \text{ set } 0 = P_{13} \qquad (35)$$

$$Hb \text{ set } 0 = P_{13} \qquad (36)$$

$$Hc \text{ set } 1 = P_{20}'P_4Y_2'Ha_1+S_{HC} \qquad (37)$$

$$Hd \text{ set } 1 = P_{20}'P_5Y_2'Y_4+S_{HD} \qquad (38)$$

$$He \text{ set } 1 = P_{20}'P_5Y_2'Y_4 \qquad (39)$$

$$Hc \text{ set } 0 = P_{20}'P_4Y_2+Hb_1+P_{13} \qquad (40)$$

$$Hd \text{ set } 0 = P_{20}'P_5Y_2+Hb_1+P_{13} \qquad (41)$$

$$He \text{ set } 0 = P_{20}'P_6Y_2+Hb_1+P_{13} \qquad (42)$$

Equation 31 applies to the operation of gates 1021, 1022, 1023, 1025 and 1026; and Equation 32 applies to the operation of gates 1032, 1036, 1035, and 1038. These equations represent the sequence circuit inputs to gates 927 and 939 respectively to the delay lines 943 and 944 in FIG. 9. Equations 12, 13, 15 and 16 apply to the sequence circuit as well as the timer circuit. Equations 37 to 42 inclusive apply to the operation of gates 1052 to 1057, inclusive, and the gates in tandem therewith in controlling the setting and resetting of flip-flops FF—HC, FF—HD and FF—HE. These equations relate to the logic by which the counter advances from state and state in a binary manner. The operation is shown graphically in FIG. 20. The operation may be understood from the equations, circuits, and chart by comparison with the corresponding description for the timer circuit.

The binary code registered by the flip-flop FF—HC, FF—HD and FF—HE is translated by a matrix 1080 comprising OR gates 1081 to 1088, and is inverted and amplified by the amplifiers 1091 to 1098, to apply a true signal on one out of eight output leads. The translation equations are as follows:

$$H_N = Hc_0Hd_0He_0 \quad (43)$$
$$H_1 = Hc_1Hd_0He_0 \quad (44)$$
$$H_2 = Hc_0Hd_1He_0 \quad (45)$$
$$H_3 = Hc_1Hd_1He_0 \quad (46)$$
$$H_4 = Hc_0Hd_0He_1 \quad (47)$$
$$H_5 = Hc_1Hd_0He_1 \quad (48)$$
$$H_6 = Hc_0Hd_1He_1 \quad (49)$$
$$H_7 = Hc_1Hd_1He_1 \quad (50)$$

Since inversion is obtained in the amplifiers 1091 to 1098, OR gates are used in the translation matrix 1080, and the input and output signals at these gates is the inverse of the conditions shown by Equations 40 to 47. The output signals HN and H1 to H5 as well as HA–1 are supplied through sub group 1001 of conductor group 401 to the other register control circuits as shown in FIG. 4.

*Sequence advance and reset*

The advance control flip-flop FF—HA may be set 1 in accordance with Equation 33, which represents the operation of gates 1011 to 1019 inclusive. When the link is seized the signals at gate 1011 in coincidence with P2 causes the advance from normal to H1. After each digit, when the timer has advanced to F100 the signals at gate 1012 in coincidence with P2 cause the sequence circuit to advance to H2 at the end of the first digit and to H3 at the end of the second digit. If the called line is idle the signals at gate 1013 in coincidence with P3 causes the sequence circuit to advance to H4. When the called line answers the signals at gate 1014 in coincidence with P3 causes the sequence circuit to advance to H5.

The reset of the sequence circuit is controlled by flip-flop FF—HB which is set 1 by the signal from the AND gate 1010 represented by Equation 34. The signal on lead HN is inverted by amplifier 1020 and applied as an input to gate 1010 to prevent operation of flip-flop FF—HB if the sequence circuit is already at normal. The other inputs to gate 1010 are obtained when both calling and called party are on hook, the timer has reset to normal, and the calling party is not dialing.

Both flip-flops FF—HA and FF—HB are reset by the pulse P13 at the end of every logic cycle. Neither of these flip-flops is associated with memory cores.

D2*e*. *Dialing supervisory circuit* (*FIG. 11*)

The dialing supervisory circuit 1100, shown in FIG. 11, includes a pair of recirculating flip-flops FF—B and FF—R which are associated with columns of cores in the low speed memory 140. This circuit supervises the dialing so as to permit the line number register 130 to advance only once for each dial pulse, with the registration being in the proper one of the tens register 1300 or units register 1301.

The B register sets 1 and remains set during each digit. The R register sets 1 during each dial pulse after the pulse has been registered in the line number register, and remains set during the pulse. The B register includes the flip-flop FF—B and the cores threaded by conductor pair B in the low speed memory 140. The state of the register is stored in the flip-flop during the link's logic cycle and in the core during the remaining portion of each frame, the information being read from the core during P1 of the link's logic cycle through amplifier 1131 and OR gate 1116 to set the flip-flop and written back in the core through the constant current generator G—B during P12 of the same logic cycle, with the flip-flop being cleared by resetting during P13 through OR gate 1115. Similarly the R register comprises flip-flop FF—R and the cores threaded by conductor pair R, with read-out through amplifier 1132 and OR gate 1123, write-in through concurrent generator G—R, and reset during P13 through OR gate 1124.

The logic equations for these flip-flops are as follows:

$$B \text{ set } 1 = (H_1 + H_2)Ea_0P_5 + S_B \quad (51)$$
$$B \text{ set } 0 = Ha_1P_4 + F_{280} + P_{13} \quad (52)$$
$$R \text{ set } 1 = B_1Ea_0P_4 + S_R \quad (53)$$
$$R \text{ set } 0 = Ea_1F_NP_3 + P_{13} \quad (54)$$

Gate 1112 permits the flip-flop FF—B to set only during the sequence states for the tens digit or units digit; and during these sequence states, when the calling line loop is opened at the beginning of a digit the signal on EA–0 in coincidence with P5 at gate 1114 produces a signal which is applied through gate 1116 to cause the flip-flop to set 1. At the end of the digit the sequence advance flip-flop becomes set 1, and the signal on lead HA–1 in coincidence with P4 at gate 1113 produces a signal which is applied through gate 1115 to cause the flip-flop FF—B to set 0. The flip-flop is also set 0 if the calling party hangs up and causes the timer to advance to F280. During the first pulse of a digit, the flip-flop FF—B sets in P5. During the logic cycle of the second frame, with B–1 and EA–0 true, during P4 the flip-flop FF—R will set 1 through gates 1121 and 1123. At the end of the pulse with EA–1 true and the timer reset to normal at $F_N$, flip-flop FF—R resets in P3 through gates 1122 and 1124. During succeeding pulses of the digit the flip-flop FF—R will be set when EA–0 is true and reset when EA–1 is true, thus following the dial pulses. Logic in the line number advance circuit 1200 causes the line number register 130 to advance at the beginning of each dial pulse while B–1 and R–0 are true in time slot P3. The flip-flop FF—R then sets in P4 to prevent further advance of the line number register during that pulse. Thus the line number register is advanced once and only once for each dial pulse.

D2*f*. *Line number advance circuit* (*FIG. 12*)

The line number register advance circuit, shown in FIG. 12, determines whether the tens register 1300 and the units register 1302 in the line number register 130 will advance, rewrite, or clear for a link during its logic cycle. The line number register is controlled for both line finder action of an allotted link scanning for a calling line, and connector action of registering a called number during dialing. Since during a link's logic cycle, P2 coincides with the calling line and P3 coincides with the called line, those gates in FIG. 12 which relate to line finder action have a P2 input, and those which relate to connector action have a P3 input.

The logic circuits in the line number register 130 are designed to use inverted signals; therefore the output signals from the line number register advance circuit 1200 are also in inverted form. The output amplifiers 1219, 1229, 1239 and 1249 perform the functions of both amplifying the output signal and inverting it. The signals TA and UA are for tens advance and units advance respectively, and the signals TB and UB are for tens rewrite and units rewrite, respectively. The output is normally in a condition for rewrite, that is, TA and UA are at ground so that TA′ and UA′ are at a negative potential, and TB and UB are at a negative potential so that TB′ and UB′ are at ground.

The equations are as follows:

$$Ta=C_{P1A}(U_9P_2HnS_1C_1+U_9P_2HnS_1Ea_0+P_3H_1B_1R_0Ea_0) \quad (55)$$

$$Tb=C_{P1A}Ta'(P_3B_0H_1)' \quad (56)$$

$$Ua=C_{P1A}(P_2HnS_1C_1+P_2HnS_1Ea_0+P_3H_2B_1R_9Ea_0) \quad (57)$$

$$Ub=C_{P1A}Ua'(P_3B_0H_2)' \quad (58)$$

All of the outputs are gated by the clock pulse CP–1A.

A scanning link, that is one in which the sequence circuit has the normal output HN, and the allotted output is S–1, controls the line finder advance by means of gates 1211, 1212, 1231 and 1232. The units may advance in any logic cycle, while the tens may advance only if UC–1 and UF–1 (code for U9) from the units register 1302 are true. Advance occurs if the scanned line is busy and therefore has a C–1 output to gates 1211 and 1231, or if the line is on hook and therefore has an EA–0 signal on gates 1212 and 1232.

For connector action, gate 1213 produces a tens advance once per dial pulse during the dialing of the tens digit with the sequence in its H1 state, and the gate 1233 permits the advance once per dial pulse during the dialing of the units digit with the sequence in its H2 state.

The tens rewrite signal is inhibited whenever the tens advance signal appears by applying the inverted signal from lead TA′ to gate 1226; and similarly the units rewrite is inhibited by the units advance by connecting the inverted signal from UA′ to gate 1246. The rewrite may also be inhibited by the connector without an advance signal to clear the register. The connector supplies the clearing signal at gate 1222 when the sequence advances to H1 before the beginning of the tens digit, with B–0 still true; and at gate 1242 when the sequence has advanced to H2 before the beginning of the units digit, with B–0 true. The output of gate 1222 is inverted by amplifier 1225 and applied to AND gate 1226; and the output of gate 1242 is inverted by amplifier and applied to AND gate 1246.

D3*a*. *Line number register* (*FIG. 13*)

The line number register 130 comprises a tens register 1300 and the units register 1302 which are identical; therefore only the tens register 1300 is shown in the functional block diagram of FIG. 13.

The tens register 1300 includes five flip-flops FF—TC, FF—TD, FF—TE, FF—TF, and FF—TG; each associated with a column of cores in the high speed memory 150. These flip-flops are shared on a time division basis by the forty time positions of a transmission cycle; the state of the registers for any time position being registered in the flip-flops during its own time slot and stored in the cores at all other times. During the 0.5-microsecond guard interval of each time slot a reset pulse is supplied from lead CP.5 to each of these flip-flops. At the same time a read pulse is applied to one of the horizontal rows in the high speed memory 150, and cores which are in the state 1 produce a pulse on the sense winding of the corresponding ones of the conductors TC, TD, TE, TF and TG; which are applied as positive pulses to the S1 inputs of their respective flip-flops to override the reset pulse at the SO input, and thereby cause these flip-flops to be set 1.

The digit is registered in the flip-flops and cores in a two-out-of-five code as shown in Table II.

TABLE II

| | C | D | E | F | G |
|---|---|---|---|---|---|
| 1 | X | X | | | |
| 2 | | X | X | | |
| 3 | | | X | X | |
| 4 | | | | X | X |
| 5 | X | | | | X |
| 6 | X | | X | | |
| 7 | | X | | X | |
| 8 | | | X | | X |
| 9 | X | | | X | |
| 0 | | X | | | X |

The output from the flip-flops is translated into the required one-out-of-ten code by a translation matrix comprising gates 1321 to 1330 inclusive. These gates are followed respectively by output amplifiers 1331 to 1340 inclusive. Since these amplifiers are of the grounded emitter type and therefore invert the signals, the gates of the translation matrix are designed to supply inverted signals to the amplifiers by using OR gates with inverted input signals obtained from the zero outputs of the flip-flops. The output signals are required to be supplied to the line circuits during the 1.5 microsecond interval of the time slot; therefore the pulse on lead CP1.5 is amplified and inverted by amplifier 1311 and supplied to each of the translation matrix gates. As an example of the translation, note from Table II that the code for digit 1 is C and D, and therefore the flip-flops FF—TC and FF—TD will be set 1 for this digit. The zero outputs of these flip-flops are supplied to gate 1321 along with the inverted clock pulse from amplifier 1311. When all of these inputs are false the output lead T1′ is false, and therefore the output from amplifier 1331 to lead T1 is true. In like manner the operation for translating each of the other nine digits may be understood by reference to Table II.

Also during the 1.5 microsecond interval of a time slot a ½ write pulse is applied over the DP lead of the horizontal row and supplied to one of the link transmission gates. During this interval ½ write pulses would be supplied to the writing conductors of two of the five conductor pairs TC, TD, TE, TF, and TG. These pulses are obtained from respective ones of the constant current generators G—TC, G—TD, G—TE, G—TF, and G—TG. These constant current generators are controlled by logic circuits in accordance with the registration in the flip-flops and the signals applied to the lead TA′ and TB′ from the line number register advance circuit 1200. The constant current generators act as inverters; therefore the logic circuits and all of the inputs thereto are in inverted form.

The input control signals to the generators G—TC to G—TG inclusive are supplied respectively by the outputs of "AND" gates 1361, 1362, 1363, 1364, and 1365. The rewrite control lead TB′ is connected at an input to each of the gates 1341, 1342, 1343, 1344, and 1345, the outputs of which are connected as respective inputs to the gates 1361 to 1365 inclusive; and the advance control leads TA′ is connected as an input to each of the gates 1351, 1352, 1353, 1354 and 1355 the outputs of which are also connected as respective inputs to the gates 1361 to 1365 inclusive. When all of the inputs to any one of the OR gates 1341 to 1345 or 1351 to 1355 is false, the output of the following AND gate will also be false, and the corresponding one of the constant current generators will be triggered by this inverted signal to deliver a constant current pulse over its output to the corresponding column of cores.

The usual operation is to rewrite the information from the flip-flops back into the same cores. Normally, in the line number register advance circuit 1200, the signal TB is true except when inhibited, and the inverted signal TB′ is therefore false. The OR gates 1341 to 1345 which have an input from the lead TB′ also have respective inputs from the zero outputs of the flip-flops. Thus if any flip-flop is set 1 its zero output is false, and along with the false signal on TB′ will trigger its constant current generator to produce a ½ write signal into the corresponding column of cores. For example, when the digit one is registered with flip-flops FF—TC and FF—TD set 1 the false signal on lead TC–0 in conjunction with the false signal on lead TB′ at gate 1341 produces a false signal at the input of gate 1361 so that the input to generator G–TC is false and therefore is triggered to produce a ½ write constant current signal on lead TC—W of conductor pair TC; and in like manner the zero output from flip-flop FF—TD is supplied to gates 1342 and 1362 to give a false signal at generator G—TD and to thereby cause a ½ write constant current pulse to be supplied over lead TD—W of conductor pair TD. Therefore in the horizontal row in which the ½ write pulse is supplied, the cores in the column threaded by conductor pairs TC and TD will be set 1, while the cores threaded by conductor pairs TE, TF, and TG will remain set 0.

When a tens advance signal is produced in the line number register advance circuit 1200, the TA signal becomes true and inhibits the TB signal, so that the inverted signals TA′ becomes false and TB′ becomes true. Then according to the digit registered in the flip-flop, two of the OR gates 1351 to 1355 will have false outputs to trigger their constant current generators; while the inputs to the other three generators will be true and will therefore have no output. For example, if the digit 3 is registered with the flip-flops FF—TE and FF—TF set 1, when the advance signal TA′ becomes false, the zero output of flip-flop FF—TE at gate 1354 causes a false signal at the output of gate 1364 to trigger the generator G—TF to supply the ½ write signal on lead TF—W, and the zero output of flip-flop FF—TF at gate 1355 causes a false signal from gate 1365 to trigger the generator G—TG and produce a ½ write pulse on lead TG—W. Therefore the cores threaded by conductor pairs TF and TG and the horizontal row being pulsed will be set 1, while the three cores in this row threaded by the conductor pairs TC, TD, and TE remain set 0. Therefore the digit 4 is now registered in this row.

By inspection of Table II it will be noted that advance from digit to digit causes the code elements to be advanced in a normal sequential manner in the manner C, D, E, F, G, C etc., except for the advance from five to six, and also for zero back to one. For advancing from five to six, the advance from C to D should be inhibited and E should be written instead. For the advance from 0 to 1, the advance of the code element from D to E should be inhibited, and D should be rewritten instead. Also in the operation of the line number register advance circuit 1200, the advance and rewrite signals may both be inhibited so that all five cores remain set zero, to clear the register in preparation for further operation. It is then desired that the next advance signal should produce the registration of digit 1, which requires that the code elements C and D be set 1. Using A to designate the advance signal, B to designate the rewrite signal and C through G inclusive to represent the code elements as shown in Table II, the required write-in pulses could be represented by the following equations:

$$C \text{ write}=BC+A(G+C'D'E'F') \quad (59)$$

$$D \text{ write}=BD+A(C+D'E'F'G'+DG)(C'+G') \quad (60)$$

$$E \text{ write}=BE+A(D+CG)(D'+G')(C+D+E+F+G) \quad (61)$$

$$F \text{ write}=BF+AE \quad (62)$$

$$G \text{ write}=BG+AF \quad (63)$$

However, since the constant current generators require inverted input signals, it is necessary to invert these equations. Adding the prefixes for the tens register, and using the designations shown in FIG. 13, the inverted equations read as follows:

$$Tcw'=(Tb'+Tc_0\{Ta'+Tg_0(Tc_1+Td_1+Te_1+Tf_1)\} \quad (59')$$

$$Tdw'=(Tb'+Td_0)\{Ta'+Tc_0(Td_1+Te_1+Tf_1+Tg_1)(Td_0+Tg_0)+Tc_1Tg_1\} \quad (60')$$

$$Tew'=(Tb'+Te_0)\{Ta'+Td_0(Tc_0+Tg_0)+Td_1Tg_1+Tc_0Td_0Te_0Tf_0Tg_0\} \quad (61')$$

$$Tfw'=(Tb'+Tf_0)(Ta'+Te_0) \quad (62')$$

$$Tgw'=(Tb'+Tg_0)(Ta'+Tf_0) \quad (63')$$

To cause the advance of the tens register from the cleared condition to digit 1, the gate 1379 supplies the quantity ($TC$–1+$TD$–1+$TE$–1+$TF$–1) of Equation 59′ for triggering the generator G—TC; and the gate 1376 supplies the quantity ($TD$–1+$TE$–1+$TF$–1+$TG$–1) of Equation 58′ for triggering generator G—TD.

To produce the rewrite of the code element the advancing from zero to one, the gate 1377 supplies the quantity ($TD$–0+$TG$–0) of Equation 60′. To produce the advance from five to six, the AND gate 1375 supplies the quantity ($TC$–1×$TG$–1) of Equation 60′ for inhibiting the element D; and the OR gate supplies the quantity ($TC$–0+$TG$–0) of Equation 61′ for triggering generator G—TE. To produce the advance from 0 to 1, the OR gate 1377 supplies the quantity ($TD$–0+$TG$–0) of Equation 60′ for triggering the generator G—TD; while the AND gate 1374 supplies the quantity ($TD$–1×$TG$–1) and gate 1373 supplies the quantity ($TC$–0×$TD$–0×$TE$–0×$TF$–0×$TG$–0)

for inhibiting the generator G—TE. The gates 1372, 1378 and 1380 are used along with the other gates to combine the various quantities as required by the equations.

D3*b*. *Signal state register* (*Fig. 14*)

The signal state register 1400 comprises five flip-flops FF—BT, FF—DT, FF—RG, FF—RT, and FF—ST associated respectively with conductor pairs BT, DT, RG, RT, and ST, which thread vertical columns of cores in the high speed memory 150. The flip-flops are shared on a time division basis by the forty time positions of a transmission cycle; the state of the registers for any time position being registered in the flip-flops during its own time slot and stored in the cores at all other times. During the 0.5-microsecond guard interval of every time slot a reset pulse is applied from lead CP.5 through the OR gates 1431 to 1435 to each of the flip-flops. At the same time the read pulse is applied to one of the horizontal rows in the high speed memory 150, and cores which are in the state 1 produce a pulse on the sense winding of the corresponding ones of the conductor pairs BT, DT, RG, RT, and ST which are applied to an S1 input of the corresponding flip-flop to override the reset pulse at the SO input, thereby causing these flip-flops to be set 1. For writing back into the cores constant current generators G—BT, G—DT, G—RG, G—RT, and G—ST are associated respectively with the flip-flops. These generators are controlled by the zero output of the flip-flops, and clock pulse CP1.5. If any flip-flop is in the set 1 condition, the false signal at its zero output is used to trigger the constant current generator, which inverts the signal and applies a ½ write pulse to the corresponding vertical column of cores. During the 1.5-microsecond interval of the time slot a ½ write pulse is supplied to the horizontal row on the DP lead, so that any cores in that row which are being supplied with a ½ write pulse from the constant current generator will be set 1.

Output from the signal state register is utilized during the 1.5-microsecond interval of the time slot. However the flip-flops are set and reset during the 0.5-microsecond guard interval; therefore the flip-flop output overlaps the required interval and should be gated with a clock pulse.

Amplification is then required to supply the required load current. Using grounded emitter amplifiers to obtain current amplification necessitates using inverted input signals to them. The signal on lead CP.5 is the inverse of the CP1.5 signal and is therefore supplied to an input of each of the OR gates 1441 to 1445 inclusive. Each of these OR gates also has an input connected to the zero output of a corresponding flip-flop. The outputs of the OR gates are connected to the inputs of amplifiers 1451 to 1455 respectively, and the outputs of these amplifiers supply the required signals to the other circuits of the system. Thus when any one of the flip-flops is set 1 its zero output is false, and during the 1.5-microsecond interval the clock pulse is false, so that the output of the OR gate is false and triggers the amplifier to produce a true output signal.

The states of the registers are thus recirculated and appear in the flip-flops during one time slot per transmission cycle for each link. The registered states for any link can be changed only during that link's logic cycle, in accordance with signals received on line 401 from the register control circuits 400. These changes are controlled by the logic circuits, with those relating to the calling line gated by the clock pulse P2 and those relating to the called line gated by the clock pulse P3. These changes occur in accordance with the state of the sequence circuit in the register control circuit. Three of the flip-flops, FF—BT, FF—DT, and FF—RT control transmission gates for transmitting busy tone, dial tone, and ringing tone respectively over the multiplex highway to the calling line. The flip-flop FF—RG supplies signals to the line circuits for controlling the ringing of a called line. The flip-flop FF—ST controls the link transmission gates for both the calling and the called line.

When a link is idle all five of its registers in the signal state register 1400 are reset. When the link is seized, the signal H1 at gate 1413 gated with the clock pulse P2 sets the flip-flop FF—DT so that dial tone is then supplied to the calling line. After the tens digit is dialed and the sequence changes over to units advance, the signal on lead H2 at gate 1414, gated with pulse P2, through gate 1432 resets the flip-flop FF—DT before the state thereof is written back into the core. After the units digit is dialed the sequence advances to the busy test position and places a signal on lead H3. If the called line is busy the timer advances to F120 and during the pulse interval P2 gate 1411 supplies an output signal to set the flip-flop FF—BT. Then when the calling line hangs up the signal EA–0 in coincidence with H3 and P2 at gate 1412, through gate 1431 resets the busy test flip-flop FF—BT. If the called line is idle, no set or rest signals are supplied to the busy test flip-flop FF—BT. Instead the sequence advances to the ringing condition H4, and during P2 the gate 1418 supplies the signal to set the ringing tone flip-flop FF—RT for a calling line, and during P3 the AND gate 1415 supplies a signal to set the flip-flop FF—RG for ringing the called line. When the called line answers the sequence advances to the conversation condition, placing a signal on lead H5. During the pulse interval P2 the signal through OR gate 1419, AND gate 1421, and OR gate 1434 resets the flip-flop FF—RT; and through OR gate 1422 and AND gate 1423 the flip-flop FF—ST is set. During the pulse interval P3, the signal through OR gate 1416, AND gate 1417, and OR gate 1433 resets the flip-flop FF—RG; and a signal through OR gate 1422, AND gate 1423 sets flip-flop FF—ST. After both parties have hung up and the link has returned to normal the timer is reset to normal and a signal supplied to lead $F_N$. The calling line "on hook" signal EA–0 is gated with P2 at gate 1425 and the called line "on hook" signal EB–0 is gated with P3 at gate 1426. These signals are then gated through gates 1427, 1424, and 1435 to reset the flip-flop FF—ST in the calling and called time slots respectively.

The equations are as follows:

$$Bt \text{ set } 1=F_{120}H_3+S_{BT} \quad (64)$$

$$Bt \text{ set } 0=Ea_0H_3P_2+C_{P.5} \quad (65)$$

$$Dt \text{ set } 1=H_1P_2+S_{DT} \quad (66)$$

$$Dt \text{ set } 0=H_2P_2+C_{P.5} \quad (67)$$

$$Rg \text{ set } 1=H_4P_3+S_{RG} \quad (68)$$

$$Rg \text{ set } 0=(H_5+F_N)P_3+C_{P.5} \quad (69)$$

$$Rt \text{ set } 1=H_4P_2+S_{RT} \quad (70)$$

$$Rt \text{ set } 0=(H_5+F_N)P_2+C_{P.5} \quad (71)$$

$$St \text{ set } 1=H_5(P_2+P_3)+S_{ST} \quad (72)$$

$$St \text{ set } 0=F_N(Ea_0P_2+Eb_0P_3)+C_{P.5} \quad (73)$$

E. OPERATION

E1. *Transmission*

The transmission, line, and link circuits are shown in FIGS. 2 and 3. The principal portion of the transmission line ML1—ML2 comprises a multiplex conductor TL having one end TL1 connected in multiple to the transmission gates of all the line circuits, and having its other end TL2 connected in multiple to the transmission gates of the link circuits and the signaling circuits. This conductor extends through the transmission control unit 110 with windings of transformers 361 and 362 in series. This conductor TL extending from the line circuit transmission gates to the link circuit transmission gates is referred to herein as the highway. The transmission arrangement is of a type which provides two-way transmission over the same highway and the same time channel, as covered by A. H. Faulkner in his U.S. patent application, Serial No. 764,979, filed October 2, 1958, for a Time Division Mutiplex System now Patent No. 2,987,577; and generally similar to the arrangement shown in his U.S. Patent No. 2,854,516 and his copending applications, Serial No. 530,085, filed August 23, 1955 now Patent No. 2,931,863; and Serial No. 707,298, filed January 6, 1958. The transmission gates connected to the end TL1 of the highway, such as gate TG1 in line circuit LC11, each includes a storage capacitor 220, a PNP transistor 224, a diode 221 connected between the collector electrode of the transistor and the storage capacitor, and a diode 222 connected between the collector electrode of the transistor and conductor TL1, each of the diodes being poled with its anode connected to the collector electrode of the transistor. Each of the transmission gates connected to the end TL2 of the highway, such as gates TG2 and TG3 in link LK1, are similar to gate TG1 except that the transistors are of the NPN type, and the diodes connected to the storage capacitors and to the conductor TL2 are poled with their cathodes connected to the collector electrode of the transistor. The control pulses are supplied by special gate circuits 320 and 322 which supply inverted output pulses when the inputs are all true. Each of the transmission gates at each end of the highway also includes biasing circuit elements connected to appropriate direct current potential sources. Because of the similarity of the link circuit transmission gates to the line circuit transmission gates, except for the polarity of the circuit elements and the value of the biasing potentials, they are not shown in detail.

For an explanation of the operation of the multiplex transmission system, assume that gates TG1 and TG2 have been effectively connected by time channel 1, the gates being supplied with coincident control pulses in time slot 1, to gate TG1 on lead 251 and to gate TG2 on lead 324. Constant current flows from the collector circuit of transistor 224 through diode 221 into condenser 220, causing the potential to change at a linear rate. A similar action occurs in gate TG2. Without the transmission control unit 110, the potential at the two gates would change linearly until the potentials at the two gates became equal. Then the current would be diverted to flow from the collector of transistor 224 through diode 222 and over the highway into gate TG2 for the remaining duration of the control pulse applied to the two gates. At the end of the time slot, the two condensers would be at substantially the equalization potential. During the interval between pulses, current flow through diode 221 of gate TG1 is blocked, but the potential of condenser 220 changes slowly because of current flow into the audio portion of the circuit. Similarly, the potential at gate TG2 changes in the opposite direction. The values of the various circuit elements and bias potentials are so chosen with relation to the time intervals that with no modulation the diversion of the current over the common highway occurs at the center time position of each control pulse. When modulation is applied at either gate, the time position within the control pulse at which the current is diverted is shifted in proportion to the amplitude of the modulation. Thus, two-way transmission is obtained in the same time channel over the same common highway.

In the line circuit the audio coupling between the subscriber line and the transmission gate includes a transformer 210, an impedance converter comprising a transistor 212 shunted by a resistor 214, and a filter choke 216. The choke 216, in conjunction with the condenser 220, filters the pulse repetition frequency from the audio signal. The impedance converter is provided to obtain a high impedance at a low power level in the multiplex circuit with a low imepdance at a high power level across transformer 210. For signal flow from the transmission gate to transformer 210, the transistor 212 is connected as an emitter follower to give a power gain with an impedance step down, while for signal flow from transformer 210 to the transmission gate the resistor 214 is provided to obtain the desired impedance ratio. In the link circuit, the inductors 314 and 316 provide audio frequency coupling between the transmission gates TG2 and TG3. A bias potential is applied to the junction of these two inductors through a high impedance inductor 318. The connection to another subscriber line is completed in a different time channel through transmission gate TG3, the common highway, and the line circuit of the other line.

The operation of the transmission system is modified by the insertion of the transmission control unit 110 in the common highway, as disclosed in the Faulkner application, Serial No. 764,979 now Patent No. 2,987,577. The output of a sawtooth generator 364 is coupled into the highway through a transformer 361. This generator is controlled by the pulses on lead CP.5 to provide a voltage on the highway which varies linearly during the 1.5-microsecond interval of each time slot which is provided for transmission, and recovers during the 0.5-microsecond guard interval. The effect of this sawtooth voltage is to increase the deviation of the time position at which current commences to flow over the common highway, thereby reducing the transmission loss or even providing gain, as may be understood by reference to the said copending application.

A circuit including a transmission control conductor T—C in the multiplex lines ML1 and ML2 is provided to limit the duration of the current flow over the highway to a small fraction of each time slot. This conductor is connected in multiple as an input to AND gates through which the control pulses are supplied to all of the transmission gates, such as gates 232, 320, and 322 associated with transmission gates TG1, TG2, and TG3 respectively. Initially, during the 1.5-microsecond control pulse interval of each time slot, the signal on conductor T—C is true to enable these AND gates and permit control pulses to be applied to the selected transmission gates. When the current commences to flow over the highway, a signal is applied through a transformer 362 and a trigger circuit 365 to set the flip-flop 366 to 0. The voltage on conductor T—C, which is connected to the output "1" of the flip-flop 366 then becomes false and therefore disables the AND gates to terminate the control pulses to the transmission gates. During the guard interval, the pulse on conductor CP. 5 resets the flip-flop 366.

The transmission control unit 110 also includes a clamp circuit 363 for reducing cross talk by clamping the highway during the guard interval responsive to the pulse applied from lead CP.5.

The line circuit LC11 is controlled by coincident pulses on leads T1 and U1 of line 134 from the line number register 130 (FIGS. 1 and 5). These two leads are connected as inputs to each of the AND gates 232, 234, 236, and 238 of the line circuit. At gate 232, coincidence of the T1 and U1 pulses, in conjunction with the signal on lead T—C, controls the supply of control pulses on lead 251 to transmission gate TG1. The collector bias circuit of the transistor 212 of the impedance converter includes a condenser 218 shunting a resistor 219. When a train of pulses appears at lead 251, the operation of the transmission gate TG1 causes current flow through transistor 212 and thereby charges condenser 218 to a negative potential with a certain predetermined time constant. This potential is applied over input lead 252 of the gate 234, so that each time coincident pulses appear on leads T1 and U1 a pulse will appear on lead C to mark the line circuit busy.

E2. *Switching control*

The operation of the control circuits in establishing the connection between two local lines will be described with reference to FIGS. 2 to 14 inclusive, and the connector operation charts in FIGS. 21A, 21B and 21C. The figure number in which individual gates are shown may be determined from the portion of the reference character preceding the last two digits.

E2*a*. *Line finder action*

Usually several links will be idle, and therefore in the normal sequence state HN. There are two allotter options for designating scanning links, as explained in section D2*b*. In the first option, one idle link at a time is allotted for scanning, and in the second option all idle links scan. Assume that the first option is used, that therefore the jumper 810 is connected at the A–1 input of gate 816. The S register of the allotted link is set 1, while for all other links it is set 0.

Assume that link 1 is scanning. Then during logic cycle 22 of each frame (see Table I) the gates 1211, 1212, 1231 and 1232 of the line number register advance circuit 1200 will have the inputs HN and S–1 true. During the pulse interval DP1 of each transmission cycle the line number register 130 will supply one tens output and one units output to pulse one of the line circuits. The line circuit may or may not supply pulses to either or both of the leads E and C, depending upon its condition, but these will have no effect in the register control circuits 400 until logic cycle 22, when they coincide with P2. Then if the line circuit is not in use both E and C are false in P2 and the flip-flops FF—C and FF—EA in the line supervisory circuit 700 remain reset. At gate 1232 in the line number register advance circuit, EA—0 being true in coincidence with P2, the advance signal is applied on the output UA while the output UB is inhibited. If the line circuit is busy C will be true in coincidence with P2 to set the flip-flop FF—C. If the line is being rung the signal on lead RG is applied through gate 712 to set the flip-flop FF—C. The true signal on lead C–1 at gate 1231 will produce an output signal on lead UA while inhibiting UB. The line circuit for which C is true will also usually have E true except during a dial pulse, but in any case the signal on lead C–1 will produce an advance signal. The inverted signal UA′ is applied to the units register 1302 to cause it to advance to the next number. Whenever the scanning pulses from the line number register includes U9, output from either gate 1211 or 1212 will produce a tens advance signal TA while inhibiting TB; and the inverted signal TA′ will cause the tens register 1300 to advance. Thus the tens cores and the units cores in row 1 of the high speed memory 150 will be advanced one number in the two-out-of-five code until a calling line is found.

Assume that the subscriber at station S11 lifts his receiver to initiate a call, and that he wished to call station S22. Then in line circuit LC11 the signal on conductor 253 becomes true. Lead 254 is in the true condition except during ringing. When the scanning has advanced to this line so that the line number register has outputs T1 and U1 true during DP1 of each transmission cycle, output pulses will be obtained from gate 236 and applied to the conductor E. In logic cycle 22 the pulse on E in coincidence with P2 will set the flip-flop FF—EA in the line supervisory circuit 700. Since the condenser 218 of the line circuit has not yet charged no pulses are obtained on lead C, so flip-flop FF—C remains reset. In the allotter 800 the flip-flop FF—S is still set 1. Therefore in the sequence circuit 1000 at gate 1011 an output signal is produced which is in coincidence with P2 and therefore sets the flip-flop FF—HA. This causes the sequence circuit to advance to its H1 state, indicating that the link has been seized and is ready for dialing of the tens digit.

With the sequence off normal, HN is false, and therefore in the line number register advance circuit 1200 no more advance pulses can be produced in succeeding frames. In the line circuit, the gate 232 is pulsed to supply pulses over conductor 251 to the transmission gate TG1 once per transmission cycle, causing the condenser 218 to charge. After one or more frames the train of pulses will commence on lead C. In the allotter 800, when the pulses on lead C–1 coincide with P2 at gate 812, the flip-flop FF—A is set 1. In P4 of this logic cycle, gate 818 supplies a pulse to reset the flip-flop FF—S.

The line circuit continues to be pulsed during DP1 once per transmission cycle, and is ready for dialing.

In the first frame after the advance of the sequence circuit, H1 in coincidence with P2 at gate 1413 in the signal state register 1400 sets the flip-flop FF—DT. This condition is circulated with the cores of the high-speed memory 150 threaded by the conductor pair BT, so that pulses are supplied to the signalling circuit 170, so that dial tone is supplied in the time position DP1 over the multiplex transmission highway TL to the line circuit LC11. The line circuit continues to be pulsed during DP1 once per transmission cycle, with dial tone supplied to the calling subscriber station, and the link is ready in the register control circuits 400 to receive dial pulses.

E2*b*. *Connector action*

The connector action is illustrated graphically by the charts in FIGS. 21A, 21B, and 21C. In these charts, as well as in the charts of FIGS. 19 and 20, only the logic cycles of one particular link are shown; for example, logic cycle 22 for link 1. The guard intervals between pulses have been ignored to simplify the charts. Only a few selected frames in which significant changes occur are shown.

E2*b*1. *Seizure*

Whenever the calling line loop is closed and therefore produces a pulse on lead E in P2 of the link's logic cycle, EA–1 becomes true in P2 and remains true during the logic cycle until reset occurs in P13. The first frame in FIG. 21A shows the seizure, HA–1 becoming true in response to EA–1 in P2, thereby causing the sequence to advance from HN to H1 in P4. In the next frame, dial tone is initiated by D—T becoming true in the time slot P2 in response to H1. At gate 1222 in the line number advance circuit, in each frame in which H1 and B–0 are true the rewrite signal TB is inhibited during the called line time slot P3. Thus, the five cores for the tens digit in this link's called line row DP2 of the high speed memory 150 is cleared in preparation for dialing.

E2*b*2. *Tens digit dialed*

A number of frames later dialing of the tens digit commences, the line loop is opened, so no pulse appears on E during P2, the flip-flop FF—EA is not set, and EA–1 is therefore false. At gates 1112 and 1114 of the dialing supervision circuit, the signals H1, EA–0, and P5 produce an output for setting the flip-flop FF—B, so that B–1 becomes true. In the next frame after the B register is set, the input signals at gate 1213 of the line number advance circuit are all true in P3, thereby producing an advance signal on output TA and inhibiting the rewrite signal TB. The tens register 1300 is advanced from the cleared condition to the two-out-of-five code representing the digit 1. The condition for setting the flip-flop FF—R is B–1 and EA–0 true during P4 at gate 1121. The signal B–1 does not become true until P5 of the preceding frame, and flip-flop FF—R, therefore, remained reset. However, in the frame in which the advancing pulse is produced, flip-flop FF—R becomes set. With the signal R–0 false at gate 1213, no further advance pulses can be produced in succeeding frames, and the digit 1 will be rewritten.

With B–1 true, the timer advances in each P20 frame. Two or more such P20 frames will occur while the loop is opened for each digit. The advance is from $F_N$ to F0 in the first P20 frame, to F20 in the next P20 frame, etc. At the end of the pulse, EA–1 again becomes true. At gate 912 of the timer, the signals EA–1, B–1, and R–1 produce a signal for setting the flip-flop FF—FB of the next P20′ frame. The signal FB–1 causes the timer to reset to $F_N$. At gate 1122 of the dialing supervision circuit, the signals $F_N$, EA–1, and P3 reset the flip-flop FF—R, so that R–1 becomes false. In the inter-pulse interval EA–1 is true in each frame, and B–1 continues true, while R–1 is false. The timer starts from $F_N$ and advances in each P20 frame. However, the line loop is again opened for the second pulse well before the timer reaches F100. Upon the opening of the line loop, the gate 1213 produces a signal in P3 to obtain an advance signal TA while inhibiting TB. In P4 the output of gate 1121 again sets the flip-flop FF—R, so that the advance signal does not appear in succeeding frames. In the tens register 1300 the digit 2 has now been registered and will be rewritten. At the end of the pulse the conditions are the same as at the end of the first pulse. EA–1 becomes true. H1 and B–1 continue true, R–1 becomes false. The signal FB–1 is produced to reset the timer to $F_N$.

At the end of the second dial pulse, the timer has reset to $F_N$, and then advances in each P20 frame. Since another dial pulse does not occur, the timer advances to F100. In the next frame after F100 becomes true, change-over occurs. In P2 of this frame the signals B–1, R–0, and F100 at gate 1012 cause the flip-flop FF—HA to be set 1. This causes the sequence circuit to advance from H1 to H2, which occurs in P5. In P3 the inputs HA–1, H1, and B–1 at gate 914 are all true, causing the flip-flop FF—FB to set 1, and therefore reset the timer to $F_N$. In P4 the signal HA–1 at gate 1113 causes the flip-flop FF—B to be reset. In the next frame the flip-flop FF—DT of the signal state register 1400 will be set 0 by the signal H2 in coincidence with P2 at gate 1414. During the interdigit delay period, the signal EA–1 will be true in each frame and the timer remains reset at $F_N$. During the interdigit period, the signals H2, B–0, and P3 at gate 1242 of the line number advance circuit causes the signal UB to be inhibited during P3 of each frame. Therefore, the units register is cleared in preparation for the second digit.

E2*b*3. *Units digit dialed*

When the line loop is opened by the first dial pulse of the units digit, flip-flop FF—EA will not be set 1, and flip-flop FF—B will be set. In the next frame, the units register 1302 will be advanced one step in P3 because of the input at gate 1233 of the line number advance circuit, and the rewrite signal UB is inhibited during this time slot. Flip-flop FF—R will be set in P4 to prevent UA from becoming true in succeeding logic cycles of this dial pulse. The timer will be advanced in any P20 frames which might occur during the dial pulse.

At the end of the first dial pulse, flip-flop FF—EA will again be set in P2, flip-flop FF—R is reset, and the timer is reset to $F_N$ by FB–1. The timer advances during P20 frames occurring during the interpulse interval, but the next dial pulse begins well before the timer reaches F100.

During the second dial pulse, flip-flop FF—EA again remains reset. The units register 1302 is advanced one step during the first frame of the dial pulse, and flip-flop FF—R is set 1 during the remainder of the dial pulse to prevent the units register from advancing again. The timer is advanced in each P20 frame which occurs during the dial pulse. At the end of the dial pulse, EA–1 becomes true, and the timer is reset to $F_N$ by FB. Flip-flop FF—R is reset as before. Since this is the end of the last pulse of the units digit, the timer continues to advance in each P20 frame until F100 is reached.

Referring to the continuation of the connector operation chart on FIGURE 21C, on the first P20' frame after F100 becomes true, the signal from gate 1012 in coincidence with P2 sets the flip-flop HA and causes the sequence to advance from H2 to its busy test sequence H3. The flip-flop FF—B is reset by the signal HA–1 in coincidence with P4 at gate 1113.

E2*b*4. *Called line busy*

The first row of FIGURE 21C shows the condition if the called line is busy. The busy condition causes the flip-flop FF—C to be set during P3, and prevents the advance of the sequence circuit because of the C–0 input at gate 1013. The timer circuit includes a special gate 951 for advancing the timer. The signals FD and FE are true during F100, and the signal H3 continues to be true. Therefore, in the next P20 frame the timer advances to F120. In the signal state register 1400, the signals F120 and H3 in coincidence with P2 at gate 1411 set the flip-flop FF—BT. Therefore, pulses BT–1 are supplied to the signalling circuit 170 during the calling line time slot, DP–1 (link 1) to supply busy tone over the multiplex highway to the calling line.

Upon hearing busy tone, the calling party will disconnect and flip-flop FF—EA will no longer be set 1. At gate 915 of the timer reset logic, F120 is supplied through gate 911, H3 is supplied through gate 913, and these, in conjunction with EA–0 and EB–0 cause the flip-flop FF—FB to be set 1, and thereby reset the timer to $F_N$. At gate 1010 of the sequence reset logic, the inputs are all true in P6 to set the flip-flop FF—HB, thereby setting the sequence circuit to its normal condition HN. The busy tone flip-flop FF—BT in the signal state register 1400 is also reset. The link is now idle.

E2*b*5. *Called line idle—ringing*

If the called line is idle, the timer advances to F100, and in the next frame to the sequence state H3, as shown in FIGURE 21C by the third and fourth frames of the second row, corresponding to the first two frames of the first. Since there are not pulses on C–1 in coincidence with P3, C–0 and the other inputs are true at gate 1013, to set the flip-flop FF—HA, and advance the sequence to the ringing state H4. In the next frame, the signal H4 appearing in the signal state register 1400 sets the flip-flop FF—RT during P2 by the signal at gate 1418, and in P3 the output from gate 1415 sets the flip-flop FF—RG. The signal state register 1400 now supplies the pulses during each transmission cycle with RT–1 in the calling line time slot causing ringing tone to be supplied from the signalling circuit 170 over the multiplex highway to the calling line, and the ringing signal RG–1 to be supplied directly to the line circuit.

E2*b*6. *Answer and conversation*

When the called party answers, the flip-flop FF—EB is set in P3. The signals H4 and FB–1 at gate 1014 of the sequence circuit, in coincidence with P3 set the flip-flop FF—HA and causes the sequence circuit to advance to its conversation state H5. In the next frame the RT and RG registers in the signal state register are reset by the signals from gates 1421 and 1417, respectively. The flip-flop FF—ST is set during both P2 and P3 by the output from gate 1423, so that both the calling and called lines are switched through. The output signal ST–1 from the signal state register is supplied to the transmission gates of the calling and called line in link 1 in the time slot DP–1 and DP–2, respectively. During conversation, lead E carries pulses coinciding with both P2 and P3 in the logic cycle 22 of each frame, so that both the flip-flops FF—EA and FF—FB are set. The signals H5 and F100 remain true during conversation.

E2*b*7. *Disconnect*

In the timer reset logic the signal H5 is supplied through gate 913 to gate 915, and the signal F100 is supplied through gate 911. As soon as both parties hang up so that both EA–0 and EB–0 are true, the gate 915 supplies a signal in P4 to set the flip-flop FF—FB, and thereby resets the timer to the normal condition $F_N$. In P6 the gate 1010 of the sequence circuit supplies a signal to set the flip-flop FF—HB, and thereby resets the sequence circuit to its normal condition HN. In the signal state register the signal EA–0 in coincidence with P2 resets the ST register for the calling line, and EB–0 in coincidence with P3 resets this register for the called line. The link is now idle.

The conditions represented by the calling party disconnecting during dialing or ringing are not shown on the connector operation chart. Disconnect during ringing is essentially the same as disconnect during conversation. In the signal state register the flip-flops FF—RT and FF—RG are reset in the respective time slots P2 and P3 when the timer is reset to $F_N$.

For disconnect during dialing, the signal B–1 remains true as during a dial pulse, and the timer advances until it reaches the state F280. This signal is then applied through gate 916 to set the flip-flop FF—FB and thereby reset the timer to normal $F_N$. The flip-flop FF—HB has been set 1 to reset the sequence circuit to normal HN. The link is then idle.

The various logic circuits may easily be arranged so that after disconnect during conversation, the timer would be advanced to F280 before release occurred.

After the link becomes idle from any of the stated conditions, the S register of the allotter continues in its reset condition for this link. The link is then ready to be allotted to scan for another calling line.

F. *Circuit details*

Representative circuits are shown in detailed schematic diagrams in FIGS. 22, 23, and 24, as examples of the types of circuits used in this system. Each of these figures shows one of the flip-flops associated with a column of memory cores, along with its associated constant current generator, amplifiers and logic circuits.

The logic gates are of a type using a diode for each input. In the AND gates the anodes of the diodes are connected to the respective inputs and the cathodes are connected in common to the output, and also through resistance to a source of negative voltage. In the OR gates the cathodes of the diodes are connected to the respective input terminals, and the anodes are connected in common to the output, and also through resistance to a source of positive voltage.

The amplifier and flip-flop transistors are connected in circuits which provide switching type operation. That is, each transistor has two stable states, one non-conducting and the other conducting with a very low collector-to-emitter voltage drop. To increase the speed of transition from non-conducting to conducting, each of these transistors has its collector biased to a relatively high voltage, and clamped through a diode to a somewhat lower voltage. The true output condition is obtained with the transistor non-conducting and its collector clamped to a negative voltage, usually −5 volts, although in a few cases a lower negative voltage is used. In the flip-flops the usual cross-coupling arrangement is used so that one transistor is conducting and the other is non-conducting. Since the collector electrodes are biased negatively, PNP type transistors are used. In most of the low speed circuits, type 2N269 transistors are used; and in the high speed circuits, microalloy type 2N393. For loads of less than 10 milliamperes, surface barrier type 2N240 transistors may be used.

F1. *Registration and circulation in a low speed circuit (FIG. 22)*

As a typical example of a low speed circuit, flip-flop FF—R and its associated circuits are shown by a schematic diagram in FIG. 22. These circuits are also shown in the functional block diagram of FIG. 11.

Referring to FIG. 22, the flip-flop FF—R includes a pair of transistors 2211 and 2212. This flip-flop is associated with the column of cores threaded by conductor pair R in the low speed memory 140. In the constant current generator G—R, a transistor 2214, which may be type 2N123, is provided to deliver a constant current to the memory cores. This output transistor is driven by another switching transistor 2213. To supply the proper output, inverted input signals must be supplied to the base of transistor 2213 through an OR gate 2231. The clock pulse input from input P12 is inverted by an amplifier comprising a transistor 2215, the output of which is connected to one input terminal of gate 2231. This clock pulse amplifier may be common to a number of constant current generators.

To further explain the circuit, the operation during the dialing of a digit in link 1 will be considered. In the memory 140, link 1 is assigned the core 2222 in the row driven by stage 22 of the distributor 616 (FIG. 6). Before dialing commences, the core 2222 is in a reset condition, and therefore, when a pulse is applied to the read conductor of distributor stage 22 during the P1 pulse interval of that logic cycle, no pulse is induced in the sense conductor of the conductor pair R. Therefore flip-flop FF—R remains reset with transistor 2211 conducting and 2212 non-conducting. In the constant current generator, the transistor 2215 is normally cut off with its collector clamped to −5 volts. This potential applied through gate 2231 maintains transistor 2213 in conduction. Then the collector electrode of transistor 2213 and the base electrode of transistor 2214 are near ground potential, and transistor 2214 is maintained cut off.

During the pulse interval P12, the input of transistor 2215 becomes negative and brings it in to conduction so that its collector electrode is switched to ground potential. However, the potential at the output R–0 from the flip-flop remains at a negative value and maintains transistor 2213 conducting. Therefore, no output is obtained from the constant current generator in the collector circuit of transistor 2214. During the pulse interval P12, a ½ write signal is supplied through the horizontal conductor of core 2222 but with no signal in the vertical conductor the core remains reset. For the connection in link 1, as long as the calling line loop remains closed, flip-flop FF—R remains reset in logic cycle 22, and the core 2222 remains continuously reset.

Assume now that the calling line loop is opened to begin a dial pulse. At the beginning of the next logic cycle 22, core 2222 is still reset, and therefore flip-flop FF—R remains reset during the reading pulse interval P1. Since no pulse appears on lead E in coincidence with the clock pulse P2, the line supervision flip-flop EA remains reset, as explained in section D2A and FIG. 7. During the pulse interval P4, the signal B–1 is still false, and therefore no output pulse is obtained from gate 1121. Therefore, flip-flop FF—R also remains reset during this logic cycle. The flip-flop FF—B is set during the interval P5, as explained in section D2E and FIG. 11. During the pulse interval P12, flip-flop FF—R is still reset and therefore core 2222 remains reset. In the next logic cycle 22, with core 2222 still reset, flip-flop FF—R remains reset during P1. During the pulse interval P2, the flip-flop FF—EA again remains reset and the signal EA–0 will be true for the rest of the logic cycle. The signal B–1 is also true during this logic cycle. Therefore, in the pulse interval P4 an output pulse is obtained from gate 1121, which is applied through gate 1123 to set the flip-flop FF—R so that transistor 2212 becomes conducting and transistor 2211 non-conducting. Then the potential at output R–0 is at ground, and during the pulse interval P12 the output of transistor 2215 switches to ground, so that the output from gate 2231 is at ground and transistor 2213 becomes cut off. With transistor 2213 non-conducting, the transistor 2214 is driven into conduction and a constant current pulse is delivered from its collector through the ½ write conductor of pair R through the column of cores to the −5 volt source. With a ½ write pulse delivered over line 186 from the distributor stage 22, the core 2222 becomes set.

At the end of the logic cycle, the pulse P13, applied through gate 1124, resets flip-flop FF—R so that it may be used by other links in other logic cycles.

In the next logic cycle 22, the read pulse from distributor stage 22 causes the core 2222 to switch from the set to the reset condition and thereby produce a positive pulse in the sense winding of the conductor pair R. Since this pulse has a low voltage and an irregular shape, and must set the flip-flop through a diode gate, an amplifier 1132 is used. In the normal condition, with no output on the sense winding, the transistor 2232 is at saturation with the electron current flowing from the −10 volt source through a resistor dividing and going through the diode and sense winding and also into the base of the transistor to keep it at saturation. When an output appears on the sense winding in the form of a positive pulse, it acts as a sink and draws the current that had been flowing into the transistor, cutting the transistor off so that its collector voltage changes from ground potential to the −5 volt clamping voltage. The negative pulse is applied through gate 1123 to set flip-flop FF—R. The flip-flop remains set during the logic cycle, and, during the pulse interval P12, the generator G—R delivers a constant current pulse from the collector of transistor 2214 in coincidence with the ½ write pulse from distributor stage 22 to set the core 2222. As long as the calling line loop remains open, this action is repeated during each logic cycle 22, the read pulse from distributor stage 22 causing the core 2222 to switch from set to reset and deliver a pulse which, through amplifier 1132 and gate 1123, sets the flip-flop FF—R, and during P12 the ½ write signals from generator G—R and distributor stage 22 setting the core 2222.

When the calling line loop is again closed at the end of the dial pulse, in the next logic cycle 22 the flip-flop FF—EA will become set during P2, and the signals at gate 912 in FIG. 9 will cause the timer to be reset so that $F_N$ becomes true. Then, during the pulse interval P3, an output signal is obtained from gate 1122, which is applied through gate 1124 to reset the flip-flop FF—R. Therefore, at the end of the logic cycle, the core 2222 remains reset. Both the core 2222, and during logic cycle 22, the flip-flop FF—R, continue to remain reset as long as the calling line loop remains closed. Thus, the register associated with conductor pair R for a particular link is set during a dial pulse, and is reset while the calling line loop is closed. For link 1 the condition is registered in the flip-flop FF—R during logic cycle 22, and in the core 2222 during all other logic cycles.

The other links similarly have a register associated with conductor pair R, using the flip-flop FF—R during their own logic cycles, and individual cores, such as core 2221 for logic cycle 2, and link 11.

Registers associated with conductor pairs S for the allotter; FC, FD, FE, and FF for the timer; HC, HD, and HE for the sequence circuit; and B for the dialing supervision circuit operate in the same circulating manner using flip-flops and memory cores, as has been described for the register associated with conductor pair R, in accordance with their individual logic requirements.

Other flip-flops in the register control circuits 400 are shared by all of the links, each in their own logic cycle, and reset by the pulse P13 during each logic cycle, but are not associated with cores in the low speed memory 140. Therefore, the condition for these flips-flops must be determined from their own logic input during each logic cycle. These flip-flops comprise FF—EA and FF—EB in FIG. 7, FF—FB in FIG. 9, and FF—HA and FF—HB in FIG. 10. Flip-flop FF—C in FIG. 7 follows the signal on lead C and is reset during the guard interval of each time slot. Flip-flop FF—A in FIG. 8 is not reset at the end of each logic cycle, but operates in the manner described in section D2*b*.

F2. *Line number registration and circulation* (*FIG. 23*)

The tens register is shown by functional block diagram in FIG. 13. In FIG. 23 a schematic diagram shows the flip-flop FF—TF, the constant current generator G—TF, and associated amplifiers and logic circuits, along with a portion of the high-speed memory 150. As the forty horizontal rows in the high-speed memory 150 are driven in turn by the distributor 612 (FIG. 6) with a 2-microsecond time slot for each, each receives a 0.5-microsecond read pulse on one conductor and a 1.5-microsecond ½ write pulse on the other conductor during its 2-microsecond time slot. The read winding is such that a read pulse will assure that all cores in the row will become reset. Any cores which had previously been in the set condition are thus switched from set to reset by the read pulse to produce a positive voltage in the sense winding, which causes a pulse to be delivered to the S1 input of the flip-flop.

During the 1.5-microsecond interval, any cores which are to be set will receive a constant current pulse on the ½ write vertical conductor. The design is such that only cores which receive ½ write pulses on both the horizontal and vertical conductors will become set; the current being insufficient to switch the cores receiving only one ½ write pulse.

A biasing unit 2340 including a transistor 2341 is provided to bias the vertical sense windings to prevent false operation produced by noise in the cores. At the end of the vertical ½ write pulse, a positive spike appears in the vertical sense-winding, because of the noise produced in the 39 cores which are not being set. During the 1.5-microsecond write interval, the collector of transistor 2341 is clamped to −5 volts. Since the positive noise spike in the sense windings does not exceed this value, no pulse operation is produced. During the 0.5-microsecond interval, the clock pulse CP.5 switches the transistor 2341 into conduction, causing current to flow from a −5 volt source through a resistor and a silicon diode 2342, thence through the transistor to ground. With the drop across the diode 2342, the sense winding is biased to about −0.5 volt, permitting a positive output pulse to be delivered from sense windings in which a core is switched from set to reset by a read pulse during this interval.

The flip-flop FF—TF is similar to the flip-flop FF—R shown in FIG. 22, except that because of voltage limitations of the microalloy transistors 2311 and 2312, the collector electrodes are resistance biased to −5 volts and are clamped at −3 volts. The input arrangement is also different. During the 0.5-microsecond guard interval of each time slot, the negative CP.5 pulse is supplied to the S0 input which connects through diodes and a condenser to the base of transistor 2312, to reset the flip-flop with transistor 2312 conducting and 2311 non-conducting. However, the S1 input comprises a diode 2351 which is also connected to the base electrode of transistor 2312. The design is such that if a positive pulse appears on the sense winding which is connected to the S1 input, it overrides the negative pulse at the S0 input, so that the flip-flop will then be in a set condition with transistor 2312 cut off and 2311 conducting. Thus, if at the beginning of the time slot the core which receives the read pulse had been previously set, it is switched to reset, and because of the positive pulse in the sense winding, the flip-flop will be in set condition for the remaining duration of the time slot; if there is no positive pulse on the sense winding, the clock pulse CP.5 causes the flip-flop to be reset and remain in that condition for the remaining duration of the time slot.

During the 1.5-microsecond interval of the time slot, the complete tens register produces an output pulse through the translation matrix and output amplifiers to one of the ten leads, and at the same time writes back into two of the five cores. During this interval, the clock pulse CP1.5 supplied to amplifier 1311 causes the transistor 2310 to conduct and bring its collector to ground potential. Assume that the tens digit in the register is three. Then the flip-flop FF—TF will be in the set condition with its output TF–0 at ground potential, and the conductor TE–0 from flip-flop FF—TE will also be at ground. Thus, all three inputs of translation matrix gate 1323 are at ground potential and therefore its output is at ground, cutting off the transistor 2333 in the output amplifier 1333. Therefore, a pulse is produced on output lead T3 at the −5 volt clamping potential. Reference to FIG. 12 shows that the output signals are all gated with the clock pulse CP1A, which as shown in FIG. 15, coincides with the first one microsecond of the pulse CP1.5. The resulting output signals in FIG. 12 are then inverted, so that on the conductors in group 128, the potential will normally be −5 volts, and only during the first microsecond of the 1.5-microsecond write interval will the selected conductors be at ground potential. Normally, the same number is to be rewritten, and for the tens register this one-microsecond ground potential is supplied to lead TB′. Referring again to FIG. 23, the ground signals in coincidence on leads TB′ and TF–0 causes a ground signal to be supplied through gates 1344 and 1364 to the base of transistor 2313 in the constant current generator G—TF. The transistor 2313 therefore becomes non-conducting, and the −3 volt clamping potential at its collector drives the parallel operated transistors 2314 and 2316 into conduction to deliver a ½ write constant current pulse to the column of cores, and the core which receives a ½ write pulse on its horizontal winding becomes set.

For this particular link, this action will be repeated every fortieth time slot, the set condition being transferred from the core to the flip-flop during the 0.5-microsecond interval and rewritten back into the core during the next microsecond.

When, for this link, a signal is received on lead TA′ to advance the tens digit from three to four, a ground pulse appears on lead TA′ in coincidence with the ground on lead TE–0 to produce a ground pulse through gates 1354 and 1364, causing the generator G—TF to deliver a constant current pulse to again set the core. However, reference to FIG. 13 and to Table II shows that the core for column TE is not set but that the core in column TF is set. When another advance signal is received for this link, a ground pulse is received on leads TA′ but the potential on lead TE–0 is at −3 volts. Therefore, no output is obtained from the constant current generator G—TF and the core in column TF remains reset.

In similar manner the other 39 cores of a column use the flip-flop during the corresponding 39 stages of a transmission cycle. All ten columns of the high speed memory 150 which are associated with the tens register and the units register and their associated flip-flops operate in the same manner. However, for most of the constant current generators, the input logic for advancing the registration is somewhat more complicated.

F3. *Signal state registration and circulation* (*FIG. 24*)

As an example of the circuits of the signal state register, which is shown in functional block diagram in FIG. 14, the flip-flop FF—DT, its constant current generator G—DT, and associated circuits are shown by the schematic diagram of FIG. 24. FIG. 24 should be placed to the right of FIG. 23, showing the connection of the conductor pair DT into the high speed memory 150. Since registration of a dial-tone-signal state only pertains to calling lines, this column has cores only in the odd numbered rows of the memory.

The flip-flop FF—DT is the same as the flip-flop shown in FIG. 23, except for the input circuit connections. As in FIG. 23, a negative clock pulse CP.5 is supplied during the 0.5-microsecond interval of each time slot at the S0 input to reset the flip-flop by the negative potential applied to the base electrode of transistor 2411; and an S1 input is provided from the sense winding through a diode 2451, which, if the core had been set when the read pulse was applied supplies a positive pulse to override the negative signal at the base of transistor 2411 and place the flip-flop in the set condition. However, the CP.5 clock pulse is supplied through an OR gate 1432. There is also a regular set 1 input for setting the flip-flop by applying a negative pulse to the base electrode of transistor 2412. This input provides for setting the flip-flop by the logic circuit during the 1.5-microsecond interval, and an input from the logic circuit through gate 1432 provides for resetting the flip-flop.

The constant current generator G—DT is similar to the one shown in FIG. 23, except that an OR gate 2431 is provided at the input. This OR gate gates the output of the flip-flop with the clock pulse CP1B. The pulse CP1B is the inverse form of the pulse CP1A, and therefore the gating provided by the gate 2431 corresponds to the gating of the output signals in FIG. 12 by the pulse CP1A, inverting the resulting signal, and supplying these signals on leads TA' and TB' to FIG. 23 and thence through the gates into the constant-current generator G—TF.

Output from the flip-flop is desired during the 1.5-microsecond interval of the time slot for controlling the transmission gate in the signalling circuits 170 (FIG. 2). However, in the circulation of the flip-flop condition with the memory cores, the flip-flop is normally set and reset by the sense winding output pulse and the clock pulse CP.5, and the desired output condition of the flip-flop overlaps the 1.5-microsecond interval. Therefore, its output should be gated with a clock pulse. Using a gate in the output lead necessitates the use of an amplifier to provide enough current for the load. Since the amplifier inverts the signal, the 0 output of the flip-flop is used. The other input of this gate should be an inverted CP1.5 pulse, and this is obtainable by using the clock pulse CP.5. Thus, whenever the flip-flop is in the set condition during the 1.5-microsecond interval, both inputs at gate 1442 are at ground, causing the transistor 2452 in amplifier 1452 to be cut off. The output signal on lead D—T is then at the −5 volt clamping potential. If the flip-flop FF—DT is in the reset condition during this interval, the −5 volts on its 0 output supplied through gate 1442 brings the transistor 2452 into conduction and produces a ground signal on the output lead D—T.

In the absence of any output signals from the logic gates 1413 and 1414, recirculating operation occurs between the flip-flop and the memory cores in essentially the same manner as described for FIG. 23, except for the fact that there are no logic circuits between the flip-flop FF—DT and the constant current generator G—DT except for the gate 2431 which insures that the write signal is delivered during the proper interval of the time slot.

This and the other signal state registers are controlled principally by the output of the sequence circuit 1000 (FIG. 10A). Since the flip-flop FF—DT registers a calling line signal state, the logic inputs must be gated with the clock pulse P2. When the signal H1 coincides with P2, the output from gate 1413 sets the register, and when the signal H2 coincides with P2, the output from gate 1414 through gate 1432 resets the register.

All five of the signal state registers operate in essentially the same manner. Those memory columns threaded by conductor pairs BT, DT, and RT have cores in the calling line rows, and the input logic circuits to their flip-flops are gated by the clock pulse P2; the column threaded by conductor pair RG has cores in the called line rows of the memory, and its input logic is gated with the clock pulse P3; and the column threaded by conductor pair ST has cores in both the calling and the called line rows, and has some input logic gated with the pulse P2 and others gated with P3.

Features disclosed herein relating to the counting circuits for use in performing such functions as timing and sequence switching in the control circuits are claimed in our copending application for an Electronic Communication System and Counting Circuits Therefor, Serial No. 843,381, filed September 30, 1959.

Other switching-system features disclosed herein are claimed in a copending application of D. K. Melvin for an Electronic Communication System, Serial No. 845,191, filed October 8, 1959.

While we have described above the principles of our invention in connection with specific apparatus, it is to be clearly understood that this description is made only by way of example and not as a limitation to the scope of our invention.

What is claimed is:

1. In a time division multiplex communication system, a first group of transmission paths each having a terminating unit individually connected thereto, a second group of transmission paths each having a connecting unit individually connected thereto, a time division multiplex transmission medium between and common to said terminating units and said connecting units, each of said terminating units and each of said connecting units including a transmission gate interposed between its transmission path and the common transmission medium, and common control equipment shared on a time division multiplex basis by said connecting units, said common control equipment including circulating memory means for selectively storing the identity of the individual terminating unit to be effectively connected over said common transmission medium with an individual connecting unit in a given call and for storing the sequence state of said call, and including apparatus time shared by the individual calls during repetitive pulse cycles of, and controlled by, the circulating memory means for selectively supplying cyclically recurring enabling pulses to the respective transmission gates to establish said effective connection in accordance with said stored information, and for selectively altering said stored information in accordance with received supervisory signals.

2. In a time division multiplex communication system, the combination as claimed in claim 1, wherein said circulating memory means comprises a high-speed memory for said storage of the identity of the individual terminating units, and a low-speed memory for said storage of the sequence state, each said memory having a recurring time cycle associated therewith; wherein each time slot in the cycle of said high-speed memory is individually assigned to a particular one of said connecting units, each said time slot corresponding to a step of said high-speed memory; wherein said high-speed memory completes a plurality of cycles for each pulse frame, each said pulse frame corresponding to a complete cycle of said low-speed memory; and wherein the state of said call is analyzed during a predetermined logic cycle of the low-speed memory, each said logic cycle corresponding to one step of said low-speed memory.

3. In a time division multiplex communication system, the combination as claimed in claim 2, wherein the number of logic cycles per frame is related to the number of high-speed memory cycles per frame so that each connecting unit has associated therewith one and only one logic cycle.

4. In a time division multiplex communication system, the combination as claimed in claim 3, wherein said logic cycles are divided into time slots equal in duration to the time slots of said high-speed memory cycles, and wherein a predetermined time slot in said high-speed memory cycle coincides with a given time slot of one and only one logic cycle of said frame.

5. In a time division mutiplex communication system, the combination as claimed in claim 3, wherein said logic cycles are divided into time slots equal in duration to the time slots of said high-speed memory cycles, and wherein the number of time slots per logic cycle and the number of time slots per high-speed memory cycle have no common divisor.

6. In a time division multiplex communication system, the combination as claimed in claim 5, wherein the number of time slots per logic cycle is seventeen, and the number of time slots per high-speed memory cycle is forty.

7. In a time division multiplex communication system, the combination as claimed in claim 2, wherein a plurality of links are provided for completing communication connections between any two of said terminating units, each link comprising two of said connecting units, one being a line finder for establishing an originating connection to a calling one of said terminating units, and the other being a connector for establishing a terminating connection to a called one of said terminating units, the line finder and connector of each link being connected by one of said second transmission paths.

8. In a time division multiplex communication system, the combination as claimed in claim 7, wherein the logic cycles and high-speed memory cycles are so related within each frame that each link has associated therewith one and only one logic cycle during which the state of the call is analyzed with respect to both the line finder and the connector.

9. In a time division multiplex communication system, the combination as claimed in claim 8, wherein each said link has two time slots per high-speed memory cycle individually assigned thereto, one being assigned to the line finder and the other to the connector.

10. In a time division multiplex communication system, the combination as claimed in claim 9, wherein said logic cycles are divided into time slots equal in duration to the time slots of said high-speed memory cycles, and wherein during each frame, for each link, the line finder time slot in the high-speed memory cycle coincides with a given time slot of only the logic cycle associated with that link, and the connector time slot in the high-speed memory cycle coincides with a different given time slot of only said logic cycles.

11. In a time division multiplex communication system, the combination as claimed in claim 10, wherein the logic cycles are so assigned to links that in the logic cycle associated with any link, said given time slot for line finder coincidence does not coincide with any high-speed memory connector time slot, and said different given time slot for connector coincidence does not coincide with any high-speed memory line finder time slot.

12. In a time division multiplex communication system, the combination as claimed in claim 2, wherein said low-speed memory comprises a matrix of storage elements in columns and rows, with each logic cycle being assigned one row thereof, and wherein said low-speed storage apparatus further includes a plurality of bistable devices individually associated with colums of storage elements in the low-speed memory.

13. In a time division multiplex communication system, the combination as claimed in claim 12, wherein each said logic cycle comprises in order: a read pulse applied to its row of the low-speed memory to transfer the states of the storage elements in that row to the respective bistable devices, a series of logic pulses for analyzing the states of the bistable devices and the supervisory signals and for selectively acting on the bistable devices in accordance with the analysis, a write pulse applied to its said row for transferring the states of the bistable devices to the storage elements of that row, and a reset pulse for clearing said bistable devices.

14. In a time division multiplex communication system, the combination as claimed in claim 12, wherein said low-speed storage apparatus includes a timer circuit in the form of a binary counter which measures, on a time sharing basis, the time intervals involved in the completion of each of said calls, each counting bit being represented by one of said bistable devices and its associated column of elements in the low-speed memory.

15. In a time division multiplex communication system, the combination as claimed in claim 14, wherein said low-speed storage apparatus further includes a sequence circuit in the form of a binary counter for registering on a time sharing basis the state of each call in accordance with the state of said timer circuit as well as said received supervisory signals, each counting bit being represented by one of said bistable devices and its associated column of elements in the low-speed memory.

16. In a time division multiplex communication system, the combination as claimed in claim 15, wherein during each logic cycle the states of said low-speed memory elements in the row corresponding to that logic cycle are transferred into the bistable devices, and subsequently in said logic cycle the states of the bistable devices are transferred into the low-speed memory elements of said row, said transfers occurring in coded form.

17. In a time division multiplex communication system, the combination as claimed in claim 16, wherein said low-speed storage apparatus further includes a timer translation circuit and a sequence translation circuit for translating the output states of the timer and sequence circuit respectively.

18. In a time division multiplex communication system, the combination as claimed in claim 2, wherein said high-speed memory comprises a matrix of storage elements in columns and rows, with each said connecting unit being assigned one row thereof, and wherein said high-speed storage apparatus further includes a plurality of bistable devices individually associated with columns of storage elements in the high-speed memory.

19. In a time division multiplex communication system, the combination as claimed in claim 18, wherein said high-speed storage apparatus includes means for registering transmission signal states, each of which is assigned one of said high-speed memory columns and the corresponding bistable device.

20. In a time division multiplex communication system, the combination as claimed in claim 19, wherein said signal states includes states in which supervisory tones are transmitted to selected terminating units, and wherein individual ones of said bistable devices supply signals for controlling the transmission of said tones over the common transmission medium.

21. In a time division multiplex communication system, the combination as claimed in claim 19, wherein said signal states include switching through of a connection over the common transmission medium.

22. In a time division multiplex communication system, the combination as claimed in claim 19, wherein said signal states include ringing a called line.

23. In a time division multiplex communication system, the combination as claimed in claim 18, wherein said low-speed memory comprises a matrix of storage elements in columns and rows, with each logic cycle being assigned one row thereof, and wherein said low-speed storage apparatus further includes a plurality of bistable devices individually associated with columns of storage elements in the low-speed memory.

24. In a time division multiplex communication system, the combination as claimed in claim 23, wherein said logic cycles are divided into time slots equal in duration to the time slots of said high-speed memory cycles, and wherein a predetermined time slot in said high-speed memory cycle coincides with a given time slot of one and only one logic cycle of said frame.

25. In a time division multiplex communication system, the combination as claimed in claim 24, further including a master clock having a cycle per time slot, and wherein said high-speed memory and said low-speed memory have their respective read and write pulses derived from said master clock.

26. In a time division multiplex communication system, the combination as claimed in claim 25, further including a high-speed distributor interposed between said high-speed memory and said master clock, and a low-speed distributor interposed between said low-speed memory and the master clock, both said distributors having a number of stages equal to the number of time slots in a high-speed memory cycle, with the read and write pulses for each row of each memory being supplied from an individual stage of its respective distributor.

27. In a time division multiplex communication system, the combination as claimed in claim 26, further including a low-speed clock comprising a distributor device having a number of stages equal to the number of time slots in a logic cycle, and being driven one stage per time slot by said master clock; said low-speed distributor being driven one stage during each cycle of the low-speed clock by pulses delivered from the low-speed clock during the read and write pulse intervals of the low-speed distributor; and said logic and reset pulses to said low-speed storage apparatus being supplied by said low-speed clock.

28. In a time division multiplex communication system, the combination as claimed in claim 27, wherein said high-speed distributor, said low-speed distributor, and said low-speed clock, each comprises a magnetic core shift register.

29. In a time division multiplex communication system, the combination as claimed in claim 18, wherein said terminating units have numerical designations, wherein means are provided for registering the numerical designation of a selected individual terminating unit in the elements of the high-speed memory row assigned to the individual connecting unit, and wherein said means for supplying enabling pulses in the respective transmission gates includes an arrangement effective during the time slot assigned to said individual connecting unit for supplying pulses to the transmission gate and the high-speed memory row of said connecting unit.

30. In a time division multiplex communication system, the combination as claimed in claim 29, wherein the pulses supplied to said high-speed memory row comprise a read pulse which causes the states of the elements in the row to be transferred into the bistable devices of the respective columns, followed by a write pulse which causes the states of the bistable devices to be transferred into the elements of said row; and wherein said means for supplying enabling pulses further includes an arrangement for supplying pulses to the transmission gate of the terminating unit which corresponds to the number set up in the bistable devices in response to the read pulse.

31. In a time division multiplex communication system, the combination as claimed in claim 30, wherein each of said terminating unit numerical designations comprises a plurality of decimal digits which are registered in said high-speed memory elements in coded form, so that the number of columns of elements and corresponding bistable devices for each decimal digit is less than ten.

32. In a time division multiplex communication system, the combination as claimed in claim 31, wherein there are five columns of elements in said high-speed memory for each decimal digit, and each said digit is registered in a two-out-of-five code.

33. In a time division multiplex communication system, the combination as claimed in claim 31, wherein said arrangement for supplying pulses to the selected terminating unit includes a means for translating the coded number set up in said bistable devices into a one-out-of-ten form for each decimal digit.

34. In a time division multiplex communication system, the combination as claimed in claim 33, wherein said transfer of states between the high-speed memory elements and the bistable devices responsive to said read and write pulses occurs in coded form.

35. In a time division multiplex communication system, the combination as claimed in claim 34, wherein said low-speed storage apparatus includes means responsive to said supervisory signals for supplying number register control signals which for each said decimal digit comprise alternatively a rewrite signal and an advance signal, and wherein means are provided for supplying said register control signals to the high-speed storage apparatus.

36. In a time division multiplex communication system, the combination as claimed in claim 35, wherein said high-speed storage apparatus responds to a rewrite signal to cause the same digital value which is transferred to the bistable devices during the read pulse to be transferred back into the said high-speed memory elements during the write pulse, and which responds to an advance signal to cause the next following digital value in a ring counting pattern to be written into the memory elements during the write pulse.

37. In a time division multiplex communication system, the combination as claimed in claim 2, wherein the transmission paths in said first group comprise subscriber lines having stations which transmit on-off hook supervisory signals, and said terminating units are line circuits with means for repeating said supervisory signals to said low-speed storage apparatus.

38. In a time division multiplex communication system, the combination as claimed in claim 37, wherein said low-speed storage apparatus includes means for registering said on-off hook supervisory signals.

39. In a time division multiplex communication system, the combination as claimed in claim 38 further including means for repeating busy guarding signals received from said line circuits to said low-speed storage apparatus.

40. In a time division multiplex communication system, the combination as claimed in claim 37, wherein said on-off hook supervisory signals include a plurality of series of dial impulses, and wherein said low-speed storage apparatus includes a bistable device for supervising each individual dial impulse and another bistable device for supervising each series of dial impulses.

41. In a time division multiplex communication system, the combination as claimed in claim 37, wherein said low-speed storage apparatus includes a timer circuit in the form of a binary counter which measures, on a time-sharing basis, the time intervals involved in the completion of each of said calls.

42. In a time division multiplex communication system, the combination as claimed in claim 41, wherein said low-speed storage apparatus further includes a sequence circuit for registering on a time sharing basis the state of each call in accordance with the state of said timer circuit as well as the received supervisory signals.

43. In a time division multiplex communication system, the combination as claimed in claim 37, wherein said low-speed storage apparatus includes a sequence circuit for registering on a time sharing basis the state of each said call in accordance with received supervisory signals.

44. In a time division multiplex communication system, the combination as claimed in claim 37, wherein said connecting units are line finders, and wherein said low-speed storage apparatus includes a bistable device for indicating on a time sharing basis whether or not said line finders are in scanning condition.

45. In a time division multiplex communication system, the combination as claimed in claim 44, wherein said storage apparatus includes another bistable device common to all line finders, last said bistable device controlling and being controlled by the scanning indicating device for conditioning only one idle line finder for scanning at a time.

46. In a time division multiplex communication system, the combination as claimed in claim 1, wherein a plurality of links are provided for completing communication connections between any two of said terminating units, each link comprising two of said connecting units, one being a line finder for establishing an originating connection to a calling one of said terminating units, and the other being a connector for establishing a terminating connection to a called one of said terminating units, the line finder and connector of each link being connected by one of said second transmission paths.

47. In a time division multiplex communication system, the combination as claimed in claim 46, wherein each said link has two time slots per cycle of said enabling pulses individually assigned thereto, one being assigned to the line finder and the other to the connector.

48. In a time division multiplex communication system, the combination as claimed in claim 47, wherein said two time slots of each link are adjacent each other in said pulse cycle.

49. In a time division multiplex communication system, the combination as claimed in claim 47, wherein each of said terminating units includes only one of said transmission gates, wherein said common transmission medium has the transmission gates of all of said terminating units connected in common to one end thereof, and the transmission gates of both the line finders and the connectors of all of said links connected in common to the other end thereof.

50. In a time division multiplex communication system, a group of line circuits each having a transmission gate, a group of finder-connector links each having a finder transmission gate and a separate connector transmission gate connected by a link coupling circuit, common two-way multiplex transmission means connected between said line circuit transmission gates and said link transmission gates, a single coordinate array of memory elements for storing the identity of the line circuits respectively to be connected on a multiplex basis with said links, each column of said array being associated in common with both the finder and the connector of a given link, but each link having one time slot individually assigned to its finder and another time slot individually assigned to its connector, and control equipment common to both the finders and connectors of said plurality of links and connected to the individual columns of said single array for causing information read out of a predetermined column to be rewritten into the same or the next-following column in accordance with supervisory signals received from said line circuits.

51. In a time division multiplex communication system, a combination as claimed in claim 50, wherein said common transmission means comprises a single transmission path connected in common to all of said line-circuit transmission gates and all of said finder and connector transmission gates.

52. In a time division multiplex communication system, a group of line circuits each having a transmission gate, a group of finder-connector links each having a finder transmission gate and a separate connector transmission gate connected by a link coupling circuit, common two-way multiplex transmission means connected between said line circuit transmission gates and said link transmission gates, each link having one time slot individually assigned to its finder and another time slot individually assigned to its connector, common control equipment shared on a time division multiplex basis by said finders and connectors, said common equipment including means for selectively registering the identities of line circuits to be effectively connected to the respective links in accordance with supervisory signals received from said line circuits, and including means time shared by both the finders and the connectors, each in its own time slot, for supplying enabling pulses to the finder or connector transmission gate and simultaneously to the selected line-circuit transmission gate.

53. In a time division multiplex communication system, a group of line circuits, each having a transmission gate, a group of connecting units each having a transmission gate, common two-way multiplex transmission means connected between said line-circuit transmission gates and said connecting unit transmission gates, means including common control apparatus for selectively supplying cyclically recurring enabling pulses to the line circuits and the connecting units to establish effective connections between them, each line circuit including means for repeating on-off hook supervisory signals received from the associated line to said common control apparatus, and also including means responsive to the enabling of its transmission gate during an established connection to a connecting unit for transmitting busy guarding signals to said common control apparatus.

54. In a time division multiplex communication system, a combination as claimed in claim 53, wherein two separate supervisory signal leads shared by said line circuit on a time division multiplex basis, are connected between said line circuits and said common control apparatus, said on-off hook supervisory signals being transmitted as recurring pulses over one of said leads and said busy guarding signals being transmitted as recurring pulses over the other lead.

55. In a time division multiplex communication system, a combination as claimed in claim 53, wherein an impedance converter including an amplifying device is connected to said transmission gate in each line circuit, and a capacitor is connected in circuit with said amplifying device which has one state of charge when the line circuit is idle and changes to another state of charge responsive to the current flow in the amplifying device upon the enabling of the transmission gate, the transmission of said busy guarding signals being controlled by the state of charge of the capacitor.

56. In a time division multiplex communication system, a group of line circuits, each having a transmission gate, a group of connecting units each having a transmission gate, common two-way multiplex transmission means connected between said line-circuit transmission gates and said connecting unit transmission gates, means including common control apparatus for selectively supplying cyclically recurring enabling pulses to the line circuits and the connecting units to establish effective connections between them, signal control equipment included in said common control apparatus and shared by said connecting units on a time division multiplex basis for storing the transmission signal states of said connecting units and controlling the transmission of the corresponding supervisory tone signals over said common multiplex transmission means of said connecting units and controlling the transmission of the corresponding supervisory tone signals over said common multiplex transmission means.

57. In a communication switching system, a plurality of line circuits having individual subscriber lines connected thereto, a plurality of line finders, means for causing an idle finder to scan the line circuits for a line initiating a call, a bistable trigger device which indicates whether or not each line finder is in scanning condition, and means for time sharing said trigger device by all of said line finders.

58. In a communication switching system, a plurality of line circuits having individual subscriber lines connected thereto, a plurality of line finders, means for causing an idle line finder to scan the line circuits for a line initiating a call, a bistable trigger device which indicates whether or not each line finder is in scanning condition, and means for time sharing said trigger device by all of said line finders, wherein said time-sharing means comprises a memory having a plurality of bistable storage elements associated with said trigger device, each line finder having one of the storage elements individually associated with it, the trigger device and each storage element having a first state for indicating a scanning line finder and a second state for not scanning, means for supplying cyclically recurring pulses to said memory, with each line finder being assigned an individual time position in each pulse frame, and means responsive to said pulses for circulating the scanning state indications of the line finders between the memory and the trigger device so that for each line finder its state will be indicated by the trigger device during its time position and stored in its memory element during the remainder of each frame.

59. In a communication switching system, the combination as claimed in claim 58, further including sequence means which indicates for each line finder whether it is idle or effectively connected to a calling line circuit and therefore busy, input means effective for each line finder during its time position for controlling the state of said trigger device, the sequence circuit being connected to said input means to supply the idle or busy indication thereto to set the tirgger device and storage elements so that at least one of the idle line finders is in scanning condition, and responsive to the scanning finder becoming effectively connected to a calling line the sequence circuit supplies a busy indication to said input means to set the trigger device to its second state.

60. In a communication switching system, the combination as claimed in claim 59, wherein said sequence means comprises a plurality of bistable devices associated with storage elements of said memory which are responsive to said pulses so that the bistable devices are time shared by the line finders, each in its own time position.

61. In a communication switching system, the combination as claimed in claim 58, wherein a connection arrangement is provided so that the trigger device may be controlled according to a first connection option in which only one idle finder has its trigger set to scanning condition at a time; or it may be controlled according to a second connection option in which all idle finders have their triggers set to scanning condition.

62. In a communication switching system, the combination as claimed in claim 58, further including an allotter bistable trigger device common to all of said line finders and associated with said scanning-indicating trigger device for conditioning only one idle one of said line finders for scanning at a time.

63. In a communication switching system, the combination as claimed in claim 62, wherein said allotter trigger device is set to a first of its stable states responsive to a scanning line finder becoming effectively connected to a calling line circuit, and responsive to the alotter trigger device being in its first state the scanning-indicating trigger of the idle line finder whose time position is next in order in the pulse frame is set to its first state to condition that line finder for scanning, the allotter trigger being then set to its second state.

64. In a communication switching system, the combination as claimed in claim 63, wherein an optional connection is provided between the output of said allotter trigger device and the input of said scanning-indicating trigger device, a first option being to control the scanning-indicating trigger in the time position of an idle line finder to operate to its first state only responsive to said allotter trigger being in its first state, and a second option being to control the scanning-indicating trigger to operate to its first state of all idle line finders.

65. In a communication syitching system for selectively establishing connections between terminating units, a time division multiplex transmission medium over which supervisory signals for a plurality of calls may be transmitted by pulses in cyclically recurring slots; register means comprising a high-speed circulating memory, a low-speed circulating memory and common logic apparatus time shared by the individual calls; said high-speed memory and said multiplex transmission medium having corresponding cycles and time slots, and said high-speed memory completing a plurality of cycles for each pulse frame corresponding to one complete cycle of said low-speed memory; the register means being arranged to store terminating-unit identification information in the high-speed memory and to store sequence state information in the low-speed memory in accordance with supervisory signals received over said multiplex transmission medium for each of said plurality of calls.

66. In a communication switching system the combination as claimed in claim 65, wherein logic cycles corresponding to steps of said low-speed memory recur once per said pulse frame; and wherein said register means comprises a plurality of registers, each individually associated with at least one time slot of said high-speed cycle for receiving supervisory signals from said transmission medium and one logic cycle of said pulse frame for analyzing the sequence state of a call; and means for coordinating the reception of supervisory signals and the sequence-state analysis for each register by coincidence of said individual time slot of the high-speed cycle with a given time-position in the logic cycle.

67. In a communication switching system, the combination as claimed in claim 66, wherein at least some of said terminating units are line circuits individually connected to lines of a group, each line circuit having a supervisory transmission gate connected to said transmission medium, means responsive to the initiation of a call on one of said lines for supplying to the associated transmission gate enabling pulses recurring every high-speed cycle in said individual time plot of one of said registers, said common logic apparatus including a line supervision device terminating the transmission medium, said device responding to the supervisory signal occurring in the time slot coincident with said given time position of each logic cycle, storing the supervisory signal condition for an interval equal in duration to a plurality of time slots, and resetting before the end of the logic cycle; so that supervisory signals from said calling line are applied to the associated transmission gate, are transmitted over the transmission medium in the time slot of said register, and are stored in said device for a portion of the logic cycle of said register.

68. In a communication switching system, the combination as claimed in claim 67, wherein said supervisory signals on a calling line include series of impulses identifying a called terminating unit, each impulse interval and each inter-impulse interval having a duration greater than said pulse frame, and wherein said low-speed memory is arranged to also store information relating to timing and supervision of the multiplex samples of said impulses and inter-impulse intervals to distinguish the individual impulses and to control changeover to the next sequence state after each complete series of impulses.

69. In a communication switching system, the combination as claimed in claim 67, further including means for causing an idle one of said registers to scan said line circuits for a line initiating a call, line identification information being stored and circulated in the high-speed memory in the said time slot individual to said one register, means for supplying enabling pulses to the supervisory transmission gate of the line circuit corresponding to said stored line identification, means for changing the stored line identification once per pulse frame until a call initiating signal is received at said line supervision device from the scanned line circuit in coincidence with said given time position in the logic cycle of said one register, and means responsive to the resulting stored signal condition in said device for advancing the sequence state in the low-speed memory and stopping the scanning so that the same line identification information remains stored and circulated in said register time slot of the high-speed memory, so that the corresponding line is identified as a calling line and its supervisory transmission gate is supplied with recurring enabling pulses in the high-speed time slot of the register.

70. In a communication switching system, the combination as claimed in claim 69, wherein each of said registers is individually assigned two time slots in said high-speed cycle for storage and circulation of line-identification information, one being said time slot for calling-line identification, and the other being for called-line identification; the arrangement of said register means being such that, responsive to supervisory signals received from said calling line and transmitted over said transmission medium in said calling-line time slot of said one register, the called-line identification is stored and circulated in said called-line time slot of the high-speed memory and the sequence state is further advanced in the low-speed memory, and responsive to the completion of said called-line registration, enabling pulses in the called-line time slot of the register are supplied to the supervisory transmission gate of the called line; a second given time position occurring subsequent to the first given time position in each logic cycle and coinciding with said called-line time slot during the logic cycle of said one register, said common logic apparatus further including a second line supervision device terminating the transmission medium which responds to the called-line supervisory signals coinciding with said second given time position, stores the called-line supervisory condition, and is reset before the end of the logic cycle; the storage of information in the low-speed memory being controlled by the supervisory signal conditions indicated by both said line supervision devices.

71. In a communication switching system, the combination as claimed in claim 70, wherein a plurality of finder-connector links are provided to establish connections between the line circuits of said group, each of said registers being individual to one of the links; and wherein said high-speed memory comprises a single coordinate array of memory elements for storing the identity of the line circuits to be connected respectively with the links, each column of said array being associated in common with both the finders and the connectors for said storage of the identity of the calling lines and the called lines respectively, said common logic apparatus including control equipment common to both the finders and the connectors and connected to the individual columns of said single array for causing information read out of a predetermined column to be rewritten into the same or the next-following column in accordance with said supervisory signals received from said line circuits.

72. In a communication switching system, the combination as claimed in claim 71, further including a second supervisory transmission gate in each line circuit, both said transmission gates in each line circuit being supplied enabling pulses coincidently, a second time division multiplex transmission medium connected between said second transmission gates and said common logic apparatus, and means for transmitting busy guarding signals from the line circuits through the respective second transmission gates over the second transmission medium to the common logic apparatus.

73. In a communication switching system, the combination as claimed in claim 71, wherein each of said line circuits includes a voice multiplexing transmission gate, and each of said links comprises a finder transmission gate and a separate connector transmission gate connected by a link coupling circuit; common two-way voice multiplex transmission means connected between said line-circuit voice transmission gates and said link transmission gates, and means for supplying recurring enabling pulses to the calling-line and finder transmission gates in said calling-line time slot and to the called-line and connector transmission gates in said called-line time slot.

References Cited in the file of this patent

UNITED STATES PATENTS

| | | |
|---|---|---|
| 2,892,035 | Trousdale | June 23, 1959 |
| 2,917,583 | Burton et al. | Dec. 15, 1959 |